United States Patent [19]
Wolf et al.

[11] Patent Number: 4,972,258
[45] Date of Patent: Nov. 20, 1990

[54] SCANNING LASER MICROSCOPE SYSTEM AND METHODS OF USE

[75] Inventors: William E. Wolf, Chesapeake City, Md.; Alfred Hirschle, Wilmington, Del.; Derrick P. Lattibeaudiere; Robert H. Livermore, both of Newark, Del.; Alan P. Stamford, Swarthmore, Pa.; John Taylor, New Castle, Del.

[73] Assignee: E. I. Du Pont de Nemours and Company, Wilmington, Del.

[21] Appl. No.: 385,563

[22] Filed: Jul. 31, 1989

[51] Int. Cl.⁵ .............................................. H04N 7/18
[52] U.S. Cl. .................. 358/93; 324/158 R; 358/199; 358/206
[58] Field of Search .......................... 358/93, 199, 206; 324/158 R

[56] References Cited

U.S. PATENT DOCUMENTS

| | | | |
|---|---|---|---|
| 2,079,621 | 5/1937 | Land | 350/236 |
| 3,013,467 | 12/1961 | Minsky | 358/199 |
| 3,517,980 | 6/1970 | Petran et al. | 350/527 |
| 3,705,755 | 12/1972 | Baer | 350/6.8 |
| 4,360,269 | 11/1982 | Iwamoto et al. | 356/239 |
| 4,449,046 | 5/1984 | Zuckerman et al. | 250/235 |
| 4,466,088 | 8/1984 | Trethewey | 369/46 |
| 4,556,964 | 4/1985 | Trethewey | 369/44 |
| 4,587,420 | 5/1986 | Noguchi et al. | 250/235 |
| 4,604,523 | 8/1986 | Knowles et al. | 250/310 |
| 4,733,063 | 3/1988 | Kimura | 350/319 |
| 4,812,748 | 3/1989 | Brust | 324/158 R |
| 4,827,125 | 5/1989 | Goldstein | 250/234 |
| 4,902,963 | 2/1990 | Brust | 324/158 R |
| 4,902,966 | 2/1990 | Brust | 324/158 R |

OTHER PUBLICATIONS

Tony Wilson et al., "Theory and Practice of Scanning Optical Microscopy," Academic Press, London, pp. 1–9, (1984).
Francis A. Jenkins, "Fundamentals of Optics Fourth Edition," McGraw-Hill Book Company, New York, pp. 576–579, (1957).
"Integrated Circuits Data Book" Burr-Brown Corporation, Tucson, Arizona, pp. 1–88 through 1–89, (1986).
Joseph W. Goodman et al., "Laser Applications," Academic Press, New York, pp. 167–175, (1980).
John J. D'Azzo et al., "Feedback Control System Analysis and Synthesis," McGraw-Hill Book Company, Inc., New York, pp. 108–109, (1960).
A. Draaijer et al., "A Standard Video-Rate Confocal Laser-Scanning Reflection and Fluorosecence Microscope,"Scanning, vol. 10, p. 139–145 (1988).
V. Wilke, "Optical Scanning Microscopy-The Laser Scan Microscope," Scanning, vol. 7, pp. 88–96 (1985).
J. S. Ploem, "Laser Scanning Fluorescence Microscopy," Applied Optics, vol. 26, No. 16, pp. 3226–3231, Aug. 15, 1987.
A. Plesch et al., "Digital Laser Scanning Fundus Camera", Applied Optics, vol. 26, No. 8, Apr. 15, 1987.
R. H. Webb, "Confocal Scanning Laser Opthalmoscope," Applied Optics, vol. 26, No. 8, Apr. 15, 1987.
"Lasersharp SOM 100" by IBT Dublier Ltd. discloses a commercial laser scanning microscope.
"Laser Microscope Displays Color in Real Time," Lasers & Applications, p. 18, Mar. 1987.
"Acousto Optic Scanning Laser Microscope Model N44256," by Newport Electro-Optics Systems of Melbourne, Florida.
"Laser Scan Microscope in the Semiconductor Industry," by Carl Zeiss of Oberkochen, West Germany, pp. 1–11.
"LSM Laser Scanning Mikroskop," by Heidelberg Instruments.

Primary Examiner—Howard W. Britton
Attorney, Agent, or Firm—John E. Griffiths

[57] ABSTRACT

A scanning laser microscope system for assisting in the detection and characterization of fine details and structures of materials or other samples. The system can have means for enhancing light from the material to assist detection of anomalies, such as inclusions in the material and crystal lattice dislocations. The system can have means for enhancing fluorescent light emitted from the sample. The system can further have very precise means for processing signals representative of light detected from the material.

105 Claims, 26 Drawing Sheets

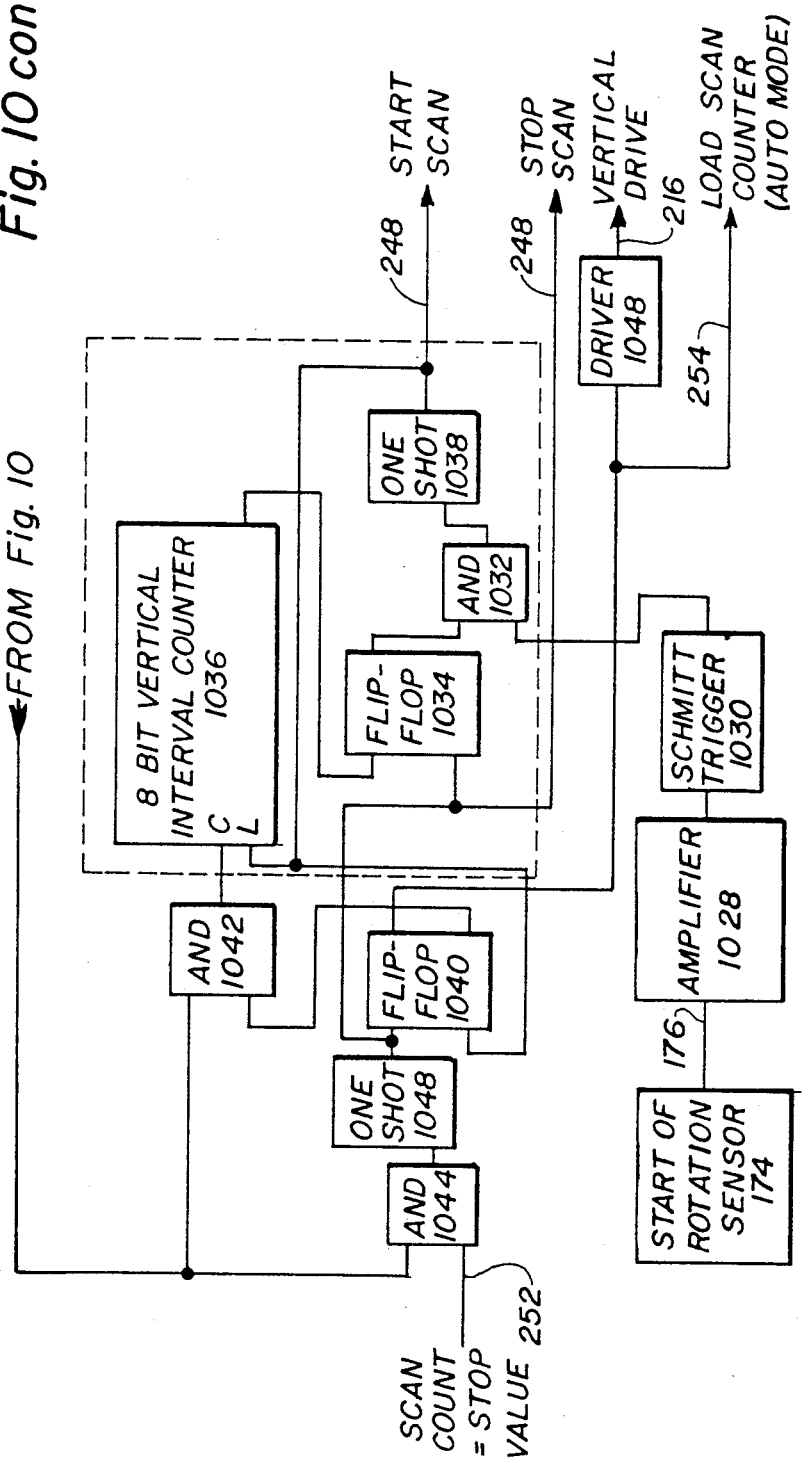
Fig. 10 con't.

SCANNING LASER MICROSCOPE SYSTEM AND METHODS OF USE

BACKGROUND OF THE INVENTION

1. Field of the Invention

This invention relates to scanning laser microscope systems and, specifically, to scanning laser microscope systems for enhanced inspection of samples, such as, birefringent materials or fluorescent objects.

2. Description of Related Art

For many years optical microscopes have been useful for examining fine details and structures in materials. Conventional microscopes typically use the kind of imaging in which the object is illuminated as a whole. Light transmitted through or reflected from the object is imaged into an intermediate image plane by an objective lens. This intermediate image plane is either viewed with an eyepiece or scanned with a TV camera.

One disadvantage of conventional microscopy results from scattered light from one point of the object arriving at the intermediate image plane in another part of the image, thus, degrading the contrast between parts of the image. This effect is minimized in scanning microscope systems.

Optical scanning microscopy illuminates the object on a point by point basis and the transmitted, reflected, stray or emitted light is measured for each consecutive point. An image is formed by combining the point by point brightness measurements into a suitable display means. With the advent of the laser the point by point resolution of optical scanning microscopy improved due to the ability to focus the single wavelength light of the laser to a smaller spot. For a more detailed discussion of scanning microscope systems, see Wilson and Sheppard, "Theory and Practice of Scanning Optical Microscopy," Academic Press, pages 3-9, 1984.

If the material being viewed is anisotropic, a series of complications arise. Light passing through an anisotropic material travels at different velocities in different directions. Polarized light is further affected by differences in the propagation velocity of light at different polarization angles.

A birefringent material can be triaxially anisotropic. Further, a birefringent material causing light to travel therethrough at different velocities for each axial direction refracts a beam of light in two different directions to form two rays. A converging beam of polarized light passing through a birefringent material, whether viewed in a conventional or scanning microscope, will cause interference pattern effects resulting in dark and bright "brushes" and "rings". Jenkins and White, in "Fundamentals of Optics," McGraw-Hill Book Co., pages 576-579, 1976, discuss this effect.

These variations in image brightness make detection of small anomalies, such as inclusions, crystal lattice dislocations, grain boundaries, vacancies, interstitials, etc., more difficult for the microscopist. Only those areas of the image having uniform brightness can be examined with acceptable results. Thus, only a small portion of an image may be useful for examination of an object, resulting in viewing the object repeatedly to cover a given area.

In the manufacture of electro-optical devices, knowledge of the quality of the substrate material is important to achieve high yields of functional devices at reasonable cost. In the manufacture of molecularly oriented polymers and other birefringent materials, knowledge of the quality of the material is similarly important.

A confocal laser scanning microscope differs from a conventional microscope by affording depth discrimination as well as improved resolution.

Fluorescence laser scanning microscopy offers many advantages over conventional fluorescence microscopy. Light can be concentrated on very small spots of the sample enabling the detection of small concentrations of fluorescent substances. Further, in conventional fluorescence microscopy, out of focus fluorescence can give a relatively strong interference with fluorescence from the sample layer in focus. Whereas, out of focus fluorescence in a confocal laser scanning microscope interferes only in a very limited way with the flurrescence of a sample layer in focus.

It is an object of the present invention to provide an improved scanning laser microscope system to assist in detecting or characterizing fine details and structures of materials or other samples.

It is a further object of the present invention to provide means for enhancing the light transmitted through, reflected from or emitted from the material or sample to increase the contrast between the material or sample and anomalies or areas of interest contained therein.

It is a further object of the present invention to provide a single scanning laser system capable of depth discrimination in an object and/or use in fluorescence microscopy.

It is another object of the present invention to provide very precise means for processing signals representative of light detected from a scanning beam passing through or being reflected from a material or other sample.

SUMMARY OF THE INVENTION

This invention fulfills the above objectives and relates to a scanning laser microscope system for assisting in the characterization of an object, the system comprising:
  a first laser for producing a linearly polarized, substantially collimated, single wavelength beam of light having an axis;
  means for scanning the beam in a raster scanning fashion in a first direction across a scanning plane of the object and in a second direction perpendicular to the first direction across the scanning plane of the object;
  means for enhancing light from the object by increasing contrast between anomalies and a remainder of the object;
  means for detecting light from the enhancing means and for generating electrical signals representative of the intensity of the detected light; and
  means for creating an image representative of the scanning plane of the object from the detected light.

This invention can also be described as a scanning laser microscope system comprising:
  an optical system for scanning a light beam in a raster scanning fashion on a scanning plane of a material;
  means for detecting the beam from the material and for generating signals representative of the intensity of the detected light;
  means for generating pixel clock signals representative of the position of the beam in a first direction on the scanning plane of the material;

means for causing the position of the beam on the material scanning plane in a second direction perpendicular to the first direction to conform to a desired beam position;

means for storing the detected light signals;

means for providing control signals to the storing means based on the pixel clock signals and the desired beam position in the second direction to synchronize the storing means such that the detected light signals are stored in storage locations corresponding to the position of the beam on the material scanning plane; and means for forming the stored signals into an image representative of the material scanning plane.

This invention is further directed to a scanning laser microscope system comprising:

a first laser for producing a first linearly polarized, substantially collimated, single wavelength beam of light having an axis;

means for scanning the beam in a raster scanning fashion in a first direction across a scanning plane of the object and in a second direction perpendicular to the first direction across the scanning plane of the object, wherein the scanning means comprises:

a rotor rotatable about a rotor axis and having a circumferential side with a plurality of reflective facets, the rotor positioned to receive the beam on one of the facets;

means for rotating the rotor to cause the beam axis to scan in the first direction across the scanning plane of the object;

first optical means for directing the beam axis from the rotor at varying angles of incidence to a first point;

a planar mirror rotatable about a mirror axis perpendicular to the rotor axis and intersecting the point, the mirror positioned to receive the beam from the first optical directing means;

a galvanometer connected to the planar mirror to cause the planar mirror to move about the mirror axis and to cause the beam axis to also scan in the second direction across the scanning plane of the object, thereby defining a raster light pattern in a plane perpendicular to the beam axis reflected from the planar mirror;

second optical means for directing the beam axis from the mirror at varying angles of incidence to a second point; and a flat field apochromat objective lens positioned at the second point, the lens for receiving the beam from the second optical directing means and for focusing the beam to the scanning plane of the object;

means for enhancing light from the object;

means for detecting light from the enhancing means and for generating electrical signals representative of the intensity of the detected light; and means for creating an image representative of the scanning plane of the object from the detected light.

BRIEF DESCRIPTION OF THE DRAWINGS

The invention may be more fully understood from the following detailed description thereof taken in connection with accompanying drawings which form a part of this application and in which.

DESCRIPTION OF THE PREFERRED EMBODIMENT(S)

Figure 1:
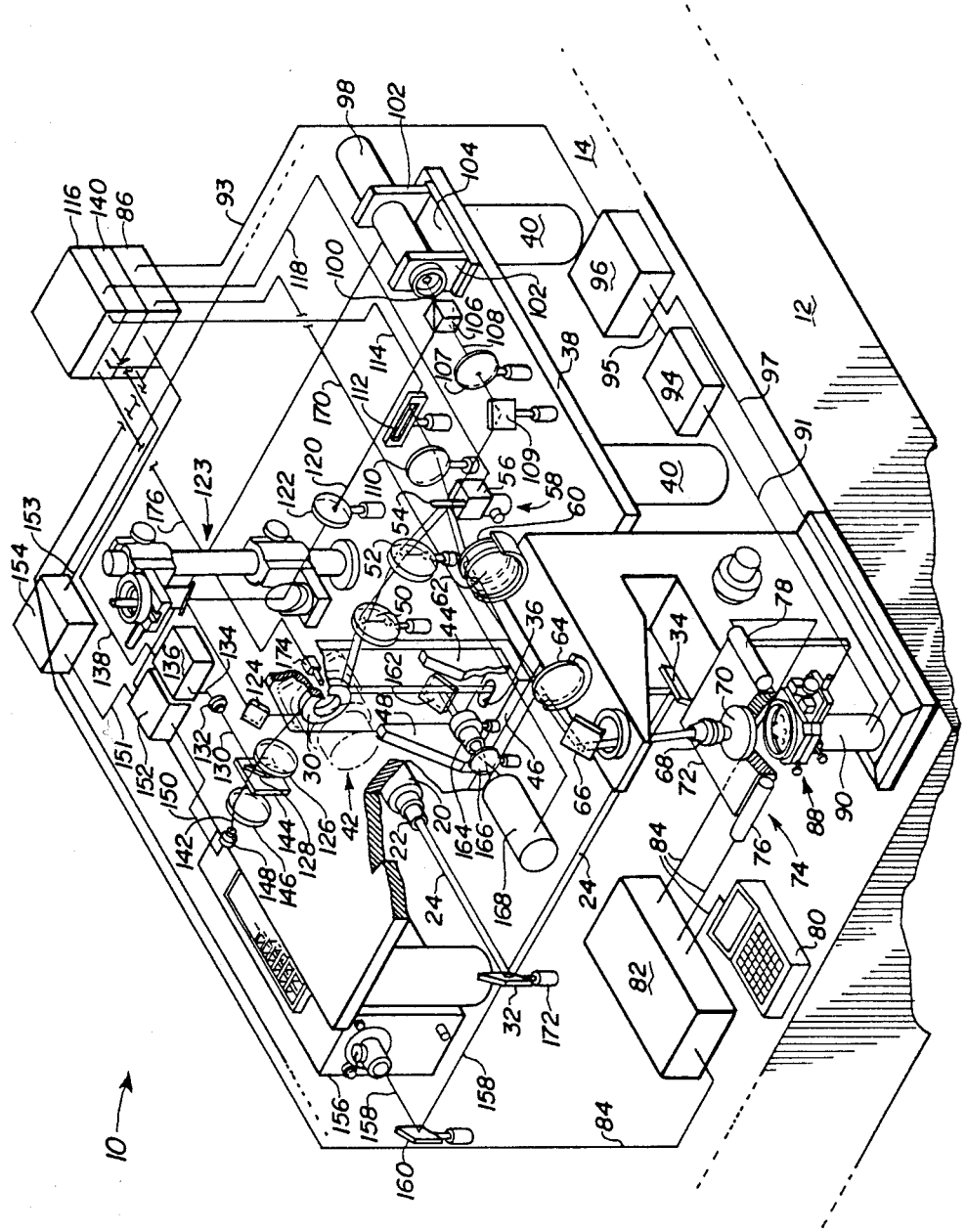
FIG. 1 is a pictorial representation of a scanning laser microscope system of the present invention.

Throughout the following detailed description, similar reference numerals refer to similar elements in all Figures of the drawings.

Referring to FIG. 1, there is shown a pictorial view of a scanning laser microscope system 10 of the present invention. The microscope system 10 is mounted on an optical table 12 designed to minimize and dampen vibrations. The table 12 may comprise a laminate horizontal structure made of solid aluminum top plate portion 14, a bottom plate portion and an aluminum intermediate honeycomb portion. The structure may be mounted on air suspension legs to further minimize potential vibrations.

A first light source 20, such as a helium-neon laser 20, is mounted on the top plate portion 14 of the table 12. Laser model number 3225 H-P from Hughes Aircraft Corporation located in Carlsbad, Calif., has been found satisfactory for this purpose. This laser 20 emits a linearly polarized, substantially collimated, single wavelength beam of light. The wavelength of the beam is 632.8 nanometers which is visibly red with a circular cross section having about a 1 millimeter diameter. A beam expander and collimater assembly 22 is connected to the laser 20 to expand and collimate the diameter of the beam to about 3 millimeters. A 3X Beam Expander, such as model number T81-3X from Newport Corporation located in Fountain Valley, Calif., can be used for this purpose.

The expanded beam 24 is directed on one of a plurality of reflective facets or faces 26 of a circumferential side 28 of a rotatable rotor 30. To reduce space requirements for the microscope system 10, in the preferred embodiment the expanded beam 24 from the laser 20 is first reflected 90 degrees in a horizontal plane by a reflective side of a dichroic beam splitter 32, such as Dichroic Beam Splitter model number 4880T-6328R from CVI Laser Corporation of Albuquerque, N.Mex. The beam 24 from the splitter 32 is reflected 90 degrees vertically up by a mirror 34, such as mirror model number 01MFG007 from Melles Griot located at Rochester, N.Y. From the mirror 34, the beam 24 is reflected through a hole 36 in a plate 38, such as a 24 inch square solid aluminum breadboard plate, and a base plate 46 of the assembly supporting the rotor 30 to one of the reflective facets or faces 26 of the rotor 30. The plate 38 is connected to and supported on the table 12 by four posts 40 spaced apart from one another.

The rotor 30 is part of a galvanometer assembly 42, such as galvanometer assembly number 18875H-23ND-2-100 from Lincoln Laser Corporation of Phoenix, Ariz. This assembly 42 comprises a motor having an shaft, the rotor 30 rotatably supported on the shaft and rotatable by the motor. The motor and rotor 30 are supported in a housing having two windows. One of the two windows allows the beam to pass from the mirror 34 to one of the reflective facets or faces 26 and then to be reflected from the reflective face out of the housing. The second window is generally located in an opposite side of the housing to allow another beam to pass therethrough to another reflective face of the rotor 30 and reflect out of the housing. The housing is mounted, such as by bolts, to a support assembly comprising a vertical plate 44 connected to the base plate 46. The vertical plate 44 and the base plate 46 can be jointed by knees or angle pieces 48.

The beam 24 is reflected from the rotor 30 causing the extreme positions of the beam to move in a vertical (x) direction moving a greater distance in the x direction the farther from the rotor 30.

A relay lens assembly comprising a first biconvex lens 50 and a second biconvex lens 52 is for relaying the beam to a first flat reflective side of a mirror 54. Suitable lens 50 and 52 can be obtained from Melles-Griot Corporation, mentioned before, under part number 01-LDX 115/078. The first biconvex lens 50 focuses the beam 24 to a point moving in the y direction. Equally spaced from the focused point at the midpoint of its scan in the y direction, on the other side of the point than the first lens 50, is the second lens 52 which directs the beam to a stationary spot on the mirror 54 with the angle of incidence of the beam varying as the beam contacts the mirror 54. The circles depicted on the lenses 50 and 52 in FIG. 1 illustrate the extreme x positions of the beam on the respective lenses.

The mirror 54 is connected to a galvanometer or galvo 56 and together they comprise a galvanometer or galvo scanner assembly 58. A suitable galvanometer 56 is available from General Scanning Corporation with offices at Watertown, Mass., under part number G120D. The mirror 54 has a second flat reflective side, parallel to the first reflective side, which will be discussed later. A suitable mirror for this purpose is a double sided first surface mirror being 5 millimeters by 5 millimeters by 1 millimeter (5 mm×5 mm×1 mm) and can be obtained from Spectro-Film Company located at Winchester, Mass. The flat sides are positioned in vertical planes. The galvanometer 56 partially rotates the mirror 54 back and forth (i.e., in one direction and then the opposite direction) about a vertical axis or line passing through the center of the mirror. The center of the beam 24 intersects and is perpendicular to the vertical line. This vertical line is also perpendicular to the axis of the rotor 30. The galvanometer 56 operates in response to electrical control signals from a galvanometer or galvo control module 116 over a cable 118 with two lines.

The back and forth movement of the galvanometer 56 causes the mirror to reflect the beam in a horizontal (y) direction at an angle such that when combined with the motion in the x direction created by the rotor 30 the beam moves in a raster scanning pattern or fashion. The extreme positions of the beam now moves a greater distance in the x and y directions the farther from the mirror 54. Thus, the size of the raster pattern increases with increased distance from mirror 54.

A second relay lens assembly comprising a third, a fourth and a fifth biconvex lens, 60, 62 and 64, respectively, relay the beam to a flat mirror or beam splitter 66. The third lens 60 and fourth lens 62 are for converging the raster scanning pattern to a point. Newport Corporation located at Fountain Valley, California, sells a 63 mm focal length biconvex lens under part number KBX-145AR14 which is suitable for use as the third and fourth lens 60 and 62. The fifth lens 64, such as Newport Corporation part number KBX-163AR.14 having a 176 mm focal length, recollimates the beam after it has been focused to the point by the third and fourth lens 60 and 62. The fifth lens 64 also converges the raster pattern to a stationary spot on a plano-apochromat lens 68 with the angle of incidence of the beam 24 at the spot varying in direction in accordance with the raster pattern. Between the fifth lens 64 and the spot, the mirror or beam splitter 66 is optionally for compactness and convenience located to redirect the beam generally downwards onto the lens 68.

The lens 68 can be a standard microscope objective lens, such as lens number 519692-6.3X.2NA or lens number 519509-40X.75NA from E. Leitz Incorporated of Rockleigh, N.J. The lens 68 converges the beam to a size which is dependent on the magnification factor or numerical aperture (NA) of the particular lens 68 chosen to be used.

After passing through the lens 68, the beam contacts an object or material 70 being analyzed. The microscope system 10 is particularly suited for analyzing a birefringent, partially transparent, material or object, such as an oriented polymer film or a crystalline material such as a wafer of lithium niobate, potassium titanyl phosphate (KTP), barium titanate, or bismuth silicon oxide (BSO).

The object 70 rests over a hole in a movable plate 22 of a scanning stage assembly 74. The assembly 74 includes the plate 72, a first linear positioning assembly 76 including a motor responsive to a positioning sensor for moving the plate 72 in a first (e.g., X) direction, a similar second linearly positioning assembly 78 for moving the plate 72 in a second (e.g., Y) direction perpendicular to the first direction, a scanning stage keypad and display unit 80, and a stage controller module 82 connected by cables or electrical lines 84 to the positioning assemblies 76, 78, the keypad and display unit 80 and a computer system 86. An illustrative scanning stage assembly 74 is available from E. Leitz, Incorporated, at Rockleigh, N.J., under part number M672070 S-2000.

Any portion of the beam from the object, being for instance, refracted, scattered and/or reflected in the process passes through a beam enhancing assembly 88. The assembly 88 is mounted on a photodetector assembly 90 such that light that passes through the beam enhancing assembly 88 is detected by a photomultiplier tube (PMT) in a cylindrical housing. The tube and housing comprise the photodetector assembly 90. An acceptable photodetector assembly 90 for use in the present invention is available from Burle Industries (formerly of RCA) located at Lancaster, Pa. under part number 8645R.

The photomultiplier tube (PMT) converts the sensed light to electrical signals representative of the sensed light and sends the signals through a line 91, such as a coaxially shielded cable, to a preamplifying module 94, a photomultiplier control module 96, and then through a line 93, such as a coaxially shielded cable, to the computer 86.

A second light source 98 is supported on the plate 38 by supports 102 on a base plate 104. A similar mounting arrangement can be used to connect the first light source 20 to the table 12. The second light source 98 can be a helium-neon laser, such as model number 3221 H-P from Hughes Aircraft Corporation. Such a laser 98 emits a substantially collimated beam 100 of light one millimeter in diameter. The source 98 is positioned to direct the beam substantially parallel to a top surface of the plate 38 through a beam splitter 106, such as cube beam splitter 03-BSC-009 from Melles Griot, previously mentioned. A first portion 108 of the beam 100 passes substantially straight through the splitter 106 and a first beam stop 107 with an adjustable iris to block scattered light to a flat mirror 109 that redirects the beam portion 108 onto the second flat reflective side of the mirror 54. The mirror 54 driven by the galvanometer 56 causes the beam portion 108 to move in a horizontal plane in a scanning fashion.

Then the beam portion 108 passes through a sixth biconvex lens 110, like the first lens 50, which focuses the beam portion 108 to a point. The point moving in the horizontal plane is directed onto a light position sensor 112, such as a position sensor PS-100-500 from Quatrad of El Segundo, Calif.

The movement of the beam portion 108 on the sensor 112 is analogous to the movement in one direction of beam 24 on the object 70. The sensor 112 converts the sensed light to electrical signals representative of the position of the light on the sensor 112 and provides these signals through a cable 114 with 3 lines to a galvanometer control module 116.

The second laser 98, the beam stop 107, the mirror 109, the galvanometer or galvo 56, the second side of mirror 54, the sixth lens 110, the sensor 112 and the galvanometer control module 116 serve as an optically coupled servo system.

A second portion 120 of beam 100 is split from the first portion 108 by the splitter 106. The second beam portion 120 passes through a second beam stop 122, like the first beam stop 107, to a beam steering instrument, like that sold by Newport Corporation, previously mentioned, under model number 675, to a flat mirror 124, through the second window in the housing of the galvanometer assembly 42 onto another one of the reflective faces of the rotor 30. The rotor 30 reflects the second beam portion 120 out the second window causing the second beam portion 120 to move in a vertical (x) direction. Then the second beam portion 120 passes through a seventh biconvex lens 126 to a second beam splitter 128 which splits and directs a third beam portion 130 to a dual photo detector or sensor 132, such as BiCell SD-113-24-21-021 split photodetector from Silicon Detector Corporation located at Newbury Park, Calif. Sensor 132 provides electrical signals indicating passage of the beam across a first portion and then a second portion of the sensor 132. These signals are sent over a line 134 to a scan detection circuit 136. The scan detection circuit 136 provides electrical signals over a line 138 to the computer system 86 and to a frame or image storage control module 140.

A fourth beam portion 142 passes substantially straight through the second beam splitter 128 to a ronchi ruling 144 that has, for instance, 50 lines per inch. As the fourth beam portion 142 moves across the ronchi ruling 144, it modulates the scanning fourth beam portion 142 by blocking the light then allowing it to pass through in a repeating off and then on pattern. Then the modulated fourth beam portion 142 passes through an eighth biconvex lens 146 to a pixel clock light sensor 148. This sensor 148 produces an electrical signal proportional to the intensity of the detected light. Any sensor that achieves this purpose can be used, but silicon photodetector SD-172-12-22-221 from Silicon Detector Corporation, mentioned before, has been found to be satisfactory. A cable 150 transmits information from the sensor 148 to a preamplifier circuit 152, a pixel clock module 154, and then the frame storage control module 140.

A start of rotation detector 174, such as photosensor model no. S351G from Skan-A-Matic Corporation with offices at Elbridge, N.Y., detects the existence of a black mark on the rotor 30 and sends a signal indicating the passing of the mark past the detector 174 through a cable 176 to the frame storage control module 140.

A third light source 156 can be provided that can be used instead of the first light source 20. The third light source 156 should provide light similar to the first source 20 and be tunable to multiple different wavelengths. One such source is an Argon-Ion laser Model 65 from Lexel Corporation located at Freemont, Calif. One wavelength this particular laser emits is 488 nanometers which is visibly blue. The third source 156 can be positioned on the table 12 to project a beam 158 to a flat mirror 160 which reflects the beam 158 to pass through the beam splitter 32 replacing the beam 24 from the first light source 20.

A confocal arrangement may optionally be included in the microscope system 10. A confocal arrangement in the scanning laser microscope 10 permits the detection of light at multiple focal layers in a sample, storage of signals representative of the detected light and three dimensional image reconstructions of the signals.

The confocal arrangement may include a beam splitter 162 positioned in the path of beam 24 between the base plate 46 and the galvanometer assembly 42; a microscope objective lens 164, like lens 68; a pin hole aperture 166; and a light sensor 168, such as photomultiplier 8850 from Burle Industries, previously mentioned, connected by a line 170 to a computer. Beam 24 from the first light source 20 passes through the beam splitter 162 to the rotor ultimately to the lens 68 as described before. A portion of the beam 24 will be reflected off the object and retrace its path in the opposite direction through the lens 68, off the mirror or beam splitter 66, through the lenses 64, 62 and 60, off the mirror 54, through the lenses 52 and 60, off the rotor, to the beam splitter 162 which reflects a portion of the reflected beam through the lens 164 and the pin hole aperture 166 to the sensor 168. The sensor 168 produces an electrical signal that is a function of the reflectivity of the object 70. This signal is amplified by a preamplifying module 94' (not depicted) and controlled by a photomultiplier control module 96' (not depicted) before it is received by the computer system 86. These modules 94' and 96' can be identical to the modules 94 and 96, respectively.

Length adjustable holders 172 can position and support the aforesaid parts, i.e., the lens, beam splitters, mirrors, pin hole aperture, ronchi ruling, and sensors, on the support plates. Newport Corporation, previously mentioned, provides holders VPH-3 or VPH4 which are suitable for this purpose.

Figure 2:
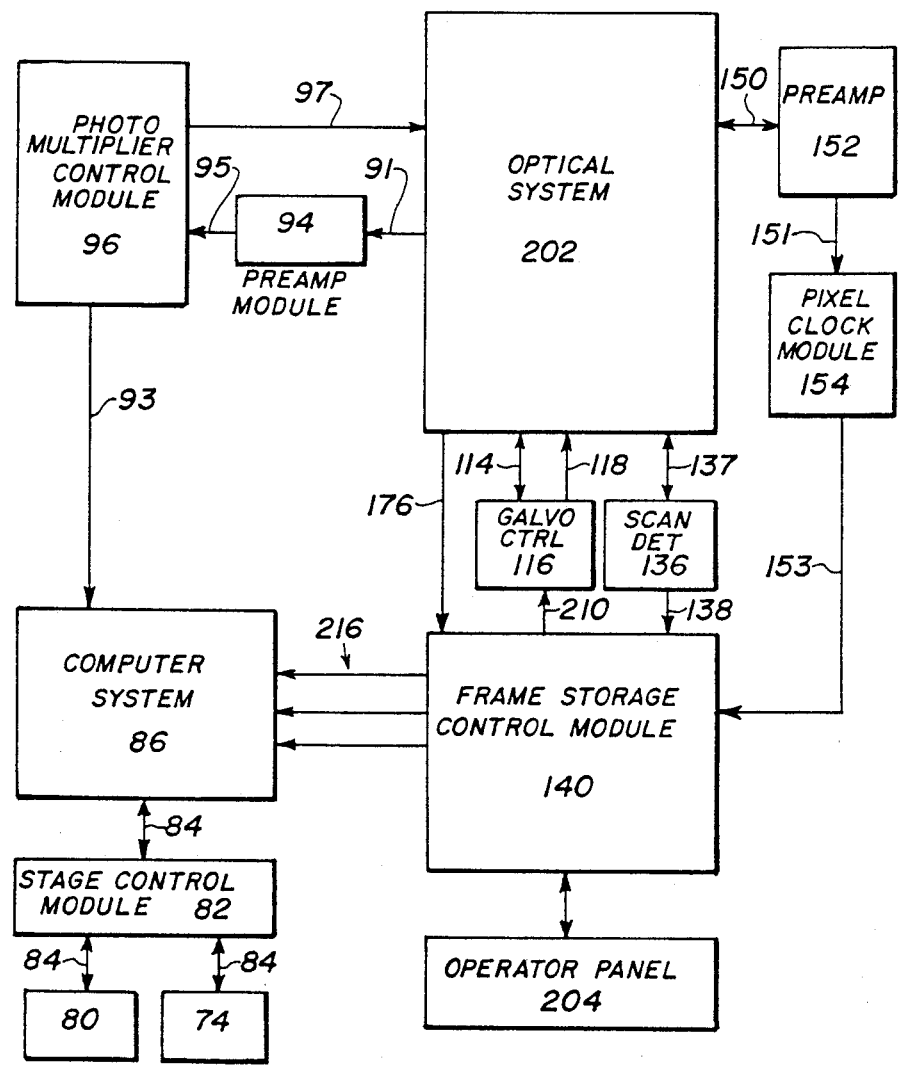
FIG. 2 is a block diagram of the system illustrated in FIG. 1.

FIG. 2 depicts a simplified block diagram of the scanning laser microscope system 10 shown in FIG. 1 with duplicate parts omitted for clarity. Referring to FIG. 2, the system 10 includes an optical system 202 (as described above), the preamplifying module 94, the photomultiplier control module 96, the computer system 86, the stage control module 82, the scanning stage keypad and display unit 80, the scanning stage assembly 74, the galvo control module 116, the scan detection circuit 136, the preamplifier circuit 152, the pixel clock module 154, the frame storage control module 140, and an operator panel 204.

The optical system 202, specifically the light sensor 148 within the optical system 202, is connected by the cable 150 for sending signals to and for receiving bias voltage from the preamplifier circuit 152. The preamplifier circuit 152 is connected by the line 151 for sending signals to the pixel clock module 154. The pixel clock module 154 is connected by the line 153 for sending signals to the frame storage control module 140.

The optical system 202, specifically the dual photo sensor 132, is connected by a cable 137 for sending signals to and for receiving bias voltage from the scan detection circuit 136. The scan detection circuit 136 is connected by the line 138 for sending signals to the frame storage control module 140.

The optical system 202, specifically the position sensor 112, is connected by the cable 114 for sending signals to and for receiving bias voltage from the galvanometer control module 116. The galvanometer control module 116 is connected by the cable 118 for sending drive current to the galvanometer assembly 58. The galvanometer control module 116 is also connected by a line 210 for receiving signals from the frame storage control module 140.

The optical system 202, specifically the start of rotation detector 174, is connected by the cable 176 for sending signals to and receiving power from the frame storage control module 140.

The optical system 202, specifically the photodetector assembly 90, is connected by the line 91 for sending signals to the preamplifying module 94 which in turn is connected by the line 95 for sending signals to the photomultiplier control module 96. The photomultiplier control module 96 is connected by the line 97 for sending control voltage to the optical system 202, specifically the photodetector assembly 90. The photomultiplier control module 96 is also connected by the line 93 for sending detected light or VIDEO signals to the computer system 86.

The computer system 86 is connected by a cable 84 for communicating with the stage control module 82 which in turn is connected by cables 84 to the scanning stage assembly 74 and the scanning stage keypad and display unit 80. The computer system 86 is also connected by lines 216 for receiving signals from the frame storage control module 140.

The frame storage control module 140 is also connected by lines for sending signals to and for receiving signals from an operator panel 204.

Figure 3:
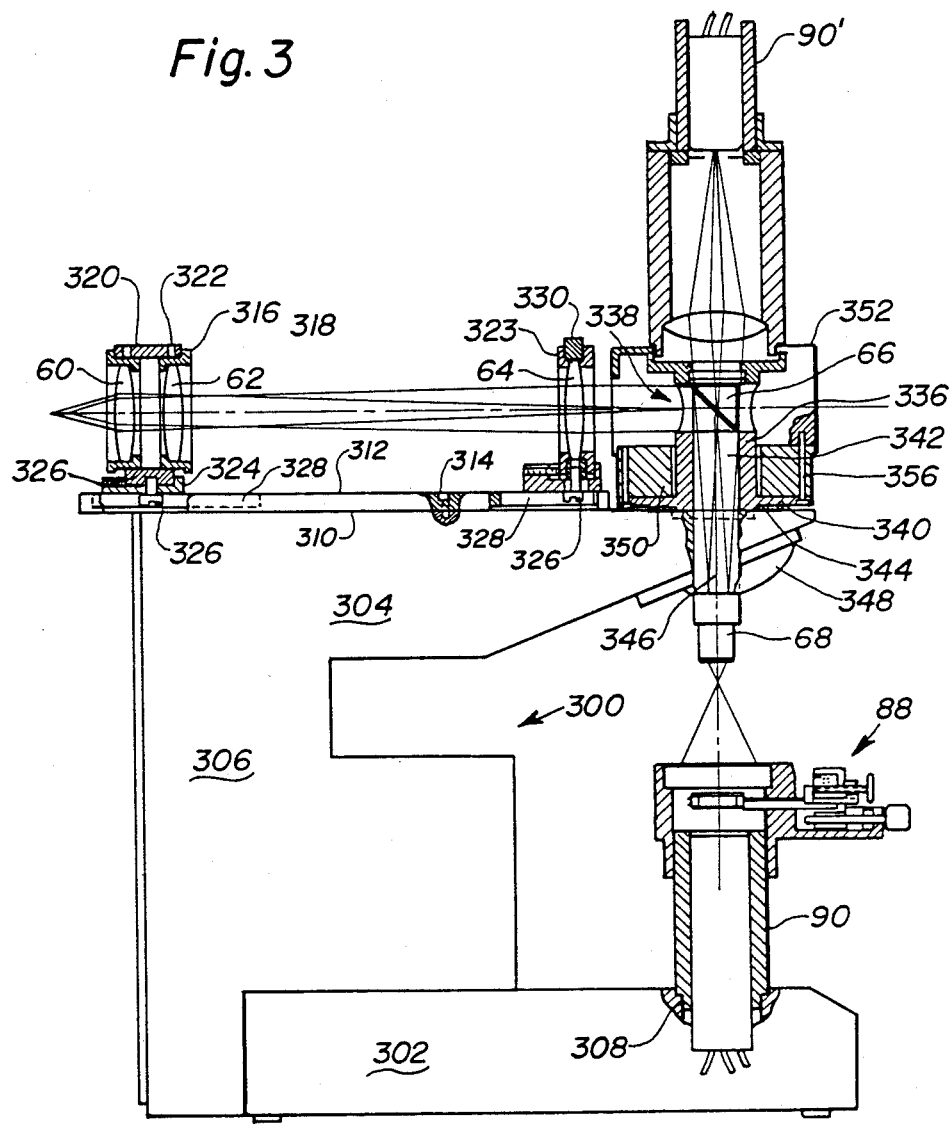
FIG. 3 is a detailed side view of a modified microscope base with certain parts shown in section as used in the preferred embodiment of the present invention.

Referring to FIG. 3, there is illustrated a detailed side view of a modified microscope base 300 with certain parts shown in section and other parts omitted for clarity as used in the preferred embodiment of the present invention. The base 300 has a lower portion 302 connected to an upper portion 304 by an intermediate portion 306. The photodetector assembly 90 is mounted partially recessed in a hole 308 in the lower portion 302. The upper portion 304 has a top surface 310. A track 312 is connected to the top surface 310, such as by one or more screws 314. The track 312 is for supporting the third, fourth and fifth biconvex lenses 60, 62 and 64.

Any means can be used to support the lenses on the track 312. FIG. 3 shows lenses 60 and 62 held in cylindrical lens holders 316 by retaining rings 318 such as a c-ring. Referring to FIG. 3, the lens holders 316 are connected to a cylindrical support 320 by set screws 322. Lens 64 is held in a cylindrical support 330 by retaining rings or pieces 323. The supports 320 and 330 are connected to clamps 324 by screws 326. The clamps 324 are positionable along and connect to the track 312. When either one of the clamps 324 is moved along the track 312, a head of one of the screws 326 holding the support to the clamp 324 moves in a clearance slot 328 in the track 312.

The mirror or beam splitter 66 is supported within a cylindrical wall 336 having an opening 338 and a lower flange 340. The cylindrical wall 336 surrounds a passage 342. The flange 340 rests on a dovetail holding fixture 344 around the passage 342. A passage 346 in the upper portion 304 connects the passage 342 to the plano-apochromat microscope objective lens 68. The lens 68 can be one of a plurality of lenses on a rotatable turret assembly 348. A spacer ring shaped block 350 fits around the cylindrical wall 336 and on the flange 340. A housing 352 is positioned on the spacer block 350 over the mirror 66. Screws 356 connect the flange 340, the spacer block 350 and the housing 352 together. The thicknesses of the fixture 344 and the block 350 and the flange 340 are chosen to align the mirror or beam splitter 66 to intercept the beam 24 from the lens 64 and direct it to the plano-apochromat microscope objective lens 68. The top surface 310 of the base 300 can have different levels to help align the parts. For instance, in FIG. 3 the top surface 310 has a lower portion in which the fixture 344 is partially recessed and a higher portion upon which the track 312 is mounted.

A second enhancing assembly 88 can be located above the beam splitter 66 to receive light reflected from the object after the reflected light has passed through the passage 346, the passage 342 and the beam splitter 66. The preferred embodiment for this second enhancing assembly 88 is illustrated in FIG. 6B. Another photodetector assembly 90' is positioned to receive the reflected light from the second enhancing means 88. The another photodetector assembly 90' can be identical to the assembly 90. Further, the signal from the assembly 90' is similarly sent to a preamplifying module 94" (like modules 94 and 94'), a photodetector control module 96" (like modules 96 and 96') and then the computer system 86, specifically, for instance, to a frame buffer 278.

Figure 3A:
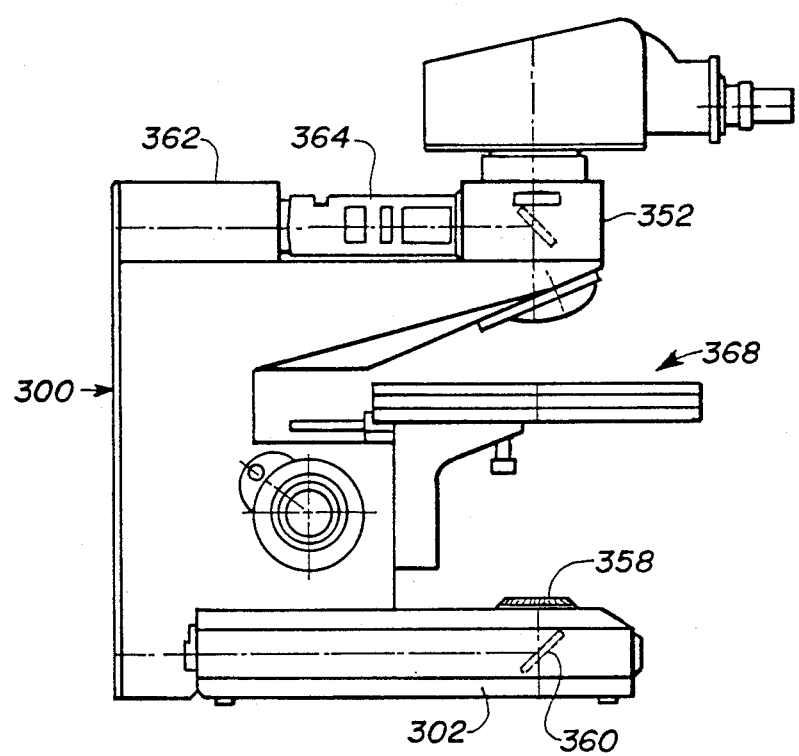
FIG. 3A is a side view of a commercially available microscope that can be modified for use as illustrated in FIG. 3.

Referring to FIG. 3A, there is shown a side view of a microscope, such as available from E. Leitz, Incorporated, under model name Ergolux, that can be modified for use as illustrated in FIG. 3. The microscope includes the lower portion 302 with the hole 308. A light source (not depicted) and a mirror 360 are typically mounted in the lower portion 302 and aligned to direct light from the light source through a lens 358 mounted in the hole 308. For the purposes of the present invention, the light source, the mirror 360 and the lens 358 can be removed and then the photodetector assembly 90 is mounted partially recessed in the hole 308.

The microscope further includes an illumination assembly 362, a filter assembly 364 and the housing mounted on the top portion 304 of the base 300. For the purposes of the present invention, the illumination assembly 362 and the filter assembly 364 are removed, the top surface 310 is machined flat to accept track 312, and the housing 352 is repositioned as described above.

The microscope further includes a stage assembly 368 and a top and eye piece 366 which can be removed for the purposes of the present invention. The computer controllable scanning stage assembly 74 described before can be substituted for the typical stage assembly 368.

Figure 4:
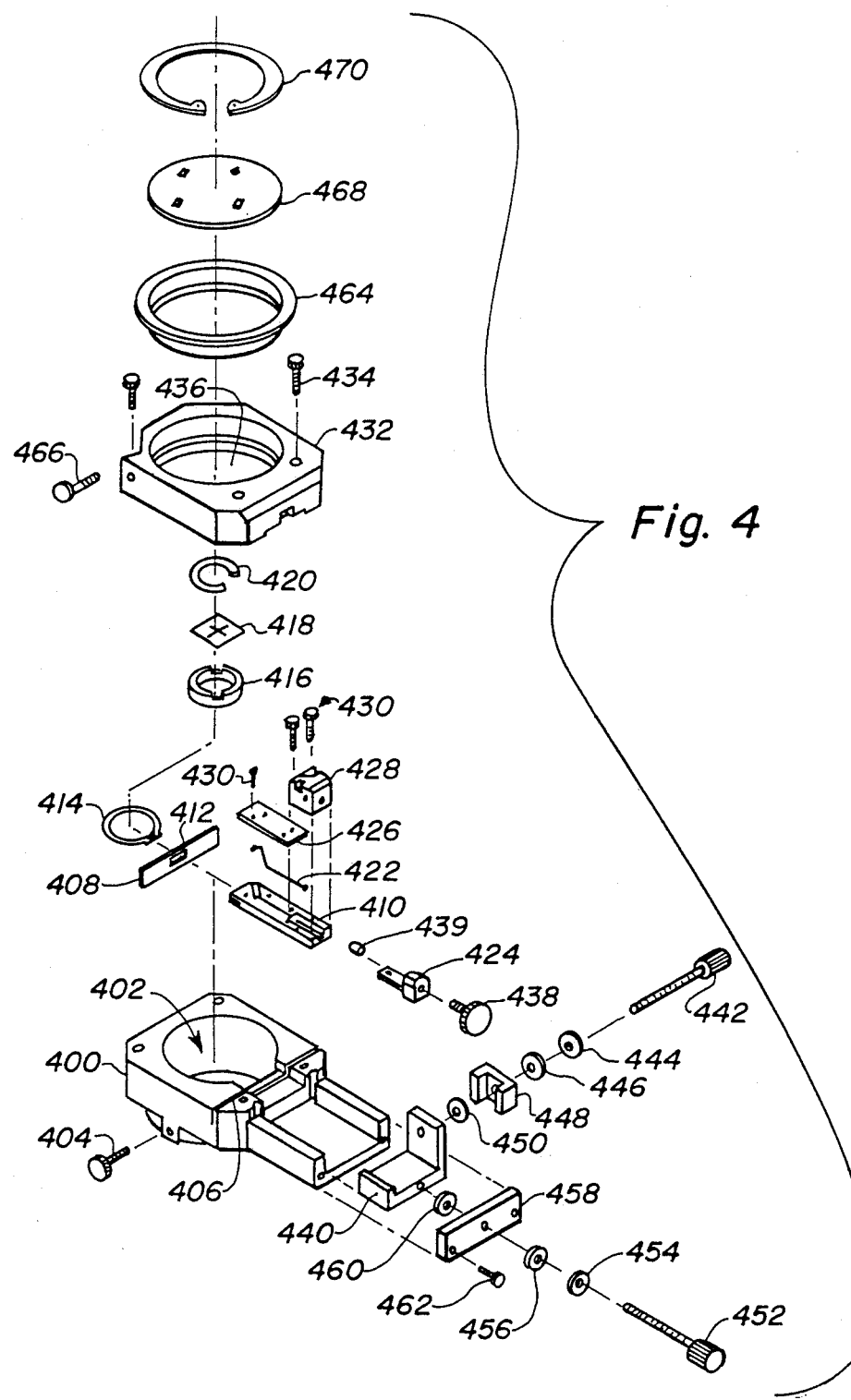
FIG. 4 is an exploded pictorial view of a first embodiment of a beam enhancing assembly in accordance with the present invention.
Figure 4A:
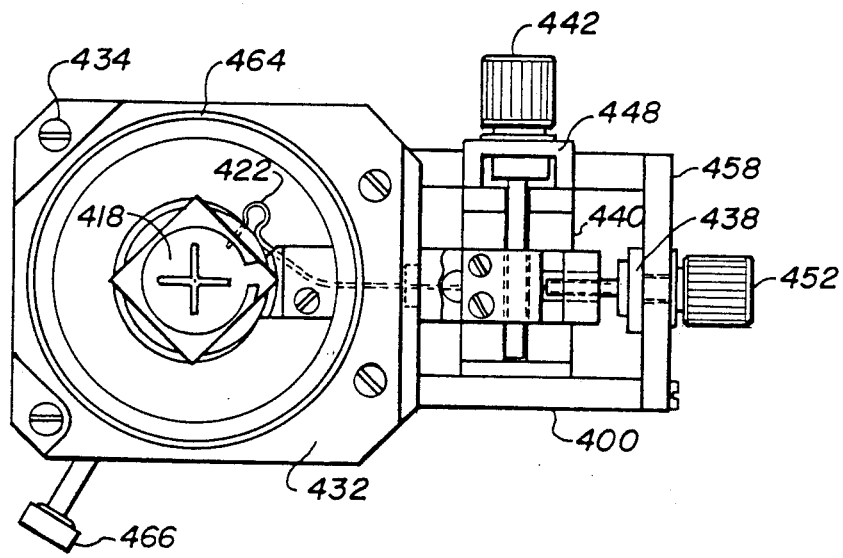
FIG. 4A is a top view of the beam enhancing assembly of FIG. 4 when it is fully assembled.

Referring to FIGS. 4 and 4A, there is illustrated a first embodiment 88' of the beam enhancing assembly 88 in accordance with the present invention. This first beam enhancing assembly 88' comprises a lower housing 400 having a cylindrical opening or passage 402 for receiving and rotatably mounting on the photodetector assembly 90. A thumb screw 404 is provided to threadably pass through a hole in the lower housing 400 to fasten the housing 400 to the assembly 90.

The housing 400 has a slot 406 for receiving a light shield or support plate 408 linearly slidable in the slot 406. A track piece 410 extends in and is slidable through a generally rectangular hole 412 in the support plate 408. A ring or holder seat 414 is bonded in a slot, such as by epoxy, at one end of the track piece 410 that extends into the lower housing cylindrical opening 402. The ring 414 sets in a groove around a cylindrical filter holder 416 which is rotatable in the ring 414. A spatial filter 418 rests in notches in one end of the filter holder 416. A C-ring 420 holds the filter 418 in the holder 416. The spatial filter 418 has an aperture shaped to substantially match a uniform intensity level area in an interference pattern formed when linearly polarized substantially monochromatic light is transmitted through the object 70. In one preferred embodiment the spatial filter 418 can be a metal reticle having a cross or plus shaped aperture. Suitable for use is metal reticle 70.1045 from Rolyn Optics Company of Covina, Calif.

An actuating wire or member 422 is slidably positioned in a groove in the track piece 410. A first end of the actuating wire 422 connects to the filter holder 416. A second end of the wire 422 is bonded, such as with epoxy in a hole of a slider 424 which is also slidably positioned in a groove of the track piece. The first end of the wire 422 is connected to the filter holder 416 by a hook in the wire fitting into a hole in holder 416. The grooves in the track piece 410 and the tire 422 are angularly shaped such that when the slider 424 is moved towards the wire 422 the first end of the wire 422 is pushed generally in a direction that it is angled from a longitudinal axis of the track piece 410.

A retaining plate 426 and a clamp 428 are fastened to the track piece 410 by screw 430 covering part of the wire 422 and the slider 424. An upper housing 432 connects to the lower housing 400 by screws 434. The upper housing 432 has a cylindrical passage 436 which is concentric with the lower housing opening 402 when connected together.

A screw 438 is retained in the slider 424 by a retaining collar 439 bonded to the screw 438. The screw 438 threadably engages the clamp 428 such that when the screw 438 is turned the slider 424 and the wire 422 slide in the groove of the track piece 410. This in turn moves the end of the wire 422 connected to the holder 416 rotating the holder 416 in the ring 414.

A slidable holder 440 slidably rests in a groove of the lower housing 400. A screw 442 passes through a biasing spacer 444, a washer 446, and a support bracket 448. Then the screw 442 engages a retaining collar 450 that is bonded to the screw 442. The screw 442 then passes through the slidable holder 440 and is threadably connected to the clamp 428. When the screw 442 is turned, it moves the clamp 428, the track piece 410, the support plate 408 in the slot 406, the ring 414, the holder 416 and the filter 418, all as a single structure in a first linear direction.

A screw 452 passes through a biasing spacer 454, a washer 456, and an end plate 458 which is secured to the lower housing 400 by screws 462. Then the screw 452 engages a retaining collar 460 (that is bonded to the screw 452). Then the screw 452 passes through the end plate 458 and is threadably connected to the slidable holder 440. Thus, when the screw 452 is turned, it moves the holder 440, the clamp 428, the track piece 410 through the hole 412, the ring 414, the holder 416, and the filter 418, all as a single structure in a second linear direction which is perpendicular to the first linear direction.

A polarizing filter holder 464 is fastened in one end of the upper housing passage 436 by a thumb screw 466. A polarizing filter 468 is held in a passage of the filter holder 464 by a C-ring.

The first beam enhancing assembly 88', as just described and illustrated in FIGS. 4 and 4A, is capable of passing light rays through the variably positionable cross shaped opening and blocking all other light rays from the assembly 90. Further, the filter 418 is adjustably positionable in two perpendicular linear directions and in an angular direction.

The assembly 88' is particularly useful when detecting light from a birefringent object and more particularly a birefringent, partially transparent object. The cross shape of the aperture in the filter 418 allows a large uniform portion of a typical light interference pattern caused by passing polarized light through a birefringent material to be detected by the assembly 90. The portion of light that passes through the cross shaped aperture has been found to contain increased anomaly information concerning the object structure which produces remarkably clear signals detectable by the assembly 90 as compared to prior art microscopes including prior laser scanning microscope systems.

Figure 5A:
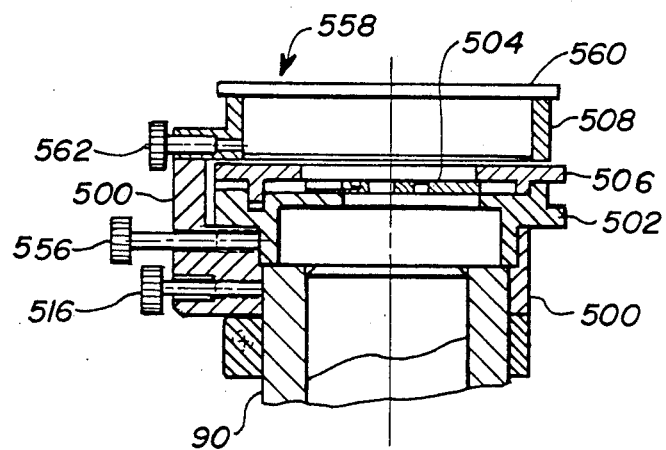
FIG. 5A is a cross section side view of the beam enhancing assembly of FIG. 5 when it is fully assembled.
Figure 5:
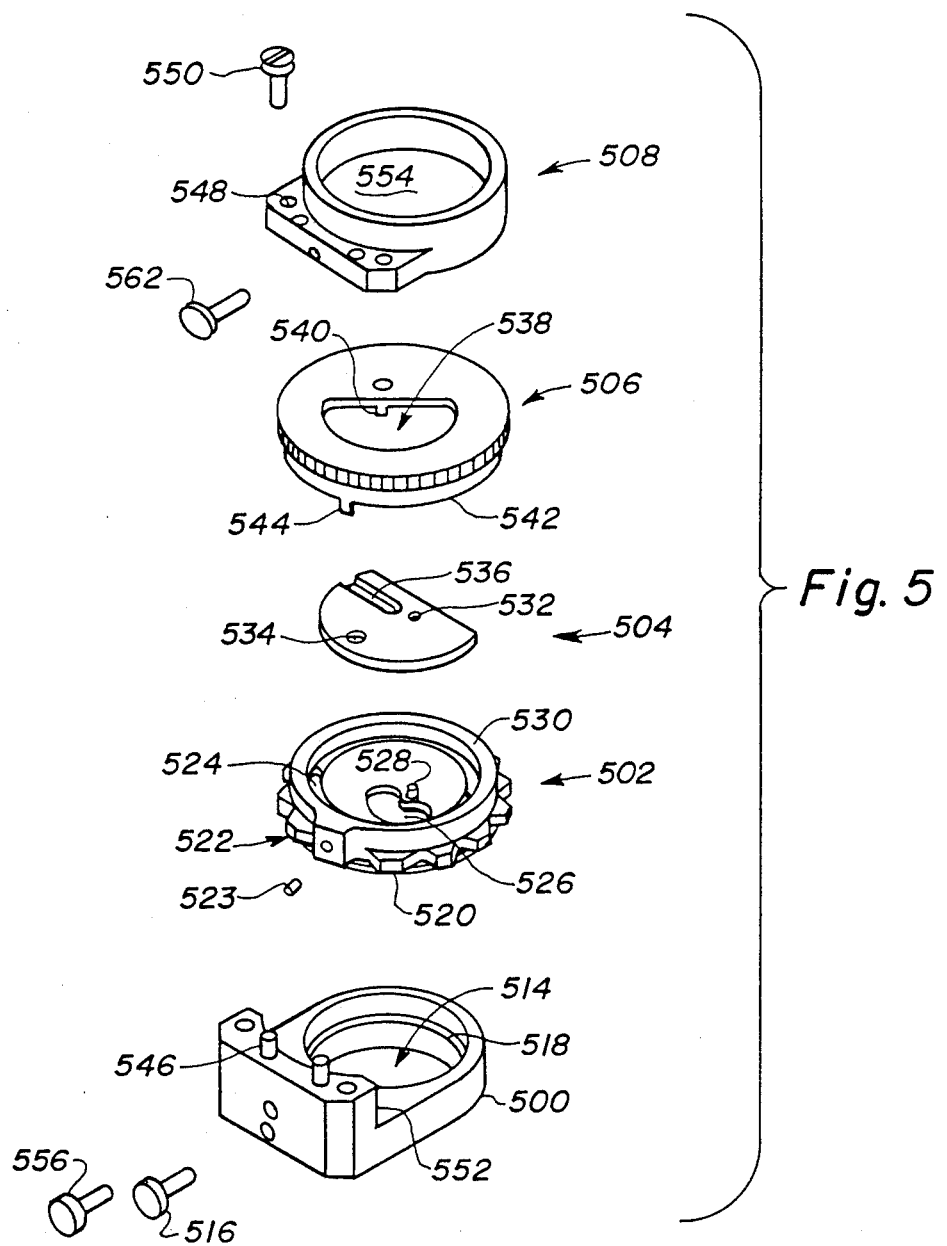
FIG. 5 is an exploded pictorial view of a second embodiment of a beam enhancing assembly in accordance with the present invention.

Referring to FIGS. 5 and 5A, there is illustrated a second embodiment 88" of the beam enhancing assembly 88 in accordance with the present invention. This second beam enhancing assembly 88" has a longitudinal axis 501 and comprises, from bottom to top, a base 500, a rotatable holder 502, a spatial filter plate, 504, a rotatable disk 506, a support 508, a filter holder 510, and a polarizing filter 512.

The base 500 has a cylindrical passage 514 for rotatably mounting on the photodetector assembly 90. A thumb screw 516 can fix the base 500 to the assembly 90. The passage 514 has a shoulder 518 for receiving a lower portion 520 of the holder 502.

The holder 502 is generally shaped as a disk having a lower portion 520; a middle portion including circumferential grips 522, an annular groove 524, an optical aperture 526 and an off center pin 528 extending up; and an upper ring portion 530. A thumb screw 556 fixes the base 500 to the holder 502.

The spatial filter plate 504 has an off center hole 532 for receiving the pin 528. The plate 504 further has an upper radial groove 536 and an optical aperture 534, which is smaller than the holder optical aperture 526, for aligning above the holder optical aperture 526. The filter plate aperture 534 can be any shape desired, but for purposes of illustration it is depicted as circular. The filter plate 504 is smaller than the holder 502, such that when the pin 528 of the holder 502 is in the hole 532 of the filter plate 504, the filter plate 504 does not extend radially to the annular groove 524 through most of the filter plate's rotation about the pin 528 and the filter plate 504 does not extend above the ring portion 530. A nylon tipped set screw 523 can be used to increase friction between the holder 502 and the rotatable disk 506.

The rotatable disk 506 has circumferential grips and an optical aperture 538 larger than and alignable above the filter plate aperture 534 and the holder aperture 526. The disk 506 further has an off center downwardly projecting pin 540 and a lower shoulder 542 with a downwardly projecting tang 544 on the shoulder 542. Although the tang 544 is illustrated in FIG. 5, in reality the tang 544 would not been seen in the FIG. 5 perspective. In FIG. 5, the tang 544 is actually connected to the shoulder 542 about at the point farthest from the viewer. The pin 540 extends into the filter plate radial groove 536. The tang 544 extends into the holder annular groove 524.

The support 508 has a cylindrical passage 554 coaxial with the base passage 514 and alignment holes 548 for receiving locating pins 546 on the base 500. Screws 550 secure the support 508 to the base 500. The base 500 has a step 552 for providing a space between the support 508 and the remainder of the base 500 for rotatably trapping the holder 502, the plate 504 and the disk 506 therebetween.

A polarizing filter 558 in a holder 560 is secured by a thumb screw 562 within the support passage 554.

When the holder 502, the filter plate 504 and the disk 506 are stationary, the passage of light through the assembly 88" is limited by the filter plate aperture 534 because it is the smallest one of the three apertures. Further, the spatial or optical apertures 538, 534, and 526 are always aligned permitting light to pass through the filter plate aperture 534 regardless of where it is located. The position of the filter plate aperture 534 is moved by rotating the assembly 88" with respect to the assembly 90 or by rotating one or both of the disk 506 or the holder 502 with respect to the base 500.

When the disk 506 is rotated clockwise looking down in FIGS. 5 and 5A until it stops rotating with respect to the holder 502, the filter plate aperture 534 is symmetric about the axis 501 of the assembly 88", the tang 544 is at a first end of the annular groove 524, and the pin 540 is close to the axis 501. From this position, if the disk 506 is rotated counterclockwise looking down in FIGS. 5 and 5A with respect to the holder 502, the filter plate aperture 534 moves in an arc away from the axis 501, the tang 544 moves along the annular groove 524 away from its first end towards its second end, and the pin 538 moves along the groove 536 away from the axis 501. The disk 506 stops rotating counterclockwise with respect to the holder 502 when the tang 544 contacts the second end of the annular groove 524. At any position of the filter plate aperture 534 along the arc, the disk 506 and the the holder 502 can be rotated in unison to cause the filter plate aperture 534 to rotate about the axis 501.

The second beam enhancing assembly 88", as just described and illustrated in FIGS. 5 and 5A, is capable of blocking light from entering into the photodetector assembly 90, except for light rays passing through the optical apertures 538, 534, and 526. Like the enhancing assembly 88', the enhancing assembly 88" is particularly useful when viewing a birefringent object. In addition, this assembly 88" is particularly useful in detecting rays caused by absorptive foreign bodies in the object and scattering anomalies.

Figure 6:
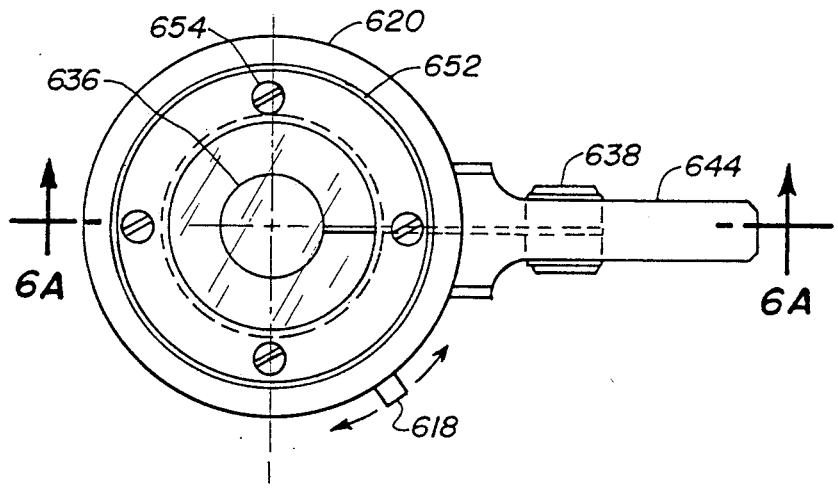
FIG. 6 is a top view of a third embodiment of a beam enhancing assembly in accordance with the present invention.
Figure 6A:
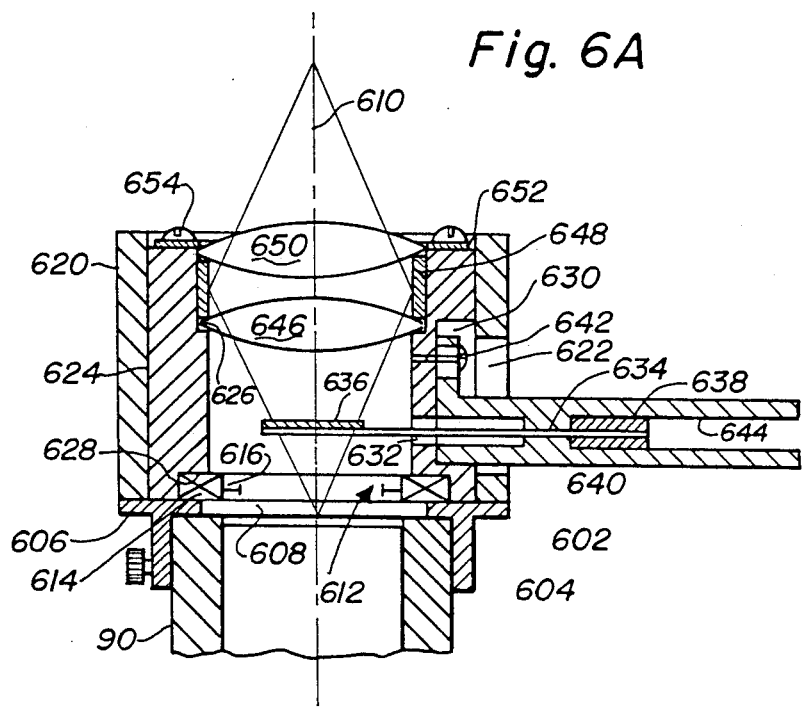
FIG. 6A is a cross sectional side view taken along the line A-A in the direction of the arrows in FIG. 6.
Figure 6B:
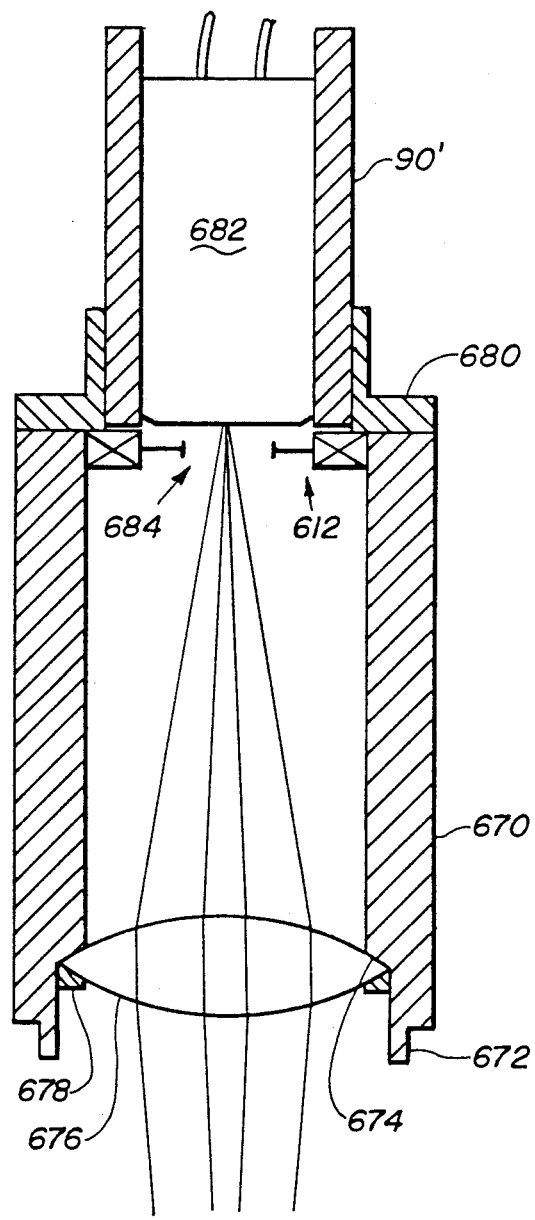
FIG. 6B is a cross sectional side view of a fourth embodiment of a beam enhancing assembly in accordance with the present invention.

Referring to FIGS. 6 and 6A, there is illustrated a third embodiment 88'" of the beam enhancing assembly 88 in accordance with the present invention. This third beam enhancing assembly 88'" comprises a base 602 including a cylindrical portion 604 for mounting on the photodetector assembly 90. The cylindrical portion 604 is connected to a support plate portion 606 having a circular passage 608 through it about an axis 610 for allowing light to enter the photodetector assembly 90.

An iris diaphragm assembly 612, such as assembly model no. 75.0175 from Rolyn Optics Company, is on the support plate portion 606. The iris diaphragm assembly 612 includes a frame 614 from which a shutter or iris diaphragm 616 extends to and from the axis 610 providing a variable aperture with a diameter that is adjustable by an actuating arm 618.

A cylindrical housing 620 with a window 622 and open ends is connected at one of its ends to the plate portion 606. A sleeve support 624 is positioned within the housing 620. The sleeve support 624 has two ends, an internal upper shoulder 626 and an internal lower shoulder 628. One of the ends of the sleeve support 624 contacts the plate portion 606. The iris diaphragm assembly 612 is held in position by and between the internal lower shoulder 628 and the internal lower shoulder 628. The sleeve support 624 has a recess 630 in its outer surface and a hole 632 in the recess 630. The recess 630 is aligned with the window 622. The cylindrical housing 620 can be secured to the base 602 by screws, epoxy or any other suitable means. The sleeve support 624 can be secured to the housing 620 by screws, epoxy or any other suitable means.

A rod or arm 634 passes through the window 622, the recess 630 and the hole 632 such that a first end of the rod 634 extends inside the sleeve support 624 and a second end of the rod 634 extends outside the cylindrical housing 620. The first end of the rod 634 supports a light blocking black disk or member 636 generally perpendicular to the axis 610. The disk 636 can be circular in shape. A grip 638 is attached to the second end of the rod 634. The sleeve support 624 includes a rod or arm support 640 which extends through the window 622 and into the recess 630 and is mounted on the sleeve support 624 by pairs 642 of screws and washers. The rod 634 is slidably supported in a passage, in a light tight manner, in the support 640. Arms 644 of the support 640 positioned above and below the grip 638 prevent the rod 634 from rotating.

A first biconvex lens 646 is supported on the internal upper shoulder 626 of the sleeve support 624. A cylindrical spacer 648, which can be any material such as plastic, is positioned inside and contacting the sleeve 624 on the first biconvex lens 646. A second biconvex lens 650 rests on the spacer 648. An annular retaining plate 652 is mounted to the top end of the sleeve 624 by screws 654 to secure the lenses 646, 650 and spacer 648 within the sleeve 624.

The third beam enhancing assembly 88''', as just described and illustrated in FIGS. 6 and 6A, is particularly useful for detecting light scattered by the object 70. The disk 636 is linearly positionable within the sleeve 624 by moving the grip 638. The disk 636 is angularly positionable within the sleeve 624 by rotating the base 602 with respect to the assembly 90. As such, the disk 636 and the iris diaphragm 616 can be positioned so that light which is unaffected by the object 70 will be blocked and not pass to the assembly 90. In such a case, light scattered by the object will be detected by the assembly 90. The disk 636 and the iris diaphragm 616 can be positioned with respect to each other such that an annular or ring shaped aperture is jointly defined by the disk 636 and the iris diaphragm 616.

Referring to FIG. 6B, there is illustrated a fourth embodiment 88'''' of the beam enhancing assembly 88 in accordance with the present invention. This fourth beam enhancing assembly 88'''' comprises a base 680 including a cylindrical portion for mounting on the photodetector assembly 90'. The cylindrical portion is connected to an annular support plate portion.

One end of a cylindrical wall 670 is connected to the annular support plate portion of the base 680. Another iris diaphragm or spatial filter assembly 612, like the one described in relation to FIGS. 6 and 6A, is located in the cylindrical wall 670 adjacent the base annular support plate portion.

The other end of the cylindrical wall 670 has a ring shaped projection 672 for inserting into a recessed area of the housing 352. See FIG. 3.

The cylindrical wall 670 has an internal shoulder 674 near its other end, the end with the projection 672. A biconvex lens 676 is held against the shoulder 674 by a holder 678, such as a C-ring. The lens 676 is positioned to focus light reflected from the object 70 through the variable aperture of the iris diaphragm assembly 612 to an area on the photomultiplier tube 682 of the photodetector assembly 90'. As mentioned before, the signal representative of light reflected from the object is sent to a preamplifying module 94'' (not depicted), to a photodetector control module 96'' (not depicted) and then the computer system 86, specifically, for instance, to the frame buffer 278.

The fourth beam enhancing assembly 88'''' allows a greater amount of light reflected from the object 70 to be detected than through use of the confocal arrangement previously described in relation to FIG. 1.

Figure 6C:
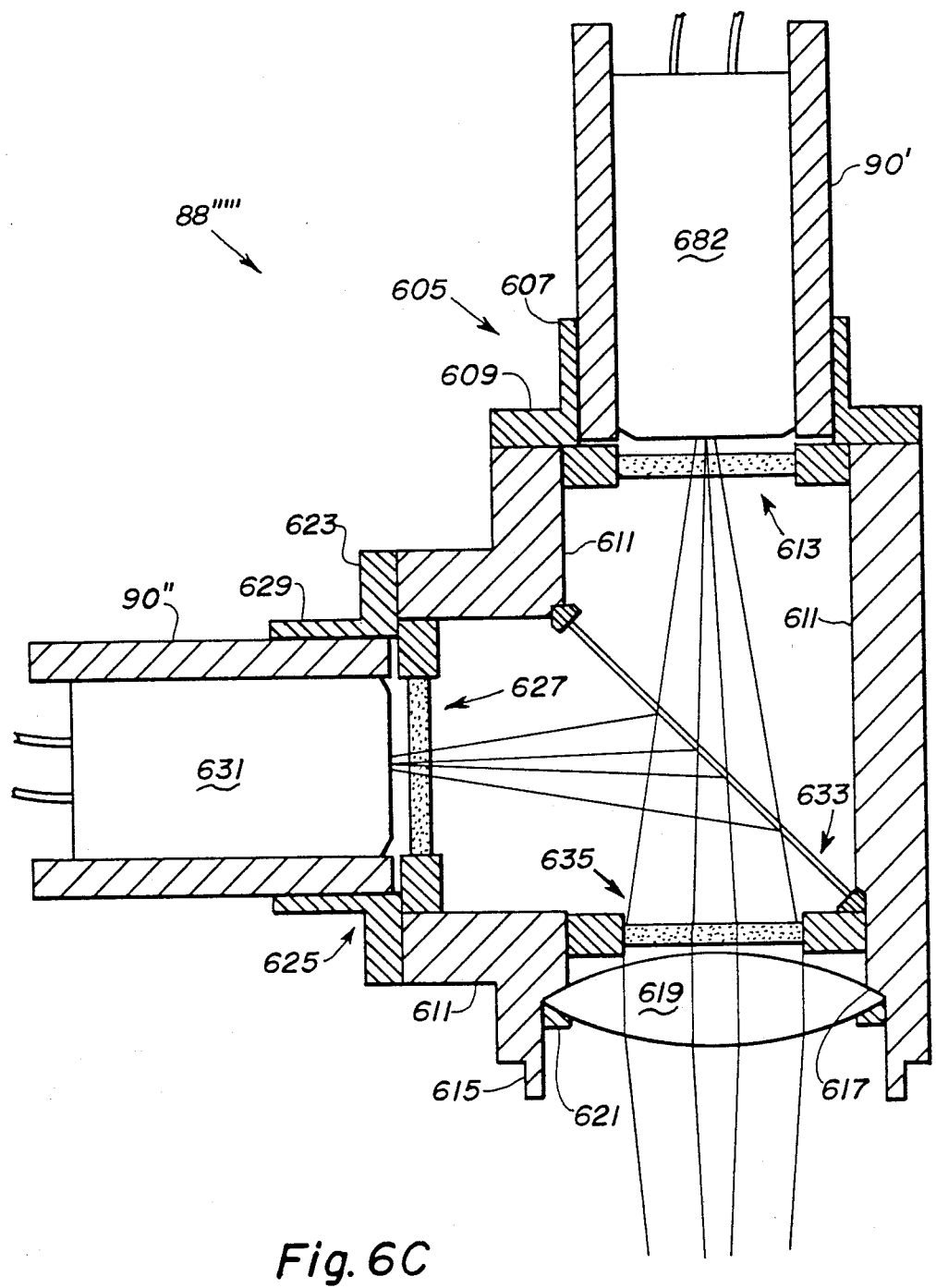
FiG. 6C is a cross sectional side view of a fifth embodiment of a beam enhancing assembly in accordance with the present invention.

Referring to FIG. 6C, there is illustrated a fifth embodiment 88''''' of the beam enhancing assembly 88 in accordance with the present invention. This fifth beam enhancing assembly 88''''' is the same as the fourth beam enhancing assembly 88'''' as described above, except a wavelength selective filter is secured between the object and the photomultiplier tube instead of an iris diaphragm assembly.

More specifically, the fifth team enhancing assembly 88''''' comprises a base 605 including a cylindrical portion 607 for mounting on the photodetector assembly 90' The cylindrical portion 606 is connected to an annular support plate portion 609.

One end of a tubular connector or housing 611 is connected to the annular support plate portion 609 of the base 605. A wavelength selective filter assembly 613 is located in the tubular connector 611 between a biconvex lens 619 and the photomultiplier tube 682. The wavelength selective filter assembly can comprise a first band pass filter assembly 613 adjacent the photodetector assembly 90', a second band pass filter assembly 635 adjacent the lens 619 and/or a dichroic beam splitter assembly 633.

A second end of the tubular connector 611 has a ring shaped projection 615 for inserting into a recessed area of the housing 352. See FIG. 3.

The tubular connector 611 has an internal shoulder 617 near its second end. The biconvex lens 619 is held against the shoulder 617 by a holder 621, such as a C-ring. The lens 619 is positioned to focus light reflected from the object 70 through the wavelength selective filter 613 to an area on the photomultiplier tube 682 of the photodetector assembly 90'. As mentioned before, the signal representative of light reflected from the object is sent to a preamplifying module 94'' (not depicted), to a photodetector control module 96'' (not depicted) and then the computer system 86, specifically, for instance, to the frame buffer 278.

The tubular connector 611 can have a third end connected to an annular support plate portion 623 of a base 625. Another band pass filter assembly 627 can be located in the tubular connector 611 adjacent the base annular support plate portion 623. The base 625 has a cylindrical portion 629 for mounting on a photodetector assembly 90″ including a photomultiplier tube 631 which is electrically connected to a preamplifying module 94‴ (not depicted), then to a photodetector control module 96‴ (not depicted) and then to the computer system 86, specifically, for instance, to the frame buffer 278.

The dichroic beam splitter assembly 633 allows wavelengths either above or below a certain wavelength to pass through the dichroic beam splitter assembly 633 through the band pass filter assembly 613 to an area on the photomultiplier tube 682 of the photodetector assembly 90′ and reflects all other wavelengths through the band pass filter assembly 627 to an area on the photomultiplier tube 631 of the photodetector assembly 90″.

Figure 6D:
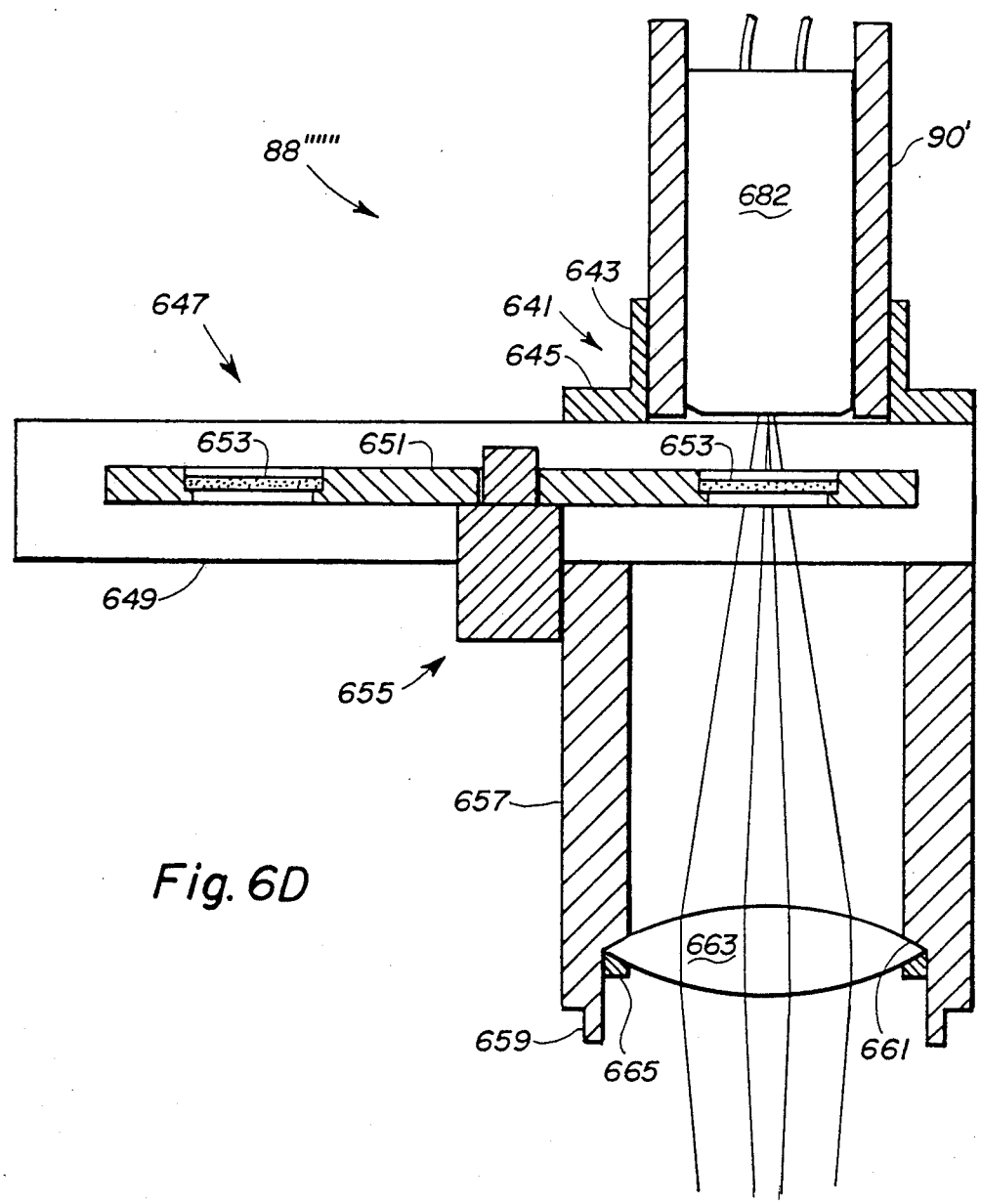
FIG. 6D is a cross sectional side view of a sixth embodiment of a beam enhancing assembly in accordance with the present invention.

Referring to FIG. 6D, there is illustrated a sixth embodiment 88‴‴ of the beam enhancing assembly 88 in accordance with the present invention. This sixth beam enhancing assembly 88‴‴ comprises a base 641 including a cylindrical portion 643 for mounting on the photodetector assembly 90′. The cylindrical portion 643 is connected to an annular support plate portion 645.

A wavelength selective filter assembly, such as a band pass filter assembly 647, is connected to the annular support plate portion 645. the band pass filter assembly 647 comprises a housing 647, a disk 651 rotatable about an axis, a plurality of band pass filters 653 mounted in the disk 651 at an equal radial distance from the disk axis of rotation, and a motor assembly 655 supported by the housing 647 to rotate the disk 651 within the housing 647 to selectively position any one of the band pass filters 653 in the path of light detected by the photodetector assembly 90′. Each of the filters 653 permits a different range of light wavelenths to pass through it and blocks all other wavelengths. A suitable band pass filter assembly 647 can be purchased under model number 77371 from Oriel Corporation with offices in Statford, Conn. The motor assembly 655 can be connected to the computer system 86 such that an operator can select by inputting through a keyboard the particular band of light wavelengths desired to be detected by the photodetector assembly 90′, thus, selecting and rotating the corresponding filter 653 to be positioned in front of the photodetector assembly 90′.

One end of a cylindrical wall 657 is connected to the housing 647. The other end of the cylindrical wall 657 has a ring shaped projection 659 for inserting into a recessed area of the housing 352. See FIG. 3.

The cylindrical wall 657 has an internal shoulder 661 near its other end, the end with the projection 659. A biconvex lens 663 is held against the shoulder 661 by a holder 665, such as a C-ring. The lens 663 is positioned to focus light reflected from the object 70 through the selected filter 653 of the filter assembly 647 to an area on the photomultiplier tube 682 of the photodetector assembly 90′. As mentioned before, the signal representative of light reflected from the object is sent to a preamplifying module 94″ (not depicted), to a photodetector control module 96″ (not depicted) and then the computer system 86, specifically, for instance, to the frame buffer 278.

The fifth and sixth beam enhancing assemblies 88‴″, 88‴‴ are used for luminescence microscopy. The emission of light by certain objects is called luminescence. There are different kinds of luminescence. First, fluorecence is light which is emitted practically simultaneously with the introduction of an excitation energy and which ceases as soon as the exciting radiation ceases. Second, phosphorescence is light which is emitted and persists some time after excitation is removed. For instance, laser 20 or laser 156 can be chosen to emit a beam 24 of light that stimulates, excites or causes an object 70 or particles in an object to fluoresce or emit light. The wavelength selective filter assemblies 613 and 647 are chosen to block all light from passing through them including the wavelength(s) of the laser beam 24 and allows only the fluorescent wavelengths being excited and emitted by the object to be detected by the corresponding photodetector assembly. Furthermore, laser 20 and laser 156 can be chosen to simultaneously emit beams of light that stimulate, excite or cause an object 70 or particles in an object to fluoresce or emit different wavelengths of light. These different wavelengths can be simultaneously or sequentially detected by different photodetector assemblies in the same enhancing assembly 88, such as in enhancing assembly 88‴‴, and/or by different photodetector assemblies in different enhancing assemblies 88, such as having an enhancing assembly 88‴‴ connected between the photodetector assembly 90′ and the housing 352 in FIG. 3 and a second enhancing assembly 88‴‴ connected between the photodetector assembly 168 and the beam stop 166 in FIG. 1.

Thus, the scanning laser microscope system 10 may serve the additional function of exciting fluorescent molecules in the object 70. When used for florescence microscopy, the light detected by the photomultiplier tube and the image formed represent only the fluorescent portion of the object. Since only very specific wavelengths will be absorbed or emitted by a particular fluorescent molecule, such as a fluorophore, the laser and the wavelength selective filters must be chosen to allow detection of the emitted fluorescence.

The object 70 may be of biological or other origin. The fluorescence may be due to fluorophores naturally present in the object, or the object may be treated with fluorescent molecules to label desired components in the sample. Other types cf luminescence, such as, bioluminescence and chemiluminescence, do not require excitation by a light source to emit light.

The scanning laser microscope system 10 in fluorescence mode may be used for the detection, enumeration, and analysis of fluorescently labeled bacteria, yeast, molds, and microbial spores. Any method that fluorescently labels microorganisms may be used, including treatment with direct fluorescent reagents, fluorescent tagged antibodies or lectins for immunofluorescence or lectin fluorescence assays, or fluorescent vital stains as indicators of viability. Fluorescently labeled microorganisms may be placed on any appropriate surface for scanning.

Microorganisms isolated from food and beverage samples, sanitation swabs, or clinical samples such as urine may be fluorescently labeled for detection, enumeration, and/or determination of viability. This approach may be used in place of, or in addition to, traditional methods, including growing microorganisms on selective, nutrient media and other physiological/biochemical methods.

Furthermore, the word anomalies as used herein is intended to include to include fluorescent molecules, particles or materials of biological or non-biological origin.

Two Examples are provided below. Example 1 is provided to show that in its fluorescence mode the scanning laser microscope system 10 may be used for detection, enumeration, and analysis of microorganisms directly stained with a fluorescent reagent. Example 2 is provided to show that specific microorganisms in a sample may be fluorescently labeled and then detected, enumerated, and analyzed using the scanning laser microscope system 10 of the present invention.

EXAMPLE 1

An aliquot of a yeast culture such as Candida vini (available from American Type Culture Collection (ATCC), under ATCC number 18823, Rockville, Md.) in nutrient Bacto YM broth (available from Difco Laboratories, Detroit, Mich.) was vacuum filtered onto a black polycarbonate filter (available from Nuclepore Corporation, Pleasanton, Calif.). The filter is rinsed with several milliliters (mls) of 0.2 molar (M) phosphate buffered saline (PBS), pH 7.0. The vacuum was removed, and the filter was overlayed with a fluorescent stain, acridine orange (available from Sigma Chemical, St. Louis, Mo.) (50 micrograms ($\mu$g) per ml of PBS, pH 7.0), for 15 minutes. Vacuum was reapplied, and the filter was rinsed in succession with several mls of PBS, 100% iso-propanol to remove excess stain bound to the filter, and again with PBS. The filter was air-dried and placed on top of a glass microscope slide with a drop of non-fluorescent immersion oil and a cover slip.

An argon ion laser 156 operating at 488 nanometers (nm) wavelength scanned the sample. A long pass absorbance filter 613 with a sharp cut-off at 530 nm, number 51300 from Oriel Corporation, Stratford, Conn., was placed before the photomultiplier tube (PMT) 682 to absorb the reflected laser light and pass the fluorescence light.

This Example 1 shows that a culture may be directly stained with a fluorescent reagent, such as a vital stain which may be an indicator of cell viability, and that direct staining of microorganisms may be used for detection, enumeration, and analysis of microorganisms in a sample using the scanning laser microscope system 10 of the present invention.

EXAMPLE 2

In an indirect immunofluorescence assay (IFA), a target microorganism is labeled with a primary, nonconjugated antibody specific for microorganisms containing the target surface antigen. Microorganisms with bound antibody are fluorescently labeled using a fluorescein isothiocyanate-conjugated (FITC) secondary antibody which recognizes the primary antibody. The labeled microorganisms may be placed on an appropriate surface and imaged using the scanning laser microscope. As in Example 1, an argon ion laser 156 operating at 488 nm wavelength scans the sample. A long pass absorbance filter 613 with a sharp cut-off at 530 nm, number 51300 from Oriel Corporation, is placed before the PMT 682 to absorb the reflected laser light and pass the fluorescence light.

The success of this method is largely dependent on the selectivity and cross-reactivity of the antibodies used. Primary and secondary antibodies with low affinity may prevent enough FITC-conjugated secondary antibody from binding to allow for detection of labeled microorganisms. Antibodies with high cross-reactivity will cause a high background fluorescence, thus decrease the probability of selectively detecting the desired microorganisms.

To show that microorganisms labeled with FITC-conjugated antibodies could be detected with the scanning laser microscope system 10, a sample of yeast cells was directly stained with FITC reagent and scanned. A 10 ml sample of a yeast culture Torulopsis sonorensis (ATCC number 56511, American Type Culture Collection, Rockville, Md.) grown overnight in nutrient YM broth (available from Difco Laboratories) was placed in a 15 ml centrifuge tube. The culture was centrifuged for 10 minutes at 3000 g to form a yeast pellet. The eluent was removed, and the pellet resuspended in 10 ml of 0.1 M carbonate/bicarbonate buffer, pH 9.2. The yeast sample was washed in this manner 3 times.

Two ml of the resuspended yeast cells were placed in a second 15 ml centrifuge tube, mixed with 0.4 ml of FITC reagent (10 milligrams (mg) per ml of 0.1 M carbonate/bicarbonate buffer, pH 9.2), and kept in the dark for 30 minutes. Excess FITC was removed by washing 3 times with 2 mls of the buffer by centrifugation. The FITC-labeled yeast cells were vacuum filtered onto a black polycarbonate filter (available from Nuclepore Corporation) and washed with 10 ml of the buffer. The filter was airdried and placed on top of a glass microscope slide with a drop of non-fluorescent immersion oil and a cover slip.

An argon ion laser 156 operating at 488 nm wavelength scanned the sample. A long pass absorbance filter 613 with a sharp cut-off at 530 nm, number 51300 from Oriel Corporation, was placed before the PMT 682 to absorb the reflected laser light and pass the fluorescence light.

The FITC-labeled yeast cells were successfully imaged on the scanning laser microscope system 10. Since FITC is a common light emitting tag being bound to the antibody in an immunofluorescence assay or a lectin in a lectin fluroescence assay, specific microorganisms in a sample may be detected, enumerated, and analyzed using assays in which microorganisms are labeled with antibodies or lectins conjugated to a light emitting tag, such as FITC, with the scanning laser microscope system 10 of the present invention.

Any one of the above described enhancing assemblies 88', 88'', 88''', 88'''', 88''''' and 88'''''' can be connected in the position illustrated in FIG. 1 for the enhancing assembly 88, in which case the assembly 88 receives light transmitted through and emitted from the object 70. In addition, any one of the above described enhancing assemblies 88', 88'', 88''', 88'''', 88''''' and 88'''''' can be connected between the photodetector assembly 90' and the housing 352 as illustrated in FIG. 3, in which case the assembly 88 receives light reflected and emitted from the object 70. In addition, any one of the above described enhancing assemblies 88', 88'', 88''', 88'''', 88''''' and 88'''''' can be connected between the photodetector assembly 168 and the beam stop 166 (see FIG. 3), in which case the assembly 88 receives light reflected and emitted from the object 70 in a confocal arrangement.

Figure 7:
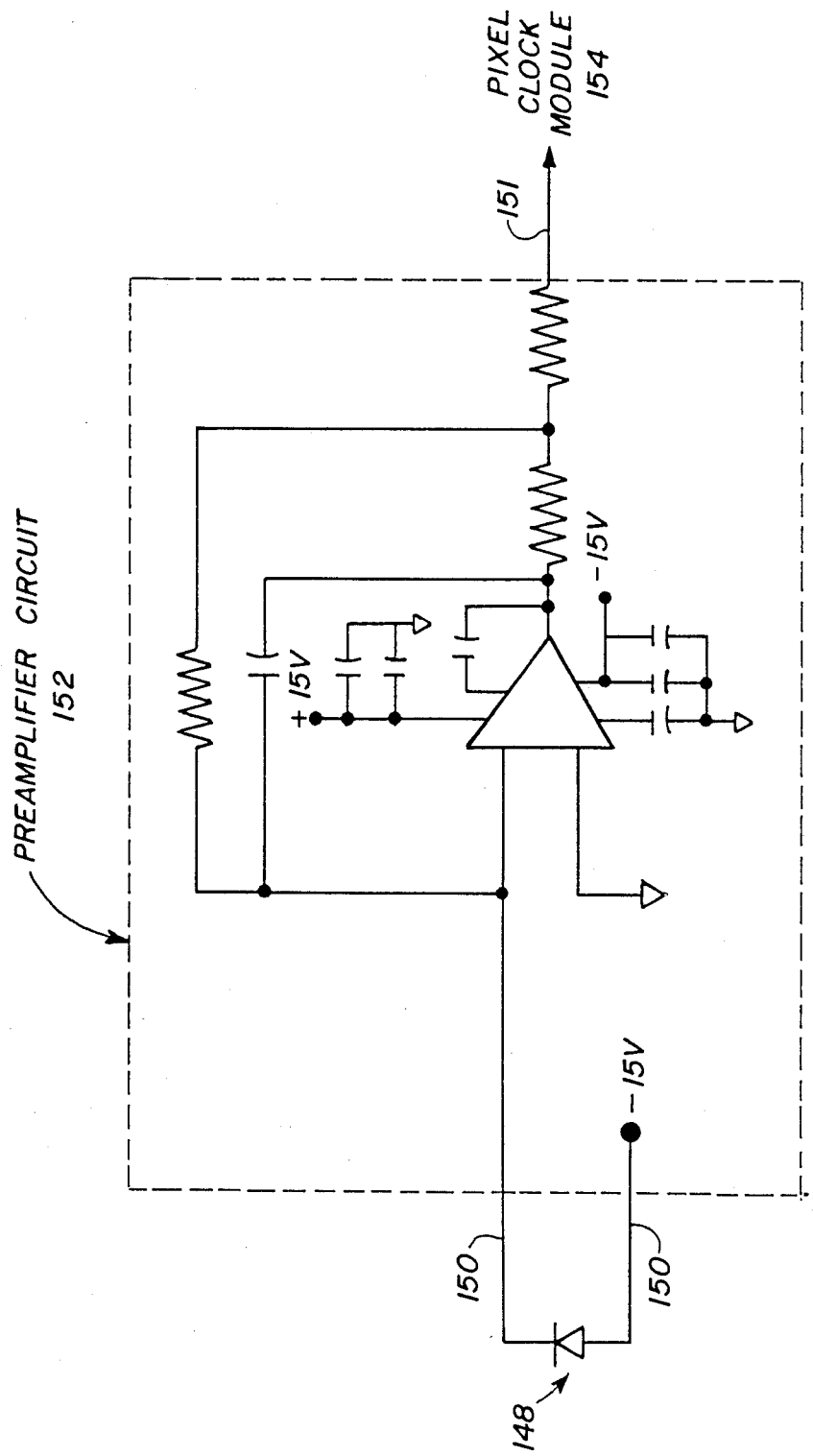
FIG. 7 illustrates a preferred embodiment of a preamplifier circuit for use in the system of FIGS. 1 and 2.

Referring to FIG. 7, there is illustrated a preferred embodiment of the preamplifier circuit 152 capable of use in the system of FIGS. 1 and 2. The purpose of the preamplifier circuit 152 is to convert a current mode output of the photodetector 148 into a voltage signal of a level useable by the pixel clock module 154. Although the circuit of FIG. 7 is a preferred embodiment, any circuit that serves this purpose can be used. When the preamplifier circuit 152 depicted in FIG. 7 is used, the photodetector 148 is operated in a reverse biased mode as is well known in the art. This preferred preamplifier circuit 152 is similar to and can be further understood by reference to the circuit particularly described in Integrated Circuits Data Handbook, Burr-Brown Corporation, Chapter 1, page 189, 1986.

The preamplifying module 94 can be similarly configured to the aforedescribed preamplifier circuit 152. However, in FIGS. 1 and 2, the photomultiplier module 96 provides the high voltage to the photodetector assembly 90. One skilled in the art having this disclosure before him can design numerous preamplifying circuits or modules capable of use for circuit 152 and module 94 in the present system.

Figure 8:
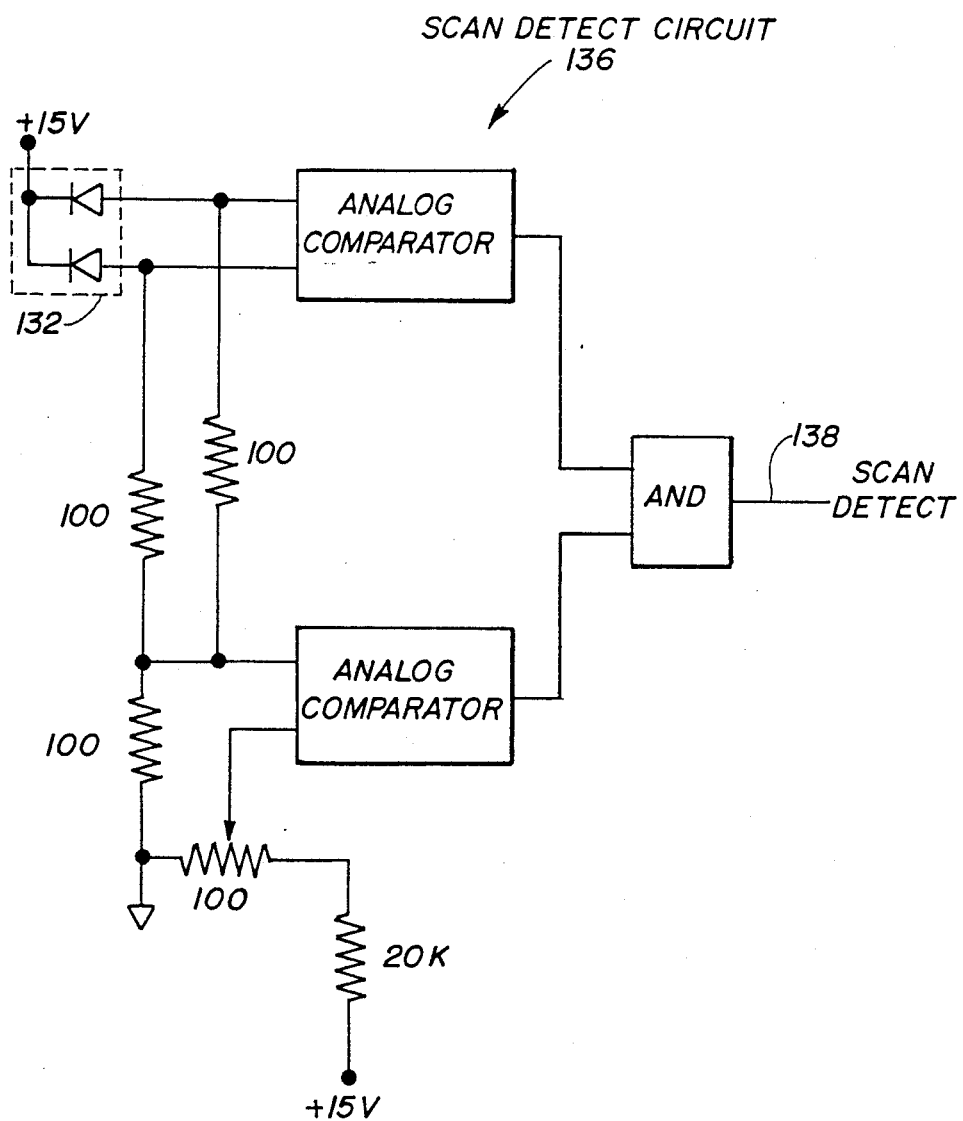
FIG. 8 depicts a preferred embodiment of a scan detection circuit for use in the system of FIGS. 1 and 2.

FIG. 8 depicts a preferred embodiment of the scan detection circuit 136 suitable for use in the system of FIGS. 1 and 2. For a detailed description of this scan detection circuit, see Laser Applications, Volume 4, edited by Goodman and Ross, pages 171-173, 1980. The circuit depicted in FIG. 8 illustrates a preferred embodiment of the scan detection circuit useable in the present invention. However, any circuit may be used as long as it can provide signals to the frame storage control module 140 indicating the precise position of the beam 24 on the object 70 at the beginning of each scan of the beam across the object.

Figure 9:
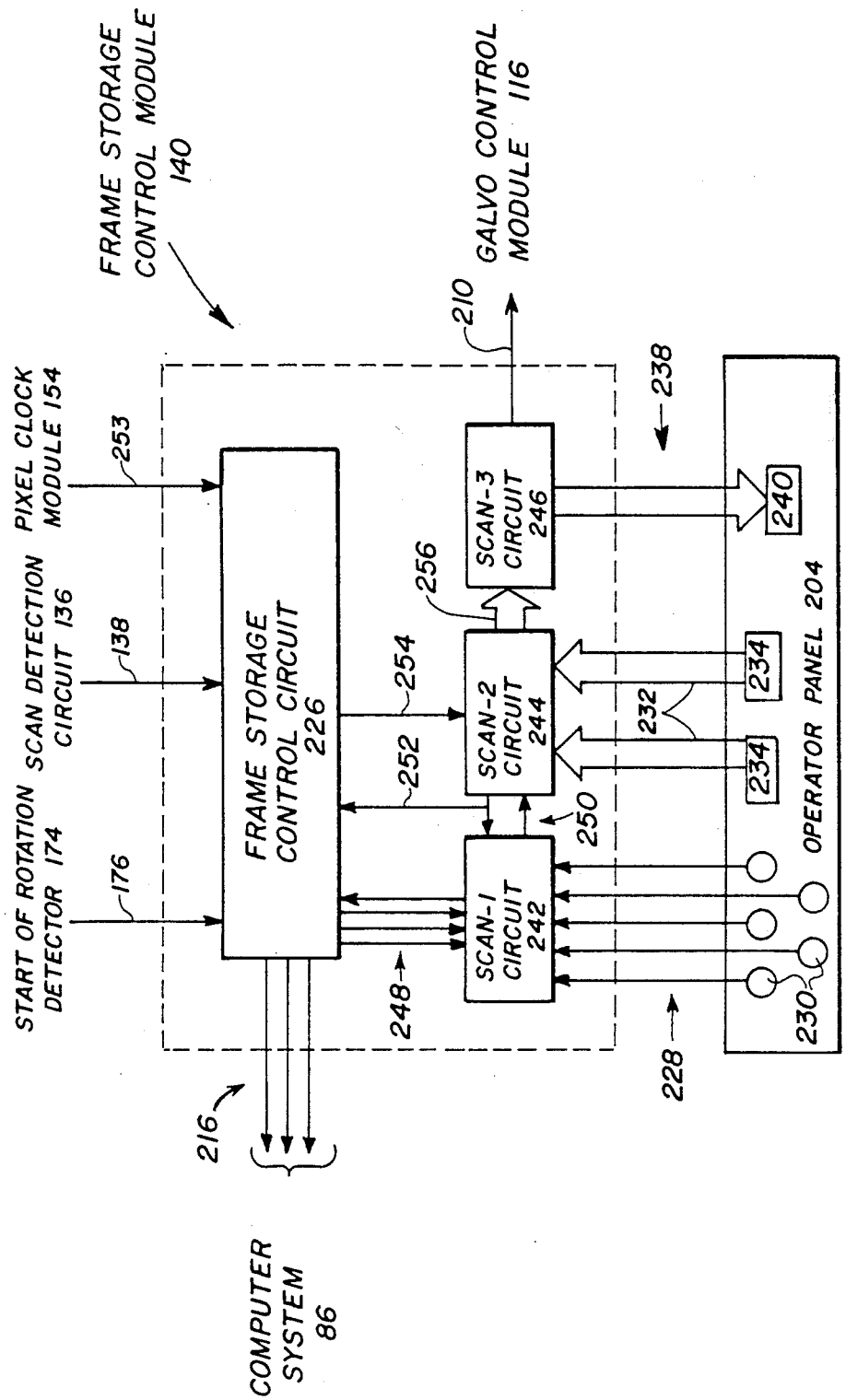
FIG. 9 is a block diagram of the frame or image storage control module and the operator control panel of FIG. 2.

FIG. 9 is a schematic representation of the frame storage control module 140 and the operator control panel 204 of FIG. 2. One purpose or function of the frame storage control module 140 is to generate control signals to synchronize a digital frame storage unit 271 in the computer system 86 to the actual position of the beam on the object. Based on the control signals from the frame storage control module 140, the digital frame storage unit 271 samples, digitizes and stores the detected signal from the photodetector assembly 90 at precisely spaced intervals. The digital signals are stored in memory locations corresponding to the position of the beam 24 on the object 70. Another purpose of the frame storage control module 140 is to generate a beam position reference signal to be used by the galvo control module 116 which adjusts the drive current to the galvanometer 56 to cause the actual beam position to accurately track the beam reference signal.

The frame storage control module 140 comprises a frame storage control circuit 226, a scan-1 circuit 242, a scan-2 circuit 244, and a scan-3 circuit 246. The frame storage control circuit 226 is connected to the scan-1 circuit 242 by four lines 248, three of the lines 248 are for sending signals from the frame storage control circuit to the scan-1 circuit 242, one of the lines 248 is for sending signals from the scan-1 circuit 242 to the frame storage control circuit 226. The scan-1 circuit 242 is connected to the scan-2 circuit 244 by three lines 250, two for sending signals from the scan-2 circuit 244 to the scan-1 circuit 242, one for sending signals from the scan-1 circuit 242 to the scan-2 circuit 244. A line 252 connects one of the lines 250 (which is for sending signals from the scan-2 circuit 244 to the scan-1 circuit 242) to the frame or image storage control circuit 226 for sending signals from the scan-2 circuit 244 to the frame storage control circuit 226. A line 254 connects the frame storage control circuit 226 to the scan-2 circuit 244 for sending signals from the frame storage control circuit 226 to the scan-2 circuit 244. A data bus 256 with 9 lines connects the scan-2 circuit 244 for sending signals to the scan-3 circuit 246.

The frame storage control module 140 receives signals or inputs over line 138 from the scan detection circuit 136 to the frame storage control circuit 226, over line 176 from the start of rotation detector 174 to the frame storage control circuit 226, over line 153 from the pixel clock module 154 to the frame storage control circuit 226, over lines 228 from controls or switches 230 on the operator panel 204 to the scan-1 circuit 242, and over two data buses 232, each having twelve signal paths or lines, from switches 234, such as thumbwheel switches, on the operator panel 204 to the scan-2 circuit 244. The frame storage control module 140 sends signals over three lines 216 to the computer system 86 from the frame storage control circuit 226, over line 116 to the galvanometer control module 116 from the frame storage control circuit 226, and over a data bus 238 to a display 240 on the operator panel 204 from scan-3 circuit 246.

Figure 10:
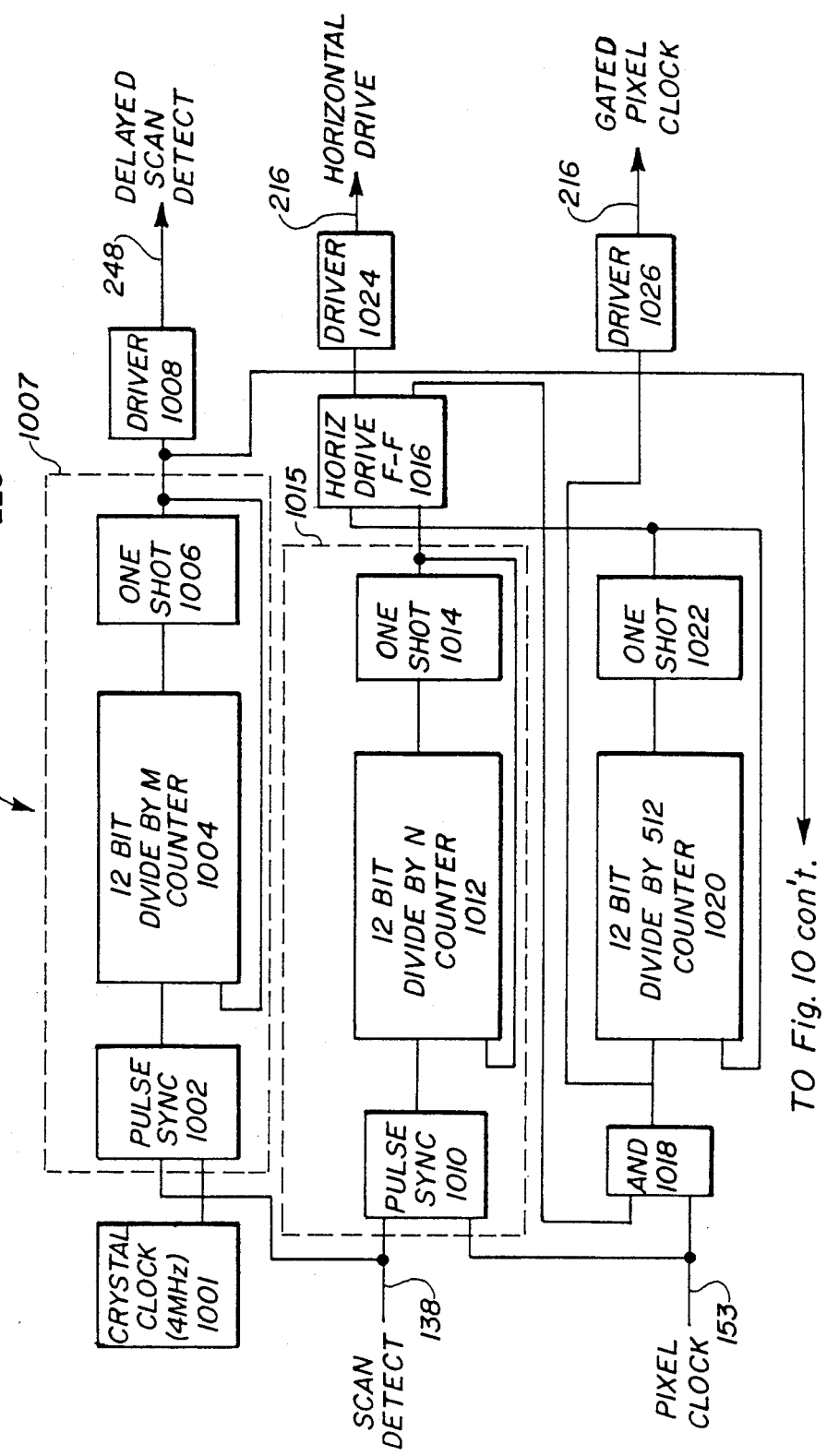
FIG. 10 is a detailed functional block diagram of the frame or image storage control module for use in the system of FIGS. 1 and 2.

FIG. 10 is a detailed functional block diagram of the frame storage control module 140 for use in the system of FIGS. 1 and 2. Referring to FIG. 10, the frame storage control circuit 226 receives signals from the scan detect circuit 136 and the pixel clock module 154, hereafter called SCAN DETECT signals and PIXEL CLOCK signals, respectively. The SCAN DETECT signals are fed into a pulse synchronization (sync) integrated circuit (IC) 1002, such as a 74120. Clock signals are generated by a crystal clock module 1001 such as a 5406-4M from MF Electronics of New Rochelle, N.Y. and sent to the pulse synch IC 1002. The pulse sync IC 1002 gates the CLOCK signals on at an occurrence of a SCAN DETECT signal sending the gated CLOCK signals or pulses to a 12 bit down counting circuit 1004, otherwise called a 12 bit divide by M counter 1004, which functions to create one output pulse for each M input pulses. The 12 bit counter 1004 may for instance, comprise three cascaded 4 bit counters ICs, such as 74F193 ICs. Data inputs to these counters 1004 are preselected binary numbers or values which are typically selected using pull-up resistors and switches connected to ground. When the last of the cascaded counters 1004 has reaches a count equal to 0, it outputs a pulse to a one shot 1006 which in turn reloads the counters 1004 to their initial or starting count values. The pulse sync IC 1002, the counter 1004 and the one shot 1006 function as a delay circuit 1007. The output pulse from the one shot 1006 is fed to a power driver IC 1008, such as a 74S140, which sends DELAYED SCAN detect signals over one of the lines 248 to the scan-1 circuit 242.

In a similar fashion, a second set of devices comprising a pulse sync IC 1010, a 12 bit counter 1012 and a one short 1014 function as a second delay circuit 1015 using the PIXEL CLOCK signals from the pixel clock module 154 in place of the CLOCK signals to provide a pulse to reset a horizontal drive flip-flop 1016 which turns off a HORIZONTAL DRIVE gate signal. When the flip-flop 1016 is reset, it provides an input to an AND gate 1018 which in turn enables the PIXEL CLOCK pulses to drive a 512 count circuit comprising a 12 bit counter 1020 and a one shot 1022. When the output of the one shot 1022 is active, it sets the flip-flop 1016, thus, turning on the HORIZONTAL DRIVE gate signal. An output of the flip-flop 1016 is fed to a driver circuit 1024 which sends HORIZONTAL DRIVE signals over one of the lines 216 to the frame buffer 272. Similarly, an output of the AND gate 1018 is fed to a driver circuit 1026 which sends gated PIXEL CLOCK signals to the frame buffer 272 over one of the lines 216.

The start of rotation sensor 174 is used to ensure that each frame begins using the same facet or face of the rotor 30. Its output signal which occurs once each revolution of the rotor 30, is amplified in a circuit 1028 and sent to a Schmitt Trigger circuit 1030, such as a 74LS14, which converts the signal to a digital logic signal. The digital logic signal is fed to an AND gate 1032.

The other input of the AND gate 1032 is driven by a flip-flop 1034 which is set by an eight bit vertical interval counter 1036 which counts the DELAYED SCAN DETECT signals from the delay circuit 1007. The output of the AND gate 1032 drives a one shot 1038 which produces a START SCAN signal which is sent over one of the lines 248 to the scan-1 circuit 242. The output of the one shot 1038 also loads the vertical interval counter 1036 to its initial value and sets a flip-flop 1040.

When the last scan of a frame has been reached, a SCAN COUNT=STOP VALUE signal from the scan-2 circuit 244 over line 252 enables one input of an AND gate 1044 permitting the DELAYED SCAN DETECT signal from the delay circuit 1007 to activate a one shot 1046. The one shot 1046, in turn, resets the flip-flop 1040, provides a STOP SCAN signal to the scan-1 circuit 242 over one of the lines 248, and resets the flip-flop 1034.

When the flip-flop 1040 is reset, it enables an input to an AND gate 1042 which also receives the delayed scan detect signals from the delay circuit 1007. This enables the DELAYED SCAN DETECT signals to drive the vertical interval counter 1036. When the flip-flop 1040 is set, it disables the AND gate 1042.

The output of the flip-flop 1040, also provides a LOAD SCAN COUNT (auto mode) signal to the scan-2 circuit 244 over line 254 and to a driver 1048 which in turn sends VERTICAL DRIVE signals on one of the lines 216 to the frame buffer 272.

Figure 11:
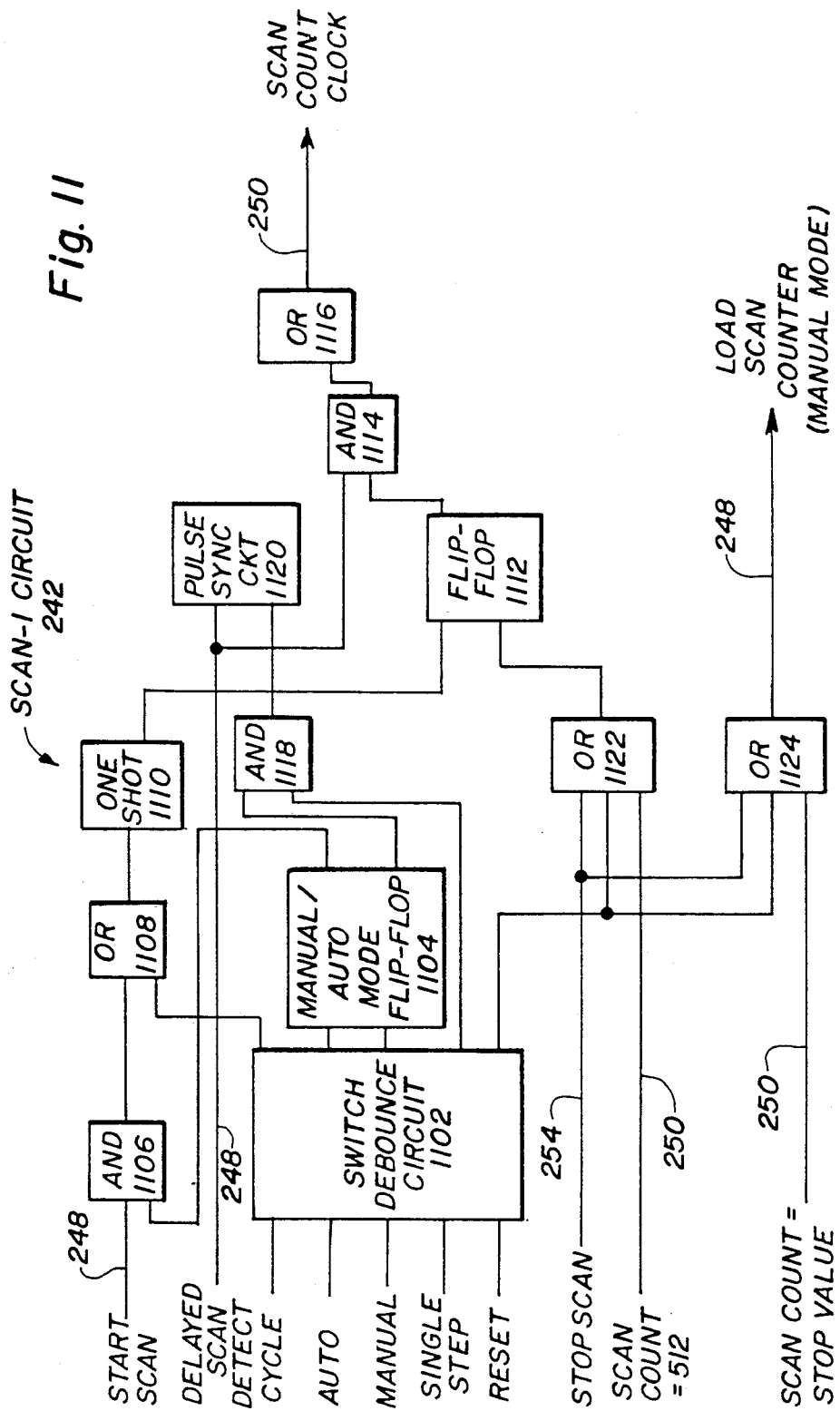
FIG. 11 shows a detailed functional block diagram of the scan mode control logic or scan-1 circuit for use in the module of FIG. 9.

FIG. 11 shows a detailed functional block diagram of the scan-1 circuit for use in the module of FIG. 9. Referring to FIG. 11, the five input switches 230 on the operator panel 204 can be pushbuttons and are connected to a switch debounce circuit 1102, such as a MC14490, to ensure bounce free transition or signals when the buttons 230 are actuated. The buttons 230 can be named a cycle button, an auto button, a manual button, a single step button, and a reset button.

The outputs of the auto and manual buttons 230 set and reset a manual/auto mode flip-flop 1104. When the flip-flop 1104 is set (i.e., automatic mode), one of its output signals enables an AND gate 1106. This AND gate 1106 then permits the START SCAN signal from the frame storage control circuit 226 over one of the lines 248 to drive one input of an OR gate 1108 which drives a one shot 1110. The output of the one shot 1110 is a pulse which sets a flip-flop 1112. The output of the flip-flop 1112 enables one input of an AND gate 1114 which then permits the DELAYED SCAN DETECT signals to drive an input of an OR gate 1116 which generates the SCAN COUNT CLOCK signals sent to the scan-2 circuit 244 over one of the lines 250.

When the flip-flop 1104 is reset (i.e., manual mode), the other output of the flip-flop 1104 enables an AND gate 1118 with another input being the output from the single step button 230. When the single step pushbutton 230 is depressed, the output of the AND gate 1118 enables a pulse synchronization (sync) circuit 1120 which produces one output pulse when the next delayed scan detect pulse arrives at its other input. The output of the pulse sync circuit 1120 is sent to the other input of the OR gate 1116 to produce the scan count clock signal to be sent to the scan-2 circuit 244. When the cycle button is depressed, a signal is sent to the other input of the OR gate 1108 and then to the one shot 1110. The output pulse from the one shot 1110 sets the flip-flop 1112 which operates as previously described.

When the reset button is depressed, its output is sent to inputs of a first OR gate 1122 and a second OR gate 1124. The output of the first OR gate 1122 resets the flip-flop 1112. The second OR gate 1124 output generates the LOAD SCAN COUNT (manual mode) signal which is sent to the frame storage control circuit 226 over one of the lines 248. The other two inputs to the first OR gate 1122 are the STOP SCAN signal which comes from the frame storage control circuit 226 and the SCAN COUNT=512 signal which comes from the scan-2 circuit 244. The other two inputs to the second OR gate 1124 are the STOP SCAN signal from the frame storage control circuit 226 and the SCAN COUNT=STOP VALUE signal from the scan-2 circuit 244.

Figure 12:
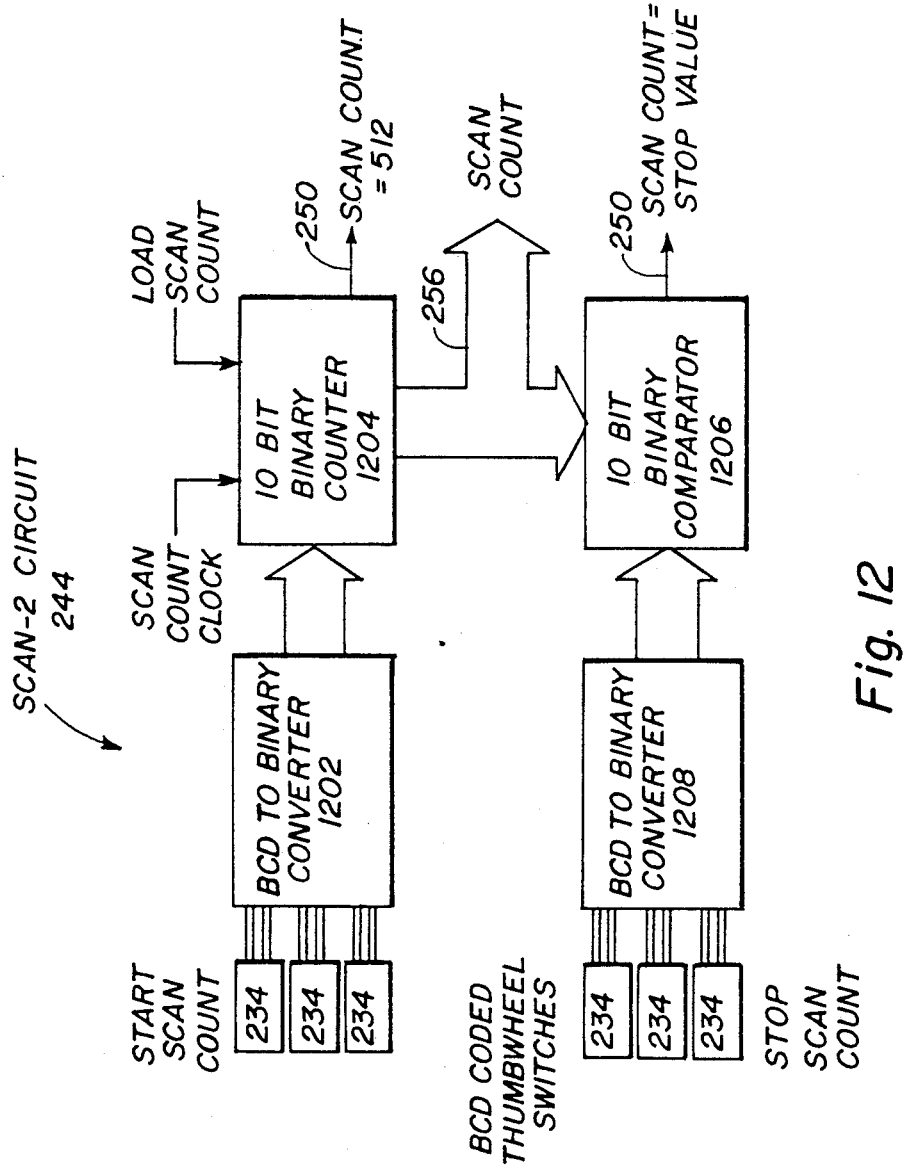
FIG. 12 shows a detailed functional block diagram of the scan count or scan-2 circuit for use in the module of FIG. 9.

FIG. 12 shows a detailed functional block diagram of the scan-2 circuit for use in the module of FIG. 9. Referring to FIG. 12, three switches, such as binary coded decimal (BCD) thumbwheel switches 234, on the operator panel 204 are set to a desired START SCAN COUNT value by the operator. The BCD output signals from these switches 234 are converted to a 10 bit binary representation by a BCD to binary converter circuit 1202. This 10 bit representation is sent to a 10 bit binary counter 1204, called a scan counter 1204. The LOAD SCAN COUNT signal over line 254 from the frame storage control circuit 226 permits the loading of the 10 bit representation into the counter 1204. The counter 1204 increments each time a pulse occurs in the SCAN COUNT CLOCK signal over one of the lines 250 from the scan-1 circuit 242. The output of the counter 1204 is sent to a 10 bit binary comparator 1206 and to the scan-3 circuit 246 over the bus 256. The most significant bit, i.e., the bit that represents a count of 512, is sent over one of the lines 250 to the scan-1 circuit 242.

The other input of the binary comparator 1206 is driven by a binary representation of a STOP SCAN COUNT signal which has been input through switches 234 and converted to the binary representation by a BCD to binary converter 1208 in similar fashion.

When the output of the scan counter 1204 equals the STOP SCAN COUNT value, the output of the comparator 1206 becomes active producing a SCAN COUNT=STOP VALUE signal which is sent to the frame storage control circuit 226 over the line 252 and to the scan-1 circuit 242 over one of the lines 250.

Figure 13:
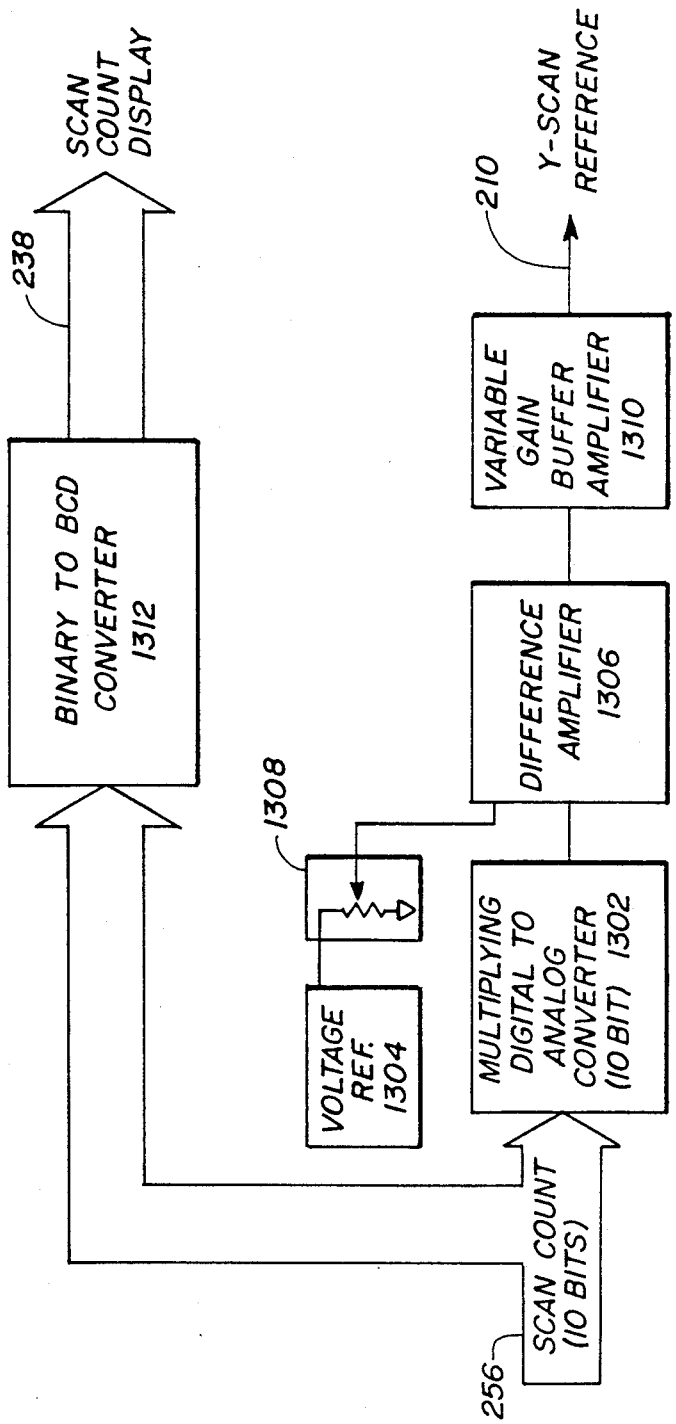
FIG. 13 shows a detailed functional block diagram of the Y-scan reference generator or scan-3 circuit for use in the module of FIG. 9.

FIG. 13 shows a detailed functional block diagram of the scan-3 circuit for use in the module of FIG. 9. Referring to FIG. 13, the 10 bit output of the scan counter 1204 in the scan-2 circuit 244 is sent over the bus 256 to a 10 bit multiplying digital to analog converter (DAC) 1302. A precision voltage reference 1304 supplies a reference input to the converter 1302. The output of the DAC 1302 is fed to one input of a difference amplifier 1306. The other input of the difference amplifier 1306 is driven by a potentiometer 1308 which is in turn connected to the precision voltage reference 1304. The potentiometer 1308 provides capability to adjust the middle point of the output of the amplifier 1306 to zero. The output of the amplifier 1306 is sent to a variable gain buffer amplifier 1310 whose gain can be adjusted between zero and one. The output of the buffer amplifier 1310 is a Y-SCAN REFERENCE signal which is sent over line 210 to the galvo control module 116.

The output of the scan counter 1204 is also sent to a binary to BCD converter 1312 which in turn sends SCAN COUNT DISPLAY signals over the bus 238 to drive a three digit display 240 on the operator panel 204 to show the scan count representing the instantaneous y position of the beam on the object.

Figure 14:
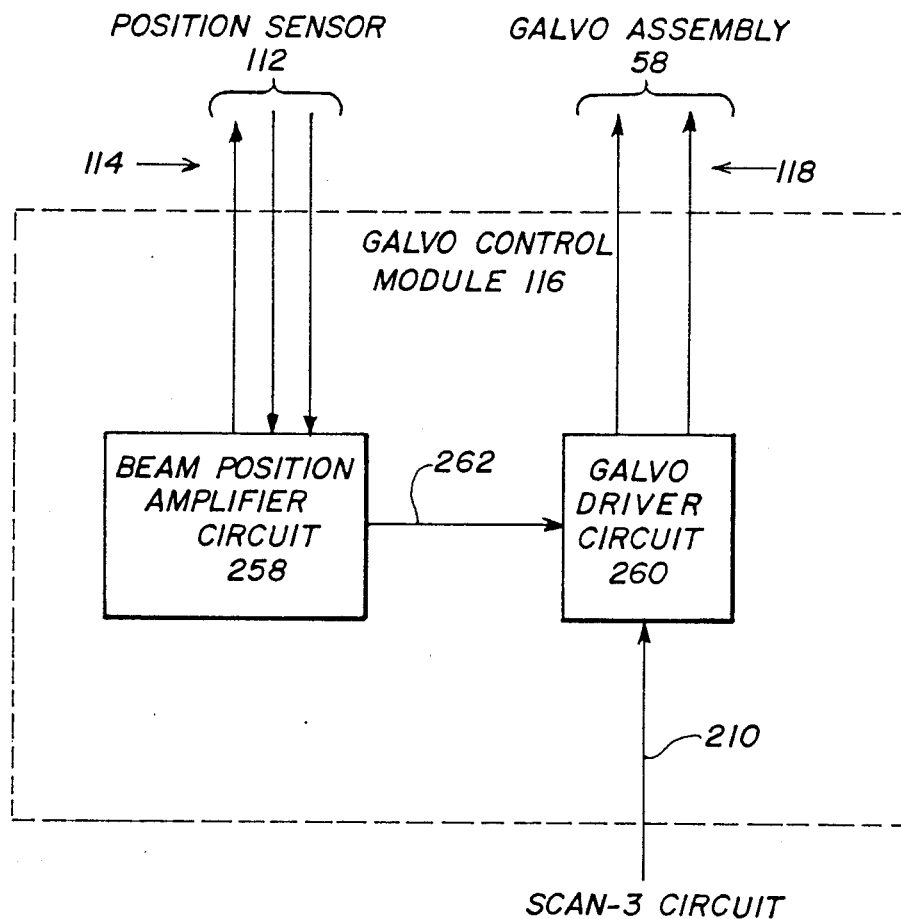
FIG. 14 is a block diagram of the galvanometer control module of FIGS. 1 and 2.

FIG. 14 is a schematic representation of the galvanometer control module 116 of FIGS. 1 and 2. The galvo control module 116 receives and amplifies a signal representative of the actual beam position in the second direction. Then it receives the desired beam position Y-SCAN REFERENCE signal and compares the two signals. Based on the comparison, the galvo control module 116 modifies the drive current of the galvanometer 556 to cause the 5 actual beam position in the second direction to accurately track or conform to the desired beam position.

This module 116 comprises a beam position amplifier circuit 258 which provides signals over a line to a galvanometer or galvo driver circuit 260.

The galvo control module 116 receives signals over first and second lines of cable 114 from the light position sensor 112 to the beam position amplifier circuit and over line 210 from the scan-3 circuit 246 to the galvo driver circuit 260. The galvo control module 116 sends bias voltage over a third line of cable 114 from the beam position amplifier circuit 258 to the position sensor 112, and over the two lines of cable 118 from the galvo driver circuit 260 to the galvo assembly 58.

Figure 15:
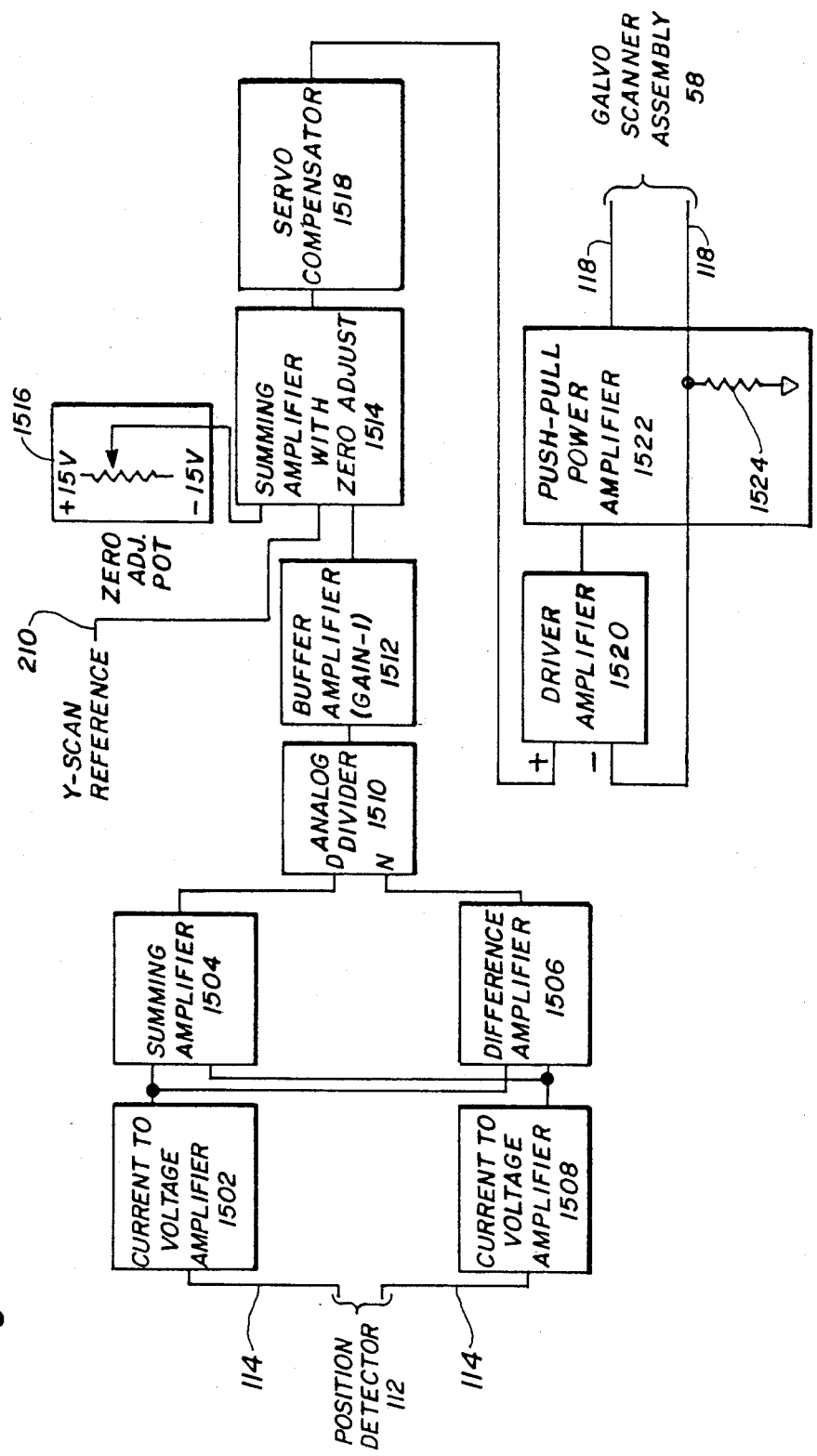
FIG. 15 is a detailed functional block diagram of the galvanometer control module for use in the system of FIGS. 1 and 2.

FIG. 15 is a detailed functional block diagram of the galvanometer control module 116 suitable for use in the system of FIGS. 1 and 2. Referring to FIG. 15, the two outputs of the position detector or sensor 112 provide signals that are proportional to the position of the light beam on the detector 112. The detector 112 is operated in a back biased current mode. The first output of the detector 112 is sent to a current to voltage amplifier 1502 similar to the preamplifier circuit 152 previously described. The output of the amplifier 1502 is fed to a summing amplifier 1504 and a difference amplifier 1506.

The other output of the detector 112 is similarly configured providing its output to another current to voltage amplifier 1508. The output of the current to voltage amplifier 1508 provides the second input to the summing amplifier 1504 and the second input to the difference amplifier 1506.

The outputs of the summing amplifier 1504 and the difference amplifier 1506 are sent to the denominator (D) input and the numerator (N) input, respectively, of an analog divider 1510, such as a Burr-Brown 4291 divider. The output of the divider 1510 is equal to N divided by D, multiplied by ten (10), i.e., (N/D)×10. By dividing the difference signal by the summing signal, variations in the output level of the divider 1510 due to the variations in the incident beam intensity on the detector 112 are eliminated or minimized.

The output of the divider 1510 is sent to a buffer or non-inverting amplifier 1512 having a gain of one (1). This output, called the POSITION ERROR CORRECTION signal, is fed to a summing amplifier 1514. The other inputs to the summing amplifier 1514 are the Y-SCAN REFERENCE signal from the scan-3 circuit 246 and the output of a zero adjustment potentiometer 1516. The potentiometer 1516 allows for adjustment of the mid-range position of the galvomenter 56.

The output of the summing amplifier 1514 is sent to a servo compensator 1518 which can be a lag-lead compensator similar to that described in D'Azzo and Houpis, Feedback Control System Analysis and Synthesis, pages 109-110, 1960.

The compensator 1518 ensures stability (i.e., prevents ringing and oscillation) of the servo loop formed by the galvanometer control module 116 and the position detector 112.

The output of the compensator 1518 drives one input of a driver amplifier 1520 which in turn drives a push-pull power amplifier 1522. The push-pull amplifier 22 provides the drive current to coils in the galvanometer 56. A feedback resistor 1524 senses the actual current in the galvanometer coils and provides a negative feedback voltage to the driver amplifier 1520.

Figure 16:
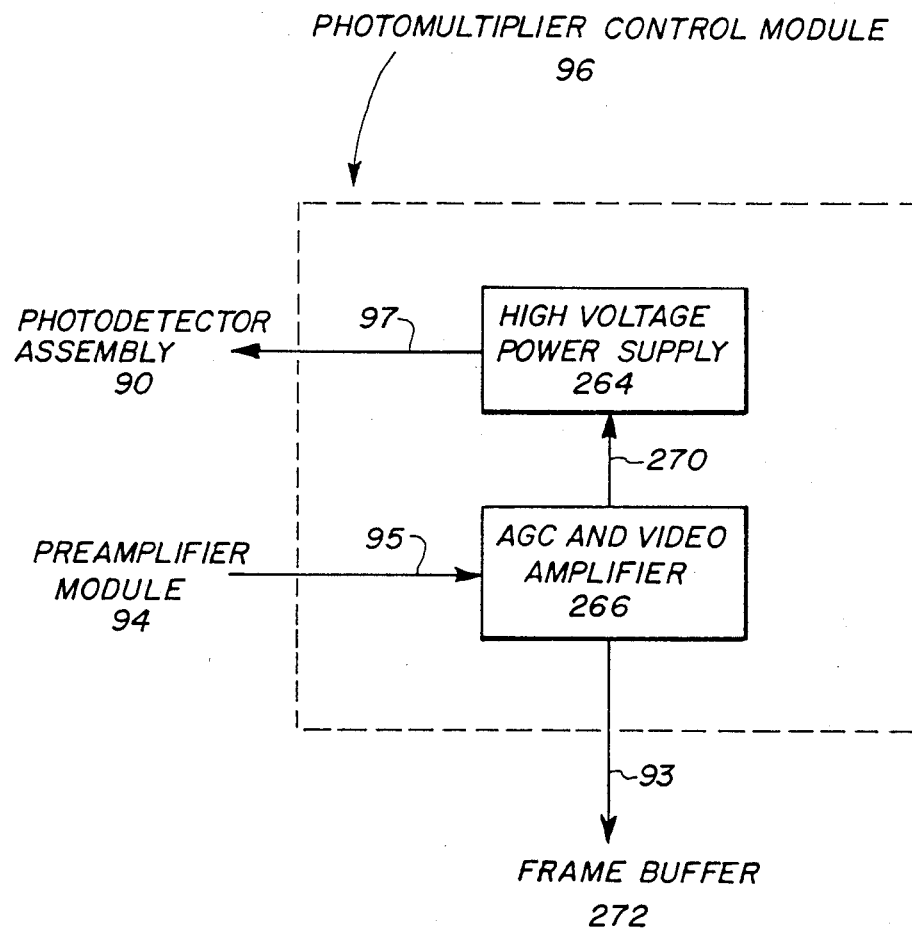
FIG. 16 is a block diagram of the photomultiplier control module of FIGS. 1 and 2.

FIG. 16 is a schematic representation of the photomultiplier control module 96 of FIGS. 1 and 2. The function of the photomultiplier control module 96 is to form a long term average of the amplified detected signal from the assembly 90. The long term average is used to control the high voltage supplied to the assembly 90, thereby, controlling its gain. The photomultiplier control module 96 ensures a substantially constant gain of the photodetector assembly 90 over an entire frame.

The photomultiplier control module 96 comprises a high voltage (e.g., 3,000 volts) power supply 264 connected by a line 270 to an automatic gain control (AGC) and video amplifier 266. An illustrative power supply 264 can be obtained under model 205A-03R from Bertan Associates of Hicksville, N.Y. The power supply 264 receives signals over line 270 from the AGC and video amplifier 266.

The photomultiplier control module 96 sends high voltage over the line 97 from the power supply 264 to the photomultiplier assembly 90 and over the line 93 from the AGC and video amplifier 266 to a frame buffer 272 in the computer system 86. The photomultiplier control module 96 receives signals over the line 95 from the preamplifying module 94 to the AGC and video amplifier 266.

Figure 17:
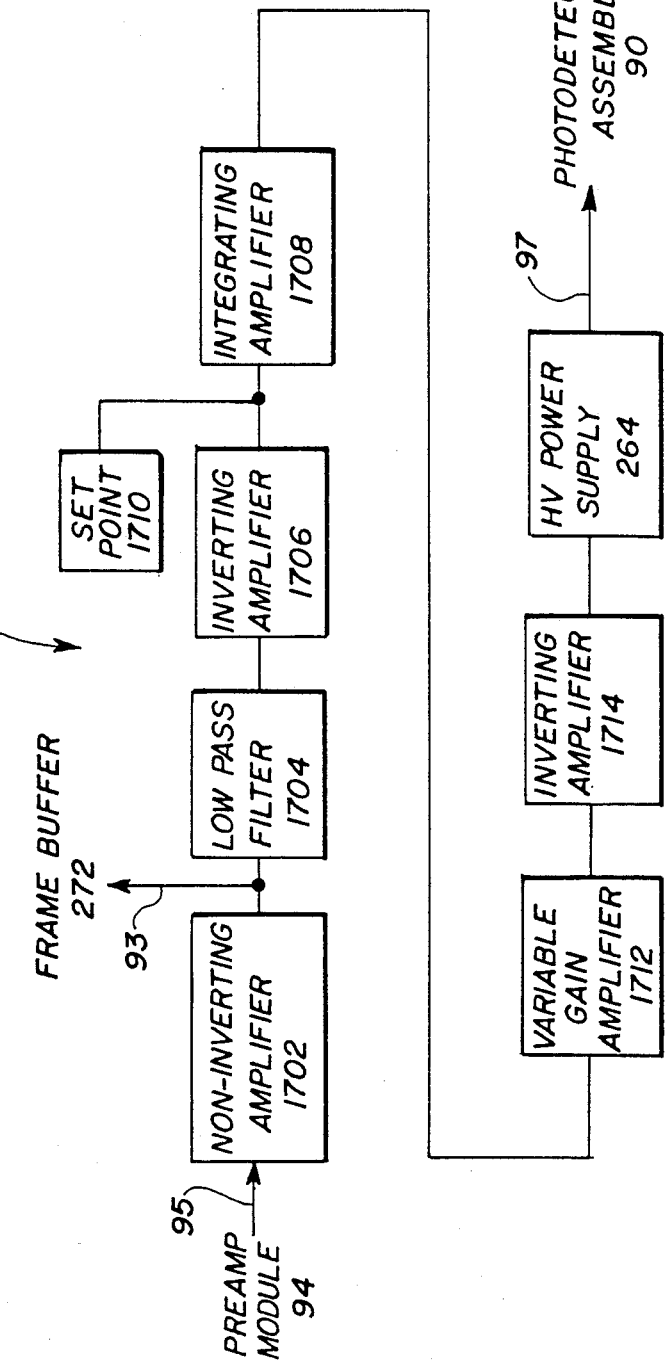
FIG. 17 is a detailed functional block diagram of the photomultiplier control module for use in the system of FIGS. 1 and 2.

FIG. 17 is a detailed functional block diagram of the photomultiplier control module 96 suitable for use in the system of FIGS. 1 and 2. Referring to FIG. 17, the output from the preamplifying module 94 is sent to a buffer or non-inverting amplifier 1702 having a gain of two (2). The output of this amplifier 1702 is sent over line 93 to the frame buffer 272. The output of the amplifier 1702 is also sent to a low pass filter 1704 having a time constant of about two seconds. The polarity of the output of the filter 1704 is inverted by an inverting amplifier 1706. The output of the amplifier 1706 is sent to the summing junction of an integrating amplifier 1708. A set point 1710 provides a second input to the summing junction of the amplifier 1708. The amplifier 1708 has an output limiting circuit which prevents its output from going negative.

The output of the integrating amplifier 1708 is sent to a variable gain amplifier 1712 which allows one to control the gain of the module 96. The output of the amplifier 1712 is inverted by an inverting amplifier 1714 to provide the required polarity input to the high voltage power supply 264. The power supply 264 provides a high voltage to the photodetector assembly 90 which is proportional to the input voltage to the power supply 264.

Figure 18:
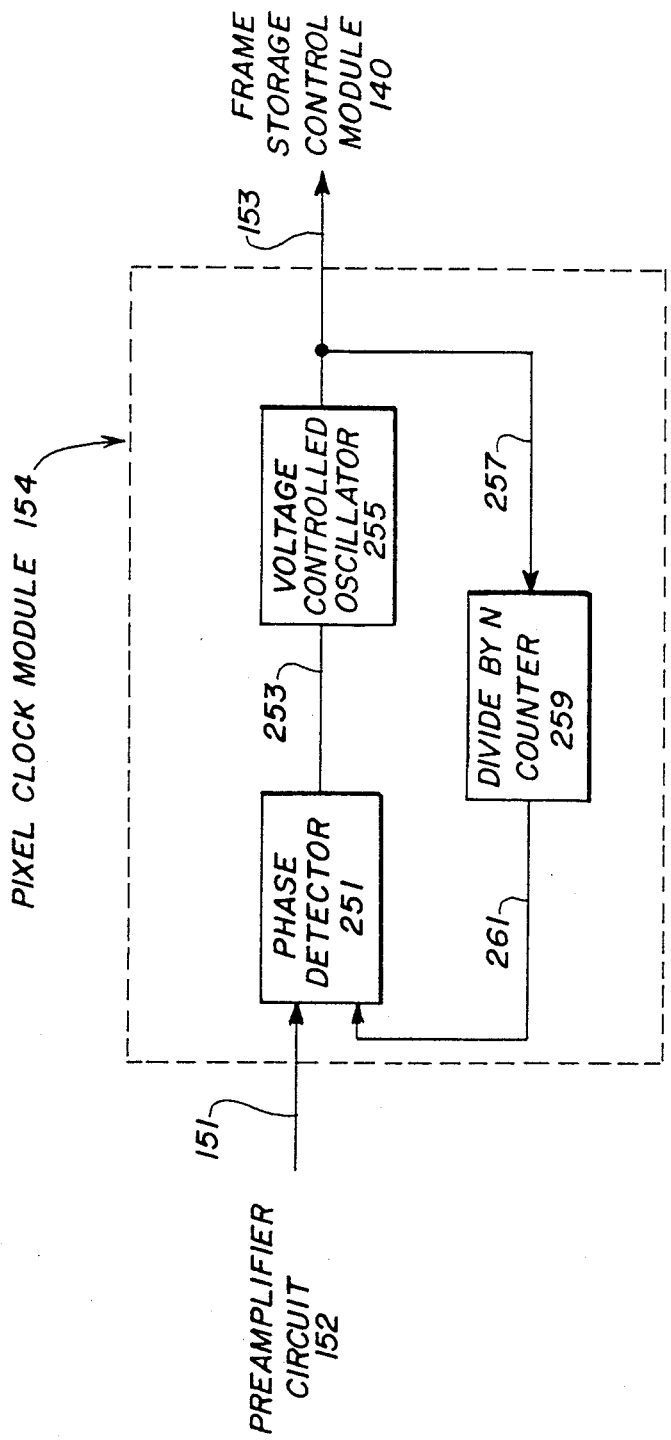
FIG. 18 is a block diagram of the pixel clock module of FIGS. 1 and 2.

FIG. 18 is a schematic representation of the pixel clock module 154 of FIGS. 1 and 2. The pixel clock module 154 contains a phase-locked loop circuit having an input and an output. The phase-locked loop circuit synchronizes the phase of its output signal with the phase of its input signal such that for each amplitude peak of the input signal an amplitude peak of the output signal occurs coincidentally. In addition, the pixel clock module 154 multiplies the frequency of the input (which corresponds to amplitude cycles per unit distance on the ronchi ruling 144) by a predetermined number N in a range of 1–16, typically 3 or 4, to form the output signal.

The pixel clock module 154 receives an amplitude varying signal. This signal is created by the fourth beam portion 142 passing through the ronchi ruling 144 as the fourth beam portion 142 is being scanned in the first (x) direction. The scanning pattern of the fourth beam portion 142 is analogous to the scanning pattern of the beam 24 as it is reflected in the first direction towards the first lens 50. Thus, the position of the fourth beam portion 142 on the ronchi ruling 144 is representative of the position of the beam 24 in one direction on the object 70. The ronchi ruling 144 modulates the intensity of the fourth beam portion 142 as the beam portion 142 passes across it. Since the ronchi ruling 144 has parallel lines which are equally spaced apart and the rotor 30 is rotating at constant angular velocity, the frequency per unit time of the signal sensed by sensor 148 will vary depending on the vector component of the velocity of the fourth beam portion 142 in the plane of the ronchi ruling 144. Otherwise stated, since the ronchi ruling 144 has parallel lines which are equally spaced apart, the signal received by the photodetector 148 will vary in amplitude corresponding to the position of the fourth beam 142 which is synchronous with the scanning pattern of the beam 24. Spot velocity variations caused by the optical system will equally affect the fourth beam portion 142 and the scan beam 24. In addition, variations in the angular velocity of the rotor 30 will equally affect the fourth beam portion 142 and the scan beam 24. Thus, the signal from the photodetector 148 will precisely track the motion of the beam portion 142 as it traverses the ronchi ruling 144. The signal from the photodetector 148 will have a temporal frequency that corresponds to the spatial frequency (i.e., the lines per unit distance) of the ronchi ruling 144, modulated by the variations due to the optics and rotor velocity The pixel clock module 154 multiplies the temporal frequency of the signal generated by the photodetector 148 resulting in a very precise PIXEL CLOCK output signal representative of the spatial position of the beam 24 on the object plane 70 in one direction.

The pixel clock module 154 comprises a phase detector 251, a voltage controlled oscillator (VCO) 255, and a divide by N counter 259. An illustrative phase detector 251 and oscillator 255 useable in this system can be obtained under Part No. NE564 by Signetics Corporation in Sunnydale, Calif. The phase detector 251 is connected, and sends signals, to the voltage controlled oscillator (VCO) 255 over a line 253. The voltage controlled oscillator 255 is connected, and sends signals, to the divide by N counter 259 by a line 257. The divide by N counter 259 is connected, and sends signals, to the phase detector 251 by a line 261.

The pixel clock module 154 receives signals over the line 151 from the preamplifying circuit 152 to the phase detector 251. The pixel clock module 154 sends signals over the line 153 from the line 257 to the frame or image storage control module 140.

Figure 19:
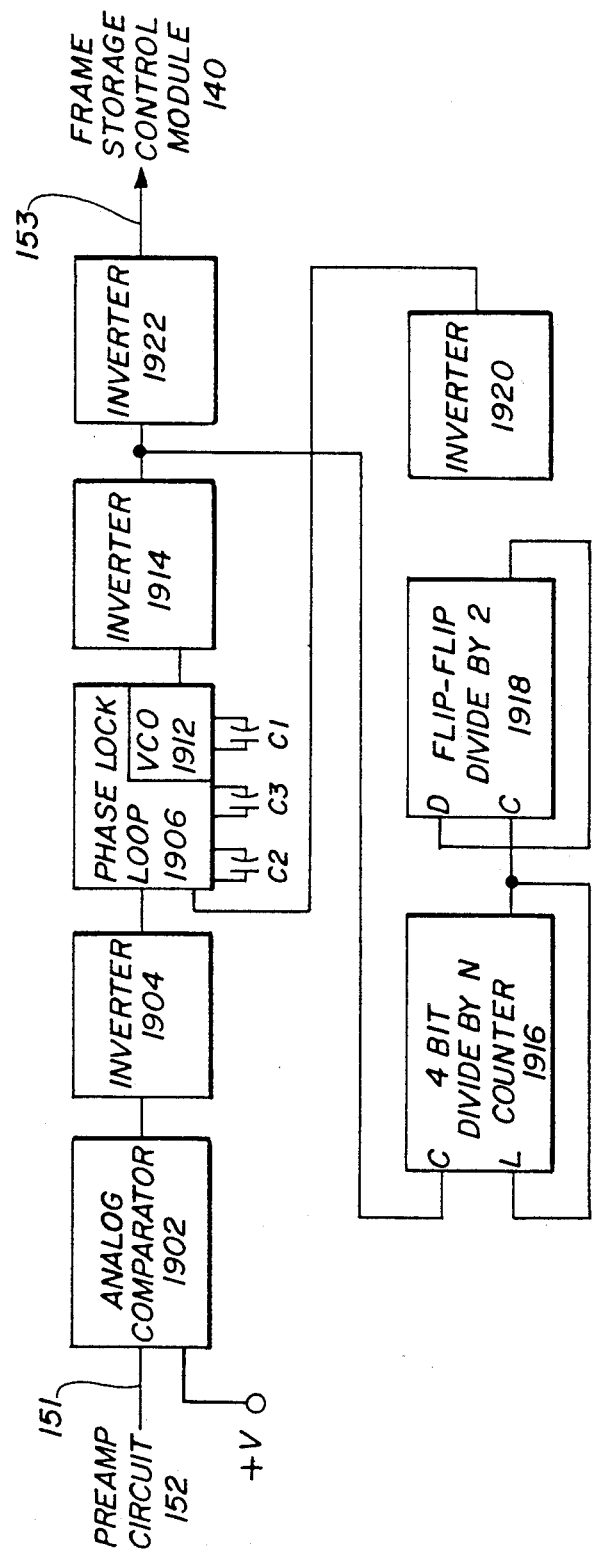
FIG. 19 is a detailed functional block diagram of the pixel clock module for use in the system of FIGS. 1 and 2.

FIG. 19 is a detailed functional block diagram of the the pixel clock module 154 suitable for use in the system of FIGS. 1 and 2. Referring to FIG. 19, the output of the preamplifier circuit 152 is fed to one input of an analog comparator 1902 which compares the incoming signal to a fixed DC reference voltage provided to the comparator's second input. The output of the comparator 1902 is compatible with digital logic circuitry and sent to an inverter 1904 that inverts the polarity of the signal. The output of the inverter 1904 is fed to a FM input of a phase-locked loop IC 1906, such as a NE564. The output of a voltage controlled oscillator (VCO) 1912 which is included in the phase locked loop IC 1906 is sent to an inverter 1914. The primary frequency of the VCO 1912 is set by a capacitor C1 and is adjust so that the frequency is approximately that desired for the PIXEL CLOCK signal. Capacitors C2 and C3 are selected so that high frequency signals are filtered out, allowing an error signal of interest internal to the IC 1906 to be fed cleanly to the VCO input.

The output of the inverter 1914 is sent to a clock input of a 4 bit binary counter 1916 configured as a divide by N counter. The divide by N counter 1916 input values can be selected with individual switches having associated pull-up resistors. The output of the counter 1916 is fed to a D flip-flop 1918 which is configured to divide the frequency of its input by two (2). Thus, the output of the D flip-flop 1918 is a square wave whose frequency is $\frac{1}{2}$N of the input of the pixel clock module 154. The output of the flip-flop 1918 is inverted by an inverter 1920 and then fed to a phase comparator input of the phase-locked loop IC 1906.

The output of the inverter 1914 is also sent to another inverter 1922 which sends its output, the PIXEL CLOCK signal, to the frame storage control module 140 over line 153.

The phase-locked loop IC 1906 adjusts the frequency of its voltage controlled oscillator (VCO) 1912 to minimize the phase error between its FM input and its phase comparator input. As a result, the output frequency of the VCO 1912 will be 2N times the input frequency of the pixel clock module 154.

The spatial frequency of the signal generated by the fourth beam portion 142 passing through the ronchi ruling 144 is known to vary. Thus, the output of the pixel clock module 154 is designed to vary also, being 2N times the spatial frequency of the input to the module 154.

One advantage of this pixel clock module 154 is that this module generates a PIXEL CLOCK signal that has a spatial resolution variably much greater than a signal sensed from scanning a beam over a ronchi ruling without difficulties associated in reducing the diameter of the fourth beam portion.

Figure 20:
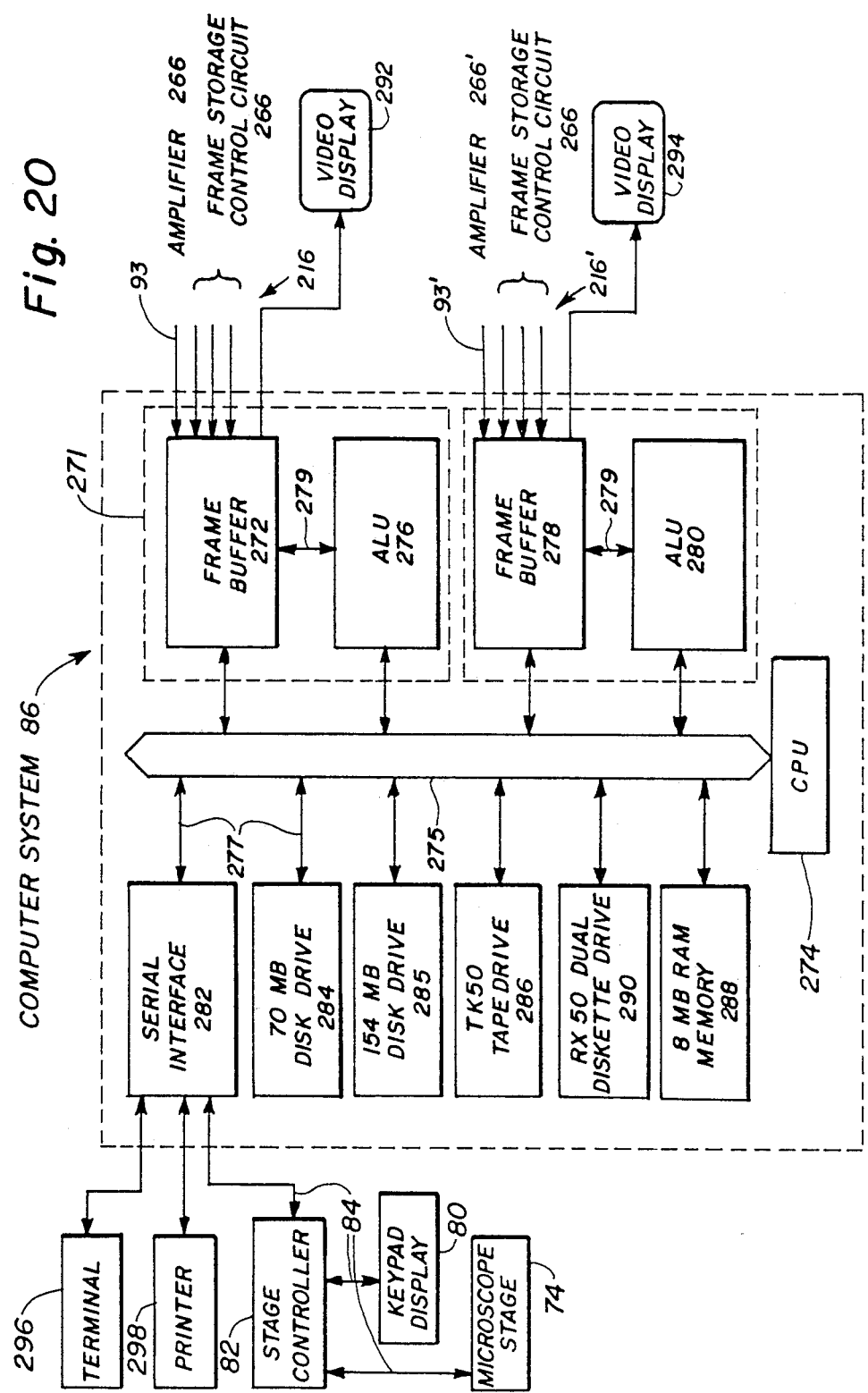
FIG. 20 is a schematic representation of the computer system and the stage controller system of FIGS. 1 and 2.

FIG. 20 is a schematic representation of the computer system 86 and the stage controller system of FIGS. 1 and 2. The computer system 86 comprises a central processing unit (CPU) 274 connected by an internal data bus 275 and interconnecting lines 277 to (1) the frame buffer 272 which is connected to a video display 292, (2) an arithmetic logic unit (ALU) 276, (3) a serial interface 282 which is connected to a terminal 296 with operator input means, such as, a keyboard, a keypad, a mouse and/or a light pen, a printer 298, and the stage controller module 82, and (4) means for storing one or more operating programs and data generated by the scanning laser microscope system 10, such as, one or more of a disk storage and drive device 284, a magnetic cassette tape storage and drive device 286, a random access memory (RAM) 288, or a floppy disk or diskette storage and drive device 290. The computer system 86 may optionally include a second frame buffer 278 (connected to a second video display 294) and a second ALU 280 for receiving signals from the sensor or second photodetector assembly 168. The frame buffers 272, 278 are connected by lines 279 to the ALU's 276, 280.

For illustration purposes, the following parts can be obtained from Digital Equipment Corporation (DEC) of Marlboro, Massachusetts, under the specified model numbers:

| | |
|---|---|
| the central processing unit (CPU) 274 | model 630QB-A2 |
| the serial interface 282 | model DVQ-11-M |
| the terminal 296 | model VT-220AZ |
| the disk storage and drive device 284 | models RD-50A-5A and RQDX3-BA |
| the tape storage and drive device 286 | models TK-50-AA and TQK-50-BA |
| the memory 288 and | model CMX-830 |
| the diskette storage/drive device 290 | models 800-Kb and RX50-A-BA. |

The digital frame storage unit 271 comprises the frame buffer 272 and the ALU 276. Acceptable frame buffers and ALU's useable in the present system can be obtained from Data Translation Incorporated located in Marlboro, Mass., under model numbers DT-2651 and DT-2658, respectively.

The computer system 86 receives signals over lines 216 from the digital frame or image storage circuit 226 to the frame buffers 272, 278, and over line 93 from the AGC and video buffer 266 to the frame buffers 272, 278.

In operation, the object is placed on the stage assembly 74. The operator inputs information at the terminal 296, such as identification data concerning the object and information selecting desired stage positions to be used. The CPU 274 responds by instructing the stage control module 82 to position the stage as selected or programed. The CPU 274 further instructs the frame buffer 272 to begin receiving detected signals from the assembly 90 and/or the frame buffer 278 to begin receiving data.

When the stage assembly 74 is in its first programmed position, the frame buffer 272 (and/or 278) samples, digitizes and stores the detected signal from the assembly 90 at precisely spaced intervals while the beam is being scanned in its raster pattern. These stored signals comprise a frame of detected signals or data. The stored signals are then typically transferred to one of the forms of archival storage, i.e., 284, 286, or 290, or the memory 288. Then the stage control module 82 repositions the stage such that another frame of data can be acquired. This is repeated until a desired number of frames or images has been acquired.

The video display 292 can present a pictorial representation of the stored data where each sample is displayed in a location on its screen corresponding to the position that the beam was on the object for that sample.

The ALU 276 is capable of performing standard image processing functions on the stored data including adjusting brightness levels, edge enhancements, filtering to reduce unwanted noise, etc.

The second frame buffer 278 performs the same functions on the signal from the sensor 168 after the signal has been amplified and its gain controlled similar to the signal detected by the assembly 90. Alternatively, the second frame buffer 278 can be parallel connected to sample a frame of detected signals from the assembly 90 when the first frame buffer 272 is transferring its stored signals such as to archival storage. Furthermore, a frame stored in the buffer 272 can be combined with a corresponding frame stored in the buffer 278 to enhance details that may be undiscernable in the individual images.

The present invention can be implemented in a variety of hardware and software configurations as will be apparent to those skilled in the art. An illustrative software embodiment for operating the aforesaid system is included in an Appendix to this specification. The software program is written in the "C" language and appears immediately before the claims.

Those skilled in the art, having the benefit of the teachings of the present invention as hereinabove set forth, can effect numerous modifications thereto. These modifications are to be construed as being encompassed within the scope of the present invention as set forth in the appended claims.

APPENDIX

```
/* scanner_main.c

This program is the main routine which implements the many functions
required for the proper operation of the optical scanning microscope.
Some of the functions implemented in software is listed below:
        a) Position the stage controller
        b) Digitize and display an image
        c) Record the image database information obtained from the
           operator
        d) Record the appropriate mapping information
        e) Move stage controller to next specified location
        f) Save and/or retrieve images data to/from the hard-disk A menu is displayed then depending on the operation desired, the operator
makes the choice by way of the keyboard.
This software package was designed to run on a Microvax II system,
running VMS 3.0 or higher. It also requires a VAXC compiler and it's
associated libraries. VAX system calls are used extensively throughout
each function implementation */
```

```
#include         rmsdef
#include         descrip
#include         iodef
#include         ssdef
#include         <stdio.h>
#include         "virt_frames.h"
                                        /* buffers to to map to virtual space */
globaldef {"image0"} char          frame0[512][512];
globaldef {"image1"} char          frame1[512][512];
globaldef {"image2"} struct reg_frame    dt_io_regs;
globaldef {"image3"} unsigned short      pixel_data[512][512];
globaldef {"image4"} char          frame2[512][512];
globaldef {"image5"} char          frame3[512][512];
globaldef {"image6"} short         alu_frame0[512][512];
globaldef {"image7"} short         alu_frame1[512][512];
main()
{
        short  iosb[4];
        static $DESCRIPTOR(terminal,"SYS$INPUT");
        char    *prompt = "Do you wish to save image Y/N [N] : ";
        int    status;
        static char in_buf[4];
        short no_moves,stglen;
        short wafer_type;
        short in_lut,out_lut;
        short *no_movesptr;
        short channel,tichan;
        short *chanptr;
        char  *charptr;
        short *lut_aryptr;
        FILE  *mapfile_ptr;
        int   xcor,ycor;
        int   *xcorptr,*ycorptr;
        short lutdata[256];
        short zoom;
        short i,j;
        int   r_status;
        short zero[256];
        char  response[10];
        short group_no,buffer_no,lut_no,xoff,yoff;
        char    *batchcode;
        char    image_name[25];
        char    answer[10];
        char    wafer_no[10];
        static char extension[] = ".MAP";
        static char vflexten[] = ".VFI";

struct  dsc$descriptor_s         fni;
        struct  dsc$descriptor_s         fno;
        char    *infile_name;
        char    outfile_name[255];
        int unsigned val2,val;

zoom = 0;
        group_no = buffer_no = lut_no = xoff = yoff = zoom = no_moves = 0;

r_status = map_waferbuf();    /* map buffers and registers into */
        r_status = map_dtregs();      /* current process space          */

/* initialize the data-translation
                                                                hardware */
        r_status = fg_init();
        r_status = alu_init(group_no);

/* initialize the stage */
        xcorptr = &xcor;
        ycorptr = &ycor;
        chanptr = &channel;
```

```
no_movesptr = &no_moves;
r_status = chan_get(chanptr);
if(r_status != 1)
{
        printf("\nCould not assign channel to stage ...exiting");
        goto exit;
}
r_status = stage_init(chanptr,xcorptr,ycorptr);
if(r_status != 1)
{
        printf("\nCould not initialize stage..exiting");
        goto exit;
}

/* get wafer batch name */ batchcode = image_name;
printf("\033[2J");
printf("\nEnter the wafer batch code(12 char)[A11_11_11_00]:");
scanf("%s",batchcode);
stglen = strlen(batchcode);
if((stglen > 15)||(stglen == 0))
{
        batchcode = "A11_11_11_00.MAP";
}
else
{                                       /* add .map file extension */
        strcat(batchcode,extension,6);
                                        /* menu option */ printf("\t 1      CRYSTAL TECHNOLOGY Z-CUT\n");
printf("\t 2      CRYSTAL TECHNOLOGY X-CUT\n");
printf("\t 3      BARR-STROUD Z-CUT\n");
printf("\t 4      BARR-STROUD X-CUT\n");
printf("\t 5      ALLIED     Z-CUT\n");
printf("\t 6      ALLIED     X-CUT\n");
printf("\t 7      UNION CARBIDE Z-CUT\n");
printf("\t 8      UNION CARBIDE X-CUT\n");
printf("\t 9      GLOBAL TECHNOLOGY Z-CUT\n");
printf("\t 10     GLOBAL TECHNOLOGY X-CUT\n");
printf("\n\nSelect wafer type (1-10):");
scanf("%d",&wafer_type);
switch(wafer_type){
case 1:
        charptr = "CTZ_";
        break;
case 2:
        charptr = "CTX_";
        break;
case 3:
        charptr = "BSZ_";
        break;
case 4:
        charptr = "BSX_";
        break;
case 5:
        charptr = "ALZ_";
        break;
case 6:
        charptr = "ALX_";
        break;
case 7:
        charptr = "UCZ_";
        break;
case 8:
        charptr = "UCX_";
        break;
case 9:
        charptr = "GTZ_";
        break;
```

```
case 10:
        charptr = "GTX_";
        break;
default:
        charptr = "CTZ_";
        break;
}

/* create or append batch tag */ mapfile_ptr = fopen(batchcode,"a");
fprintf(mapfile_ptr,"%s\t%d\n",batchcode,0);

/* post qio for terminal input */
if(((status = SYS$ASSIGN(&terminal,&ttchan,0,0))& 1) != 1)
        LIB$STOP(status);

next:
                                        /* digitize image frame for viewing */
        printf("\033[2J\n");
        r_status = digitize(group_no,buffer_no,in_lut,out_lut);
delay:  if(((status = sys$qiow(1,ttchan,IO$M_TIMED|
                IO$_READPROMPT,&iosb,0,0,&in_buf,3,4,0,prompt,
                strlen(prompt))) & 1) != 1)
                LIB$STOP(status);

switch (iosb[0]){
        case SS$_NORMAL :
                if(in_buf[0] == 'Y' || in_buf[0] == 'y')
                {
                        printf("\033[2J");
                        printf("Enter wafer description[up to 9 chars]: ");
                        scanf("%s",wafer_no);
                                        /* add .vfl ending*/
                        strcat(charptr,wafer_no,10);
                        strcat(charptr,vflexten,6);
                        r_status= digitize(group_no,buffer_no,in_lut,out_lut);
                        r_status = copy_frame(group_no,charptr);
                        if(r_status != 1)
                        {
                                printf("\033[2J");
                                printf("/nDT$COPYERROR...DISK FULL\n");
                        printf("IMAGE NOT SAVED..... hit C to continue:");
                                scanf("%s",response);
                        }

/* Set up system service call descriptors to get full file name including
   file extension for map data file */
                        fnl.dsc$w_length = strlen(charptr);
                        fnl.dsc$b_class  = DSC$K_CLASS_S;
                        fnl.dsc$b_dtype  = DSC$K_DTYPE_T;
                        fnl.dsc$a_pointer= charptr;

fno.dsc$w_length = 60;
                        fno.dsc$b_class  = DSC$K_CLASS_S;
                        fno.dsc$b_dtype  = DSC$K_DTYPE_D;
                        fno.dsc$a_pointer = outfile_name;

/* get full file name including latest file extension */
                        val2 = 0;
                        val = 2;
                        r_status = lib$find_file(&fnl,&fno,&val2,0,0,0,&val);
                printf("\n file_name is %d  %s",r_status,fno.dsc$a_pointer);
                                        /* data to map file */
                        fprintf(mapfile_ptr,"%s\t%d\n",outfile_name,no_moves);
                        charptr = charptr + 4;
                        *charptr = '\0';
                        charptr = charptr - 4;
                        break;
```

```
            }
            else if(in_buf[0] == 'E' || in_buf[0] == 'e')
            {
                    goto exit;
                    break;
            } else if(in_buf[0] == 'n' || in_buf[0] == 'N')
            {
                    printf("\033[2J");
                    printf("\nProcess image then hit C to continue:");
                    scanf("%s",response);
                    goto delay;
                    break;
            }
    }

/* position stage for next image capture sequence */ r_status = next_step(chanptr,xcorptr,ycorptr,no_movesptr);
    if(r_status != 1)
    {
            printf("\nLeitz command returns error ...exiting");
            goto exit;
    }
    goto next;
exit:
    fclose(mapfile_ptr);
}

/* MAP_WAFERBUF.C
    This function maps the data Translation frame buffers and
    ALU buffers into a MicroVax II virtual address space.
    Specificly it maps the address space of the two frame grabbers
    and two ALU to the virtual spaces as shown below
```

| MODULE | PHYSICAL ADDRESS (OCT) | VIRTUAL ADDRESS (HEX) |
|---|---|---|
| FRAME GRABBER NO. 1 | 2,000,000 | 400 |
| FRAME GRABBER NO. 2 | 4,000,000 | 40400 |
| ALU NO. 1 | 6,000,000 | 180600 |
| ALU NO. 2 | 12,000,000 | 200600 |

```
    No input is required. The function returns an integer 1 if the
    mapping was successful. The mapping of the buffers is not
    permanment and last only as long as the current process.
*/
#include secdef
#include ssdef
#include iodef
map_waferbuf()
{
    int     status;                     /* system service definitions */
    int     inaddr[2];                  /* starting virtual address */
    int     vbn;                        /* virtual block number */
    int     no_pages;
    int     dtmemaddr;                  /* board default configuration */
    int     qbusphyaddr;                /* Qbus starting address */
    int     virtstraddr;                /* Linker placed virt starting addr */
    int     page_count;
    int     byte_page;

/*
set up system service parameters for frame grabber no. 1
*/
    dtmemaddr   = 002000000;            /* frame grabber no. 1 physical
                                           address */
    qbusphyaddr = 0x30000000;           /* Qbus starting address */
    virtstraddr = 0x00000400;           /* Linker placed virt starting addr */
    page_count  = 1024;
    byte_page   = 512;

no_pages    = page_count;           /* number of pages to map */
    inaddr[0]   = virtstraddr;
    inaddr[1]   = virtstraddr + (page_count * byte_page) - 1; /*total bytes */
    vbn = (qbusphyaddr + dtmemaddr)/byte_page;              /* frame number */
```

```
/*
map frame buffer no.1 to microVax virtual address space
*/
        if(((status=sys$crmpsc(inaddr,0,0,SEC$M_PFNMAP|SEC$M_WRT
                    ,0,0,0,0,no_pages,vbn,0,0)) &1) !=1)
            lib$stop(status);

/*
set up system service parameters for frame grabber no. 2
*/
        dtmemaddr = 004000000;          /* frame grabber no. 2 physical
                                            address */
        qbusphyaddr = 0x30000000;        /* Qbus starting address */
        virtstraddr = 0x00100600;        /* Linker placed virt starting addr */
        page_count = 1024;
        byte_page = 512;

no_pages = page_count;           /* number of pages to map */
        inaddr[0] = virtstraddr;
        inaddr[1] = virtstraddr + (page_count * byte_page) - 1; /*total bytes */
        vbn = (qbusphyaddr + dtmemaddr)/byte_page;              /* frame number */

/*
map frame buffer no.2 to microVax virtual address space
*/
        if(((status=sys$crmpsc(inaddr,0,0,SEC$M_PFNMAP|SEC$M_WRT
                    ,0,0,0,0,no_pages,vbn,0,0)) &1) !=1)
            lib$stop(status);

/*
set up system service parameters for ALU no. 1
*/
        dtmemaddr = 006000000;          /* ALU No. 1 physical
                                            address */
        qbusphyaddr = 0x30000000;        /* Qbus starting address */
        virtstraddr = 0x00180600;        /* Linker placed virt starting addr */
        page_count = 1024;
        byte_page = 512;

no_pages = page_count;           /* number of pages to map */
        inaddr[0] = virtstraddr;
        inaddr[1] = virtstraddr + (page_count * byte_page) - 1; /*total bytes */
        vbn = (qbusphyaddr + dtmemaddr)/byte_page;              /* frame number */

/*
map ALU no.1 to microVax virtual address space
*/
        if(((status=sys$crmpsc(inaddr,0,0,SEC$M_PFNMAP|SEC$M_WRT
                    ,0,0,0,0,no_pages,vbn,0,0)) &1) !=1)
            lib$stop(status);

/*
set up system service parameters for ALU no. 2
*/
        dtmemaddr = 0012000000;         /* ALU No. 2 physical
                                            address */
        qbusphyaddr = 0x30000000;        /* Qbus starting address */
        virtstraddr = 0x00200600;        /* Linker placed virt starting addr */
        page_count = 1024;
        byte_page = 512;

no_pages = page_count;           /* number of pages to map */
        inaddr[0] = virtstraddr;
        inaddr[1] = virtstraddr + (page_count * byte_page) - 1; /*total bytes */
        vbn = (qbusphyaddr + dtmemaddr)/byte_page;              /* frame number */

/*
map ALU no.2 to microVax virtual address space
*/
        if(((status=sys$crmpsc(inaddr,0,0,SEC$M_PFNMAP|SEC$M_WRT
                    ,0,0,0,0,no_pages,vbn,0,0)) &1) !=1)
            lib$stop(status);
        return(1);
}
```

```
/*MAP_DTREGS
        This function maps the DATA TRANSLATION I/O registers from the
        default configuration of OCT 17776400 to a MicroVMS virtual
        starting address of HEX 00080400. It requires the user to the instruct
        the linker to place the register frames starting at HEX 00080400.
        i.e IMAGE3 HEX 00080400  GLOBAL No input is required. The function returns a int 1 if the
        mapping was successful. The mapping of the registers is not
        permanment and last only as long as the current process.
*/
#include secdef
#include ssdef
#include iodef
map_dtregs()
{                                       /* system service definitions */
        int     status;
        int     inaddr[2];              /* starting virtual address */
        int     vbn;                    /* virtual block number */
        int     no_pages;
/*
DEFINITIONS
*/
        int     io_addr= 017776400;     /* board default configuration */
        int     addr_mask = 000017777;
        int     qbusphyaddr = 0x20000000; /* Qbus starting address */
        int     virtstraddr = 0x00080400;/* Linker placed virt starting addr */
        int     page_count  = 1;        /* only one page needed */
        int     byte_page = 512;

/*
 set up system service parameters
*/
        no_pages = page_count;
        inaddr[0] = virtstraddr;
        inaddr[1] = virtstraddr + (page_count * byte_page) - 1; /*total bytes */
        vbn = ((io_addr & addr_mask) + qbusphyaddr)/byte_page;  /*pages*/
/*
map virt frame buffers to microVax physical Q_bus address
*/
        if(((status=sys$crmpsc(inaddr,0,0,SEC$M_PFNMAP|SEC$M_WRT
                        ,0,0,0,0,no_pages,vbn,0,0)) &1) !=1)
                        lib$stop(status);
        return(1);
}

/* FG_INIT();
        This routine initialize both frame grabbers. No input is required.
returns a one if it was successful.
*/
include "virt_frames.h"
globalref struct reg_frame dt_io_regs;
fg_init()
{
        short temp1,temp2;              /* temporary variable */
        short temp3,temp4;
        short grnred,blue;              /* values for luts */
        short i,j;

/* reset frame grabber */ dt_io_regs.dt0_incsr1 = 0x8000;
        dt_io_regs.dt0_incsr1 = 0;

/* configure board to have the following characteristics
                no write protection
                select buffer 0
                select lut 0
                select channel 0
                function f=a
                mode = normal

*/
                dt_io_regs.dt0_incsr2 = 0;

/* sync to camera and display buffer 0 */
```

```
                dt_io_regs.dt0_outcsr = 0x00a0;

/* load output and input luts...lut = 0 with linear data */ temp1 = dt_io_regs.dt0_incsr1;
                temp2 = dt_io_regs.dt0_incsr2;
                temp3 = dt_io_regs.dt0_outcsr;

/* turn off display */
                dt_io_regs.dt0_outcsr = dt_io_regs.dt0_outcsr & 0xff7f;

/* configure to lut access mode */
                dt_io_regs.dt0_incsr2 = 0x6830;

/* load luts */ for(i=0;i<=255;i++) {
                        dt_io_regs.dt0_index = i;        /* input lut data */
                        dt_io_regs.dt0_inlut = i;
                        grnred = i;
                        blue = i;
                        grnred = grnred << 8;
                        grnred = grnred | blue;
                        dt_io_regs.dt0_redgrn = grnred;
                        dt_io_regs.dt0_blue = blue;
                }
                dt_io_regs.dt0_incsr1 = temp1;
                dt_io_regs.dt0_incsr2 = temp2;
                dt_io_regs.dt0_outcsr = temp3;

/* do the same for the second set of frame memory; */

/* reset frame grabber */ dt_io_regs.dt1_incsr1 = 0x8000;
        dt_io_regs.dt1_incsr1 = 0;

/* configure board to have the following characteristics
                no write protection
                select buffer 0
                select lut 0
                select channel 0
                function f=a
                mode = normal
*/
                dt_io_regs.dt1_incsr2 = 0;

/* sync to camera and display buffer 0 */ dt_io_regs.dt1_outcsr = 0x00a0;

/* load output and input luts...lut = 0 with linear data */ temp1 = dt_io_regs.dt1_incsr1;
                temp2 = dt_io_regs.dt1_incsr2;
                temp3 = dt_io_regs.dt1_outcsr;

/* turn off display */
                dt_io_regs.dt1_outcsr = dt_io_regs.dt1_outcsr & 0xff7f;

/* configure to lut access mode */ dt_io_regs.dt1_incsr2 = 0x6830;

/* load luts */
                grnred = 0;
                blue = 0;
                for(i=0;i<=255;i++) {
                        dt_io_regs.dt1_index = i;        /* input lut data */
                        dt_io_regs.dt1_inlut = i;
                        grnred = i;
                        blue = i;
                        grnred = grnred << 8;
```

```
                grnred = grnred | blue;
                dt_lo_regs.dtl_redgrn = grnred;
                dt_lo_regs.dtl_blue = blue;
        }
        dt_lo_regs.dtl_incsr1 = temp1;
        dt_lo_regs.dtl_incsr2 = temp2;
        dt_lo_regs.dth_outcsr = temp3;

return(1);
}

/* ALU_INIT(ALU_NO)

This function initializes the ALU board(s) to a predicatable state.
The SHORT INT ALU_NO selects between alu 0 or 1 for which board to initialze.
If alu_no is not zero or one then both alu's are initialized.
The state of the board(s) after a successful initializtion is:

no zoom or pan
        arithematic mode
        function equal F = A
        port-in mode
        interupt disabled
        Lut zero is selected
        Busy bit is cleared
        Lut zero is linearized The function returns a one if the initialization is successful

*/
include "virt_frames.h"
globalref struct reg_frame dt_lo_regs;

alu_init(alu_no)
short alu_no;
{
        short i;
        short r_status;                 /* status returned */ switch(alu_no){
        case 0:                         /* initialize board zero */ dt_lo_regs.alu0_control = 0x0002; /* abort if necessary */
                dt_lo_regs.alu0_control = 0x0002;
                dt_lo_regs.alu0_status  = 0x0000;
                dt_lo_regs.alu0_xoffset = 0x0000;
                dt_lo_regs.alu0_yoffset = 0x0000;
                dt_lo_regs.alu0_index   = 0x0000; /* load lut 0 */
                for(i=0;i<=255;i++)
                        dt_lo_regs.alu0_lutdata = i;
                break;

case 1:                         /* initialize board one */ dt_lo_regs.alu1_control = 0x0002; /* abort if necesary */
                dt_lo_regs.alu1_control = 0x0002;
                dt_lo_regs.alu1_status  = 0x0000;
                dt_lo_regs.alu1_xoffset = 0x0000;
                dt_lo_regs.alu1_yoffset = 0x0000;
                dt_lo_regs.alu1_index   = 0x0000; /* load lut 1 */
                for(i=0;i<=255;i++)
                        dt_lo_regs.alu1_lutdata = i;
                break;

default:                        /* initialize both alu's */ dt_lo_regs.alu0_control = 0x0002; /* abort if necessary */
                dt_lo_regs.alu0_control = 0x0002;
                dt_lo_regs.alu0_status  = 0x0000;
                dt_lo_regs.alu0_xoffset = 0x0000;
                dt_lo_regs.alu0_yoffset = 0x0000;
                dt_lo_regs.alu0_index   = 0x0000; /* load lut 0 */
                for(i=0;i<=255;i++)
                        dt_lo_regs.alu0_lutdata = i;
```

```
        dt_io_regs.alul_control  = 0x0002;  /* abort if necessary */
        dt_io_regs.alul_control  = 0x0002;
        dt_io_regs.alul_status   = 0x0000;
        dt_io_regs.alul_xoffset  = 0x0000;
        dt_io_regs.alul_yoffset  = 0x0000;
        dt_io_regs.alul_index    = 0x0000;  /* load lut 1 */
        for(i=0;i<=255;i++)
                dt_io_regs.alul_lutdata = i;
        break;

}
    return(1);
}

/*CHAN_GET.C
 - This program assigns an I/O channel to port #2 of the RS232
for use by the Leitz Stage controller.
*/ chan_get(channel)
short int *channel;
{
#include stdio
#include descrip
#include iodef
#include ssdef
#include ttdef
#include tt2def
#include dcdef
short int status;
static short chanel;
static $DESCRIPTOR(terminal,"TTA2:");
chanel = *channel;

/* Assign a channel to the terminal */ status = SYS$ASSIGN(&terminal,&chanel,0,0) & 1;

*channel = chanel;
return (status);
}

/*stage_init.C
        This program initializes the Leitz_controller's stage and place it in
        a halt state.
*/ include math
include stdio
#include descrip
#include iodef
#include ssdef
#include ttdef
#include tt2def
#include dcdef
stage_init(ichan,first_x,first_y)
short *ichan;
int *first_x,*first_y;
{
#define BUFLEN 81
#define BUFLEN1 200
#define BUF1 10
int xnum,ynum;
short int status,channel,sign;
static short iosb[4];
static char buffer2[BUFLEN];
static unsigned char buffer[BUFLEN],xy_buffer[BUFLEN1];
int mask2[2] = {0,0x16};
int four_mask[2] = {0,0x20};
int f_mask[2] = {0,0x0f};
int i,j;
int mask[2] = {0,0x20};
short term_mask[2] = {0,0x0d | 0x0a};
char mask3 = 0x11;
```

```
char mask_1[3] = {0x05,0x80,0x80};
char stop_mask = 0x5b;
char pgm = 0x27;
char enter = 0x22;
char brk = 0x26;
char one = 0x3a;
char five = 0x31;
char au_to = 0x5c;
char mask_addr;
char xval[10],yval[10];
char kstr;

xnum = ynum = 0;
channel = *ichan;

status = SYS$QIOW(1,channel,IO$_READVBLK | IO$M_NOECHO
                | IO$M_NOFILTR | IO$M_ESCAPE,
                &iosb,0,0,buffer,BUF1,40,mask2,
                0,0) & 1;

status = SYS$QIOW(1,channel,IO$_WRITEVBLK |
                IO$M_NOFORMAT,
                &iosb,0,0,&mask3,1,0,0,
                0,0) & 1;
        status = SYS$QIOW(1,channel,IO$_WRITEVBLK |
                IO$M_NOFORMAT,
                &iosb,0,0,&mask2,1,0,0,
                0,0) & 1;

for(i = 0; i <= 6; i++)
        { status = SYS$QIOW(1,channel,IO$_READVBLK | IO$M_NOECHO
                | IO$M_NOFILTR,
                &iosb,0,0,buffer,BUFLEN,1,four_mask,
                0,0) & 1;
        } status = SYS$QIOW(1,channel,IO$_READVBLK | IO$M_NOECHO
                | IO$M_NOFILTR,
                &iosb,0,0,buffer,BUFLEN,1,four_mask,
                0,0) & 1;

status = SYS$QIOW(1,channel,IO$_WRITEVBLK |
                IO$M_NOFORMAT,
                &iosb,0,0,&stop_mask,1,0,0,
                0,0) & 1;

status = SYS$QIOW(1,channel,IO$_READVBLK
                | IO$M_NOECHO | IO$M_NOFILTR,
                &iosb,0,0,buffer,BUFLEN,1,four_mask,
                0,0) & 1;

status = SYS$QIOW(1,channel,IO$_WRITEVBLK |
                IO$M_NOFORMAT,
                &iosb,0,0,mask_1,3,0,0,
                0,0) & 1;
/***************************************************
        DELAY   LOOP
***************************************************/

/***************************************************
***************************************************/ for(i = 0; i < 200000; i++)
    j = i;

printf("\n");

status = SYS$QIOW(1,channel,IO$_WRITEVBLK |
                IO$M_NOFORMAT,
                &iosb,0,0,&pgm,1,0,0,
                0,0) & 1;
```

```
           status = SYS$QIOW(1,channel,IO$_READVBLK
                        | IO$M_NOECHO | IO$M_NOFILTR,
                        &iosb,0,0,buffer,BUFLEN,1,f_mask,
                        0,0) & 1;
/*****************************************************************/ status = SYS$QIOW(1,channel,IO$_WRITEVBLK |
                        IO$M_NOFORMAT,
                        &iosb,0,0,&one,1,0,0,
                        0,0) & 1;

/*****************************************************************/
           status = SYS$QIOW(1,channel,IO$_READVBLK
                        | IO$M_NOECHO | IO$M_NOFILTR,
                        &iosb,0,0,buffer,BUFLEN,1,four_mask,
                        0,0) & 1;
/*****************************************************************/ status = SYS$QIOW(1,channel,IO$_WRITEVBLK |
                        IO$M_NOFORMAT,
                        &iosb,0,0,&enter,1,0,0,
                        0,0) & 1;

/*****************************************************************/
           status = SYS$QIOW(1,channel,IO$_READVBLK
                        | IO$M_NOECHO | IO$M_NOFILTR,
                        &iosb,0,0,buffer,BUFLEN,1,four_mask,
                        0,0) & 1;
/*****************************************************************/ status = SYS$QIOW(1,channel,IO$_WRITEVBLK |
                        IO$M_NOFORMAT,
                        &iosb,0,0,&au_to,1,0,0,
                        0,0) & 1;

/*****************************************************************/
/*****************************************************************/ status = SYS$QIOW(1,channel,IO$_READVBLK
                        | IO$M_NOECHO | IO$M_NOFILTR,
                        &iosb,0,0,xy_buffer,BUFLEN1,0,four_mask,
                        0,0) & 1;

/*****************************************************************
           GET X & Y VALUES
*****************************************************************/ printf ("\n");
for (i = 0;i < BUFLEN1;i++)
  {
    if (xy_buffer[i] == '-')
        {
        xval[0] = '-';
        xval[1] = xy_buffer[i + 1];
        xval[2] = xy_buffer[i + 2];
        xval[3] = xy_buffer[i + 3];
        xval[4] = xy_buffer[i + 4];
        xval[5] = xy_buffer[i + 5];
        xval[6] = xy_buffer[i + 6];
        }
    if (xy_buffer[i] == '+')
        {
        yval[0] = '+';
        yval[1] = xy_buffer[i + 1];
        yval[2] = xy_buffer[i + 2];
        yval[3] = xy_buffer[i + 3];
        yval[4] = xy_buffer[i + 4];
        yval[5] = xy_buffer[i + 5];
        yval[6] = xy_buffer[i + 6];
        }
  }
```

```
/******************************************************
    CONVERT X ARRAY VALUES TO SINGLE INTEGER
******************************************************/ sign = 1;
i = 0;
if (xval[i] == '-')
   {
    sign = -1;
   }
    i = 1;

for (xnum = 0;xval[i] >= '0' && xval[i] <= '9';i++)
    xnum = 10 * xnum + xval[i] - '0';

xnum = sign * xnum;

/******************************************************
    CONVERT Y ARRAY VALUES TO SINGLE INTEGER
******************************************************/ sign = 1;
i = 0;
if (yval[i] == '-')
   {
    sign = -1;
   }
    i++;

for (ynum = 0;yval[i] >= '0' && yval[i] <= '9';i++)
    ynum = 10 * ynum + yval[i] - '0';

ynum = sign * ynum;

/******************************************************
   RETURN ARRAY VALUES TO CALLING PROGRAM
******************************************************/

*first_x = xnum;
*first_y = ynum;

return(status);
}

/* DIGITIZE(Group_no,buffer_no,in_lut,out_lut)
        This function digitizes one frame of data and stores it in
the buffer specified by the GROUP_NO and BUFFER_NO both short integers(0:1).
IN_LUT and OUT_LUT specifies the input and out_put luts respectively (0:7)
This routines stops the current action of the dt2651, and presumes the luts
have been properly initialized by a user prior to calling this routine.
It returns a one if it is successful in the digitization.

action taken:
        clears busy and passthrough bits
        change luts to the ones selected.
        turns on display to the buffer selected for input
        Alu function becomes f=a.
        mode is normal/slow scan.
        cursor remains

*/
include "virt_frames.h"
globalref struct reg_frame dt_io_regs;

digitize(group_no,buffer_no,in_lut,out_lut)
short group_no,buffer_no;
short in_lut,out_lut;
{
        short temp;

switch(group_no){
        case 0:                                       /* group 0 */
```

```
            dt_io_regs.dt0_incsr1 = dt_io_regs.dt0_incsr1 & 0xff00;
            in_lut = in_lut & 0x0007;                    /* get valid numbers */
            out_lut = out_lut & 0x0007;
            buffer_no = buffer_no & 0x0001;
            temp = buffer_no;

/* select luts */
            buffer_no = buffer_no << 7;
            dt_io_regs.dt0_incsr1 = dt_io_regs.dt0_incsr1 | in_lut;

/* select mode and alu function */
            dt_io_regs.dt0_incsr2 = 0x0000;
            dt_io_regs.dt0_incsr2 = dt_io_regs.dt0_incsr2 | buffer_no;

/* display */
            dt_io_regs.dt0_outcsr = dt_io_regs.dt0_outcsr & 0xfff0;
            dt_io_regs.dt0_outcsr = dt_io_regs.dt0_outcsr | out_lut;
            dt_io_regs.dt0_outcsr = dt_io_regs.dt0_outcsr | 0x0080;
            temp = temp << 4;
            dt_io_regs.dt0_outcsr = dt_io_regs.dt0_outcsr | temp;

/* start digitization */
            dt_io_regs.dt0_incsr1 = dt_io_regs.dt0_incsr1 | 0x0080;
            while((dt_io_regs.dt0_incsr1 & 0x0080) != 0)   /* wait */
              ;
            break;

default:                                          /* group 1 */
            dt_io_regs.dt1_incsr1 = dt_io_regs.dt1_incsr1 & 0xff00;
            in_lut = in_lut & 0x0007;                    /* get valid numbers */
            out_lut = out_lut & 0x0007;
            buffer_no = buffer_no & 0x0001;
            temp = buffer_no;

/* select luts */
            buffer_no = buffer_no << 7;
            dt_io_regs.dt1_incsr1 = dt_io_regs.dt1_incsr1 | in_lut;

/* select mode and alu function */
            dt_io_regs.dt1_incsr2 = 0x0000;
            dt_io_regs.dt1_incsr2 = dt_io_regs.dt1_incsr2 | buffer_no;

/* display */
            dt_io_regs.dt1_outcsr = dt_io_regs.dt1_outcsr & 0xfff0;
            dt_io_regs.dt1_outcsr = dt_io_regs.dt1_outcsr | out_lut;
            dt_io_regs.dt1_outcsr = dt_io_regs.dt1_outcsr | 0x0080;
            temp = temp << 4;
            dt_io_regs.dt1_outcsr = dt_io_regs.dt1_outcsr | temp;

/* start digitization */
            dt_io_regs.dt1_incsr1 = dt_io_regs.dt1_incsr1 | 0x0080;
            while((dt_io_regs.dt1_incsr1 & 0x0080) != 0)   /* wait */
              ;
            break;
        }
        return(1);
}

/* copy_frame.c - This program will create a sequential file using RMS,
                  and copy the image in the frame specfied by integer
                  FRAME_NO (0,1,2 or 3), to the file specified in
                  the char string array FILE_NAME.
                  The function returns a 1 if it successfully completes
                  the transfer or 0 if some failure accured.
                  The file that is created is of fixed length record,
                  512 block long, with each pixel comprising a byte
                  in each record. Record 0 contains line 0, record 1
                  line 1 etc.
*/ include "virt_frames.h"
globalref char frame0[512][512];
globalref char frame1[512][512];
```

```
globalref char frame2[512][512];
globalref char frame3[512][512];
include rms copy_frame(frame_no,file_name)
int frame_no;
char file_name[];
    {
        char (*ptrframe)[512];
        char buffer[512][512];
        int i,j;
        struct FAB seq_fab;
        struct RAB seq_rab;
        register status;

/*Initialize the FAB and RAB
        */
        seq_fab = cc$rms_fab;
        seq_rab = cc$rms_rab;

seq_fab.fab$l_fna      = file_name;
        seq_fab.fab$b_fns      = strlen (file_name);
        seq_fab.fab$b_fac      = FAB$M_PUT|FAB$M_BIO;/*write access*/
        seq_fab.fab$w_mrs      = 512;           /*max record size*/
        seq_fab.fab$b_rfm      = FAB$C_FIX;     /*fix lenght record */
        seq_fab.fab$b_org      = FAB$C_SEQ;     /* sequential access */ seq_rab.rab$l_fab      = &seq_fab;
        seq_rab.rab$l_bkt      = 0;
        seq_rab.rab$w_rsz      = 65024;         /* byte per block transfer*/

/* choose image buffer to be copied to disk file */ if(frame_no == 0)
        {
            for(i=0;i<=511;i++)
                for(j=0;j<=511;j++)
                    buffer[i][j]=frame0[i][j];
        }
else if(frame_no == 1)
        {
            for(i=0;i<=511;i++)
                for(j=0;j<=511;j++)
                    buffer[i][j]=frame1[i][j];
        }
else if(frame_no == 2)
        {
            for(i=0;i<=511;i++)
                for(j=0;j<=511;j++)
                    buffer[i][j]=frame2[i][j];
        }
else
        {
            for(i=0;i<=511;i++)
                for(j=0;j<=511;j++)
                    buffer[i][j]=frame3[i][j];
        }
ptrframe = buffer;
seq_rab.rab$l_rbf = ptrframe;  /*write buffer address parameter*/

/*Create the file and connect the record stream */ if (((status = SYS$CREATE (&seq_fab)) & 1) != 1)
        goto error;
if (((status = SYS$CONNECT (&seq_rab)) & 1) != 1)
        goto error;

/* do block tranfers in 4 sections, 127 lines each */ for(i=0;i<=3;i++)
```

```
        ' if (((status = SYSSWRITE (&seq_rab)) & 1) != 1)
                goto error;
            ptrframe = ptrframe + 127;
            seq_rab.rab$l_rbf = ptrframe;
    }

/* copy the remaining 4 lines, 2048 bytes */ seq_rab.rab$w_rsz = 2048;
    if (((status = SYSSWRITE (&seq_rab)) & 1) != 1)
            goto error;

/* close the file */ if (((status = SYS$CLOSE (&seq_fab)) & 1) != 1)
            goto error;

/* reset write parameters so next process write will start at top
       of frame */ ptrframe = buffer;
    seq_rab.rab$w_rsz = 65024;       /* total bytes per block transfer*/
    seq_rab.rab$l_rbf = ptrframe;

return(1);
error:
    return(0);
    }

/*next_step.C
    This program sends joy stick commands to the  Leitz's controller

*/ next_step(ichan,x_val,y_val,steps)
short *ichan,*steps;
int *x_val,*y_val;
{
#include math
include stdio
#include descrip
#include iodef
#include ssdef
#include ttdef
#include tt2def
#include dcdef
#define BUFLEN 200
#define BUF1 10
int xnum,ynum;
short status,psteps;
short i,j,channel,sign;
short term_mask[2] = {0,0x0d | 0x0a};
static short iosb[4];
int mask[2] = {0,0x20};
int mask2[2] = {0,0x16};
int four_mask[2] = {0,0x20};
static char buffer2[BUFLEN];
static unsigned char buffer[BUFLEN],xy_buffer[BUFLEN];
int eq_mask[2] = {0,0x20};
int eq_mask1[2] = {0,0x11};
char mask_1[3];
char xval[10];
char yval[10];
char mask_addr,*jstick;
char stg_mask = 0x4d;
char mask3 = 0x11;
char nul_mask[3] = {0x05,0x80,0x80};
char stop_mask = 0x5b;
char chr;
channel = *ichan;

xnum = ynum = 0;

/********************************************************************
        PERFORM command (READ "EQ" FROM CONTROLLER)
*********************************************************************/
```

```
printf ("\n");
printf ("reading inquire from controller\n");
printf ("\n");
        status = SYS$QIOW(1,channel,IO$_READVBLK | IO$M_NOECHO
              | IO$M_NOFILTR | IO$M_ESCAPE,
              &iosb,0,0,buffer,BUFLEN,0,eq_mask,
              0,0) & 1;
```

/*************************************************************
        SEND EQ NUL NUL AS REPLY TO EQ
*************************************************************/

```
        status = SYS$QIOW(1,channel,IO$_WRITEVBLK | IO$M_NOFORMAT,
              &iosb,0,0,&nul_mask,3,0,0,
              0,0) & 1;
```

/*************************************************************
        INCREMENT STAGE STEPS
*************************************************************/

```
psteps = *steps;
psteps++;
*steps = psteps;

printf("\nnumber of steps = %d",psteps);
printf("\n");
```

/*************************************************************
        PERFORM command ( SWITCH "STG NEXT" ON)
*************************************************************/

```
printf ("\n");
printf ("writing STG NEXT TO controller\n");
printf ("\n");
        status = SYS$QIOW(1,channel,IO$_WRITEVBLK | IO$M_NOFORMAT,
              &iosb,0,0,&stg_mask,1,0,0,
              0,0) & 1;
```

/*************************************************************
        PERFORM command (READ "EQ" FROM CONTROLLER)
*************************************************************/

```
        status = SYS$QIOW(1,channel,IO$_READVBLK | IO$M_NOECHO
              | IO$M_NOFILTR | IO$M_ESCAPE,
              &iosb,0,0,buffer,BUFLEN,0,eq_mask,
              0,0) & 1;
```

/*************************************************************
        SEND EQ NUL NUL AS REPLY TO EQ
*************************************************************/

```
        status = SYS$QIOW(1,channel,IO$_WRITEVBLK | IO$M_NOFORMAT,
              &iosb,0,0,&nul_mask,3,0,0,
              0,0) & 1;
```

/*************************************************************
        PERFORM command (READ "EQ" FROM CONTROLLER)
*************************************************************/

```
        status = SYS$QIOW(1,channel,IO$_READVBLK | IO$M_NOECHO
              | IO$M_NOFILTR | IO$M_ESCAPE,
              &iosb,0,0,buffer,BUFLEN,0,eq_mask,
              0,0) & 1;
```

/*************************************************************
        SEND EQ NUL NUL AS REPLY TO EQ
*************************************************************/

```
                status = SYS$QIOW(1,channel,IO$_WRITEVBLK | IO$M_NOFORMAT,
                       &iosb,0,0,&nul_mask,3,0,0,
                       0,0) & 1;
```

/*******************************************************************
      PERFORM command (READ CO-ORDINATES FROM CONTROLLER)
*******************************************************************/

```
                status = SYS$QIOW(1,channel,IO$_READVBLK | IO$M_NOECHO
                       | IO$M_NOFILTR | IO$M_ESCAPE,
                       &iosb,0,0,xy_buffer,BUFLEN,0,eq_mask,
                       0,0) & 1;
```

/*******************************************************************
      SEND EQ NUL NUL AS REPLY TO EQ
*******************************************************************/

```
                status = SYS$QIOW(1,channel,IO$_WRITEVBLK | IO$M_NOFORMAT,
                       &iosb,0,0,&nul_mask,3,0,0,
                       0,0) & 1;
```

/*******************************************************************
      PERFORM command (READ "EQ" FROM CONTROLLER)
*******************************************************************/

```
                status = SYS$QIOW(1,channel,IO$_READVBLK | IO$M_NOECHO
                       | IO$M_NOFILTR | IO$M_ESCAPE,
                       &iosb,0,0,xy_buffer,BUFLEN,0,eq_mask,
                       0,0) & 1;
```

/*******************************************************************
      GET X & Y VALUES
*******************************************************************/

```
printf ("\n");

for (i = 0; i < BUFLEN; i++)
  {
   if (xy_buffer[i] == '-')
      {
       xval[0] = '-';
       xval[1] = xy_buffer[i + 1];
       xval[2] = xy_buffer[i + 2];
       xval[3] = xy_buffer[i + 3];
       xval[4] = xy_buffer[i + 4];
       xval[5] = xy_buffer[i + 5];
       xval[6] = xy_buffer[i + 6];
      }
   if (xy_buffer[i] == '+')
      {
       yval[0] = '+';
       yval[1] = xy_buffer[i + 1];
       yval[2] = xy_buffer[i + 2];
       yval[3] = xy_buffer[i + 3];
       yval[4] = xy_buffer[i + 4];
       yval[5] = xy_buffer[i + 5];
       yval[6] = xy_buffer[i + 6];
      }
  }
```

/*******************************************************************
   CONVERT X ARRAY VALUES TO SINGLE INTEGER
*******************************************************************/

```
sign = 1;

i = 0;
if (xval[i] == '-')
   {
```

```
        sign = -1;
    }
    i = 1;

for (xnum = 0;xval[i] >= '0' && xval[i] <= '9';i++)
        xnum = 10 * xnum + xval[i] - '0';

xnum = sign * xnum;

/*************************************************
        CONVERT Y ARRAY VALUES TO SINGLE INTEGER
    *************************************************/ sign = 1;
    i = 0;
    if (yval[i] == '-')
    {
        sign = -1;
    }
    i = 1;

for (ynum = 0;yval[i] >= '0' && yval[i] <= '9';i++)
        ynum = 10 * ynum + yval[i] - '0';

ynum = sign * ynum;

/*************************************************
        RETURN COORDINATES TO CALLING PROGRAM
    *************************************************/

*x_val = xnum;
    *y_val = ynum;

return (status);
}
```

What is claimed is:

1. A scanning laser microscope system for assisting in the characterization of an object, the system comprising:

a first laser for producing a first linearly polarized, substantially collimated, single wavelength beam of light having an axis;

means for scanning the beam in a raster scanning fashion in a first direction across a scanning plane of the object and in a second direction perpendicular to the first direction across the scanning plane of the object;

means for enhancing light from the object by increasing contrast between anomalies and a remainder of the object;

means for detecting light from the enhancing means and for generating electrical signals representative of the intensity of the detected light; and means for creating an image representative of the scanning plane of the object from the detected light.

2. The system of claim 1, wherein:

the object comprises a birefringent, partially transparent material.

3. The system of claim 1, wherein the scanning means comprises:

a rotor rotatable about a rotor axis and having a circumferential side with a plurality of reflective facets, the rotor positioned to receive the beam on one of the facets;

means for rotating the rotor to cause the beam axis to scan in the first direction across the scanning plane of the object;

first optical means for directing the beam axis from the rotor at varying angles of incidence to a first point;

a planar mirror rotatable abort a mirror axis perpendicular to the rotor axis and intersecting the point, the mirror positioned to receive the beam from the first optical directing means;

a galvanometer connected to the planar mirror to cause the planar mirror to move about the mirror axis and to cause the beam axis to also scan in the second direction across the scanning plane of the object, thereby defining a raster light pattern in a plane perpendicular to the beam axis reflected from the planar mirror;

second optical means for directing the beam axis from the mirror at varying angles of incidence to a second point; and a flat field apochromat objective lens positioned at the second point, the lens for receiving the beam from the second optical directing means and for focusing the beam to the scanning plane of the object.

4. The system of claim 3, further comprising:

means for sensing to send signals to be used by the creating means to ensure that each frame begins using the same facet of the rotor.

5. The system of claim 1, wherein the enhancing means comprises:

a rotatable polarizing filter for selectively passing the light from the object to the detecting means at a particular polarization angle.

6. The system of claim 5, wherein the enhancing means further comprises:

a spatial filter assembly having an aperture selectively positionable in a plane parallel to the object scanning plane and for passing a portion of the light from the object.

7. The system of claim 1, wherein the enhancing means comprises:

a spatial filter assembly having an aperture selectively positionable in a plane parallel to the object scanning plane and for passing a portion of the light from the object.

8. The system of claim 7, wherein the spatial filter assembly further comprises:
a housing having a slot and a passage, the housing for rotatably mounting on the detecting means such that the light from the object passes through the passage to the detecting means;
a support plate having a hole and slidable in the slot;
a track piece slidable through the hole;
a holder seat in the passage and connected to the track piece;
a filter holder rotatably supported by the holder seat; and
a filter having the aperture supported by the filter holder, whereby the aperture is positionable in one linear direction by sliding the track piece through the plate hole and in another linear direction perpendicular to the one linear direction by sliding the support plate in the housing slot.

9. The system of claim 8, wherein the spatial filter assembly further comprises:
an actuating member connected to the filter holder and slidably positioned in a groove in the track piece such that when the member slides in the groove the filter is moved in an angular direction.

10. The system of claim 7, wherein the spatial filter assembly further comprises:
a base having a passage, the base for rotatably mounting on the detecting means such that the light from the object passes through the passage to the detecting means;
a rotatable holder having an optical aperture, a portion rotatably supported in the passage, an annular groove and an off center pin;
a spatial filter plate movable about the pin and having an optical aperture, an off center hole for receiving the pin, and a radial groove; and
a rotatable disk having an optical aperture, an off center pin for projecting into the plate radial groove, and a pin for projecting into the holder annular groove, whereby the holder optical aperture, the plate optical aperture and the disk optical aperture are aligned and movable by rotating one or more of the base, the holder and the disk.

11. The system of claim 7, wherein the spatial filter assembly further comprises:
a base having a passage, the base for rotatably mounting on the detecting means such that the light from the object passes through the passage to the detecting means;
a diaphragm assembly having a movable iris diaphragm selectively defining the size of the aperture aligned with the base passage;
a support having a hole positioned adjacent the diaphragm assembly;
an arm in the support linearly slidable through the hole;
a light blocking member mounted on the arm and alignable to block some or all of the light from the object before the light passes through the variable aperture; and
means for focusing the light from the object toward the detecting means.

12. The system of claim 11, wherein the focusing means further comprises:
a pair of biconvex lenses positioned to focus the light from the object through the spatial filter assembly aperture to the detecting means.

13. The system of claim 7, wherein the enhancing means further comprises:
a biconvex lens positioned to focus the light from the object through the spatial filter assembly aperture to the detecting means.

14. The system of claim 7, wherein:
the aperture is shaped like a cross.

15. The system of claim 7, wherein:
the aperture is shaped to substantially match a uniform intensity level area in an interference pattern formed when linearly polarized, substantially monochromatic light is transmitted through the object.

16. The system of claim 7, wherein:
the aperture has a circular cross section.

17. The system of claim 7, wherein:
the aperture is annular shaped.

18. The system of claim 1, wherein:
the enhancing means receives light transmitted through the object.

19. The system of claim 1, wherein:
the enhancing means receives light reflected from the object.

20. The system of claim 19, wherein:
the enhancing means further receives light transmitted through the object.

21. The system of claim 1, wherein:
the enhancing means permits only light wavelengths emitted by the object to pass through the enhancing means.

22. The system of claim 1, wherein the creating means comprises:
means for determining the position of the beam on the object scanning plane;
means for storing the signals in storage locations corresponding to the position of the beam on the object scanning plane;
means for forming the stored signals into the image representative of the object scanning plane; and
means for displaying the image.

23. The system of claim 1, wherein the creating means comprises:
means for generating a pixel clock signal representative of the position of the beam in the first direction on the object scanning plane;
means for causing the position of the beam on the object scanning plane in the second direction to conform to a desired beam position;
means for storing the detected light signals;
means for providing control signals to the storing means based on the pixel clock signals in the first direction and the desired beam position in the second direction to synchronize the storing means such that the detected light signals are stored in storage locations corresponding to the position of the beam on the object scanning plane; and
means for forming the stored signals into an image representative of the object scanning plane.

24. The system of claim 23, wherein the generating means includes:
a phase-locked loop means for synchronizing the phase of its output with the phase of its input such that the pixel clock signal is synchronized with a spatially derived input; and
means for multiplying the spatially derived frequency of the phase-locked loop input by a predetermined number to form the pixel clock signals.

25. The system of claim 23, wherein the causing means includes:
a planar reflective surface having an axis;
a galvanometer supporting the reflective surface such that when the galvanometer is energized, the reflective surface moves about the axis;
means for directing a second light beam on the reflective surface such that when the galvanometer is energized, the beam scans in a fashion corresponding to the first beam in the second direction on the scanning plane of the object;
a light sensor positioned to receive the second beam reflected from the reflective surface and to generate a signal representative of the actual position of the first beam in the second direction on the object scanning plane; and
a galvanometer control means for controlling the energization of the galvanometer to conform to the desired beam position based on the actual beam position signal and a reference signal sent by the providing means.

26. The system of claim 23, further comprising:
means for sending signals to the providing means indicating the position of the beam on the object scanning plane at the beginning of each scan of the beam in the first direction, whereby the control signals supplied by to providing means are further based on the signals indicating the beginning position of each scan.

27. The system of claim 23, wherein the storing means comprises:
a digital frame storage means for sampling, digitizing and storing the signal from the detecting means while the beam is scanning a frame;
means for storing a plurality of frames of digitized signals transferable from the digital frame storage means; and
the forming means comprises a central processing unit for controlling the transfer of signals from the digital frame storage means to the storing means.

28. The system of claim 1, further comprising:
another laser for producing another linearly polarized, substantially collimated, single wavelength beam of light, the laser positioned to direct another beam along the path of the first beam from the scanning means to the object.

29. The system of claim 28, wherein:
the another laser is tunable to different wavelengths.

30. The system of claim 1, further comprising:
confocal means for detecting light reflected from the object and for generating electrical signals representative of the intensity of the detected reflected light; and
the creating means also for creating an image representative of the object from the detected reflected light.

31. The system of claim 1, wherein the enhancing means comprises:
a wavelength selective filter assembly for selectively passing light emitted from the object and blocking the laser beam of light.

32. The system of claim 31, wherein:
the light emitted from the object is luminescence.

33. The system of claim 32, wherein:
the light emitted from the object is fluorescence caused by the laser beam.

34. The system of claim 1, wherein the detecting means comprises:
a first detecting means and a second detecting means; and the enhancing means comprises:
a housing having means for mounting a wavelength selective beam splitter such that the light from the object within a first predetermined wavelength range passes through the beam splitter to the first detecting means and light from the object within a second predetermined wavelength range is reflected by the beam splitter to the second detecting means.

35. The system of claim 1, wherein the enhancing means comprises:
a rotatable filter wheel assembly comprising a plurality of filters, each one of the filters allowing a different range of wavelengths to pass through the filter, and means for rotating the filter wheel assembly such that the light from the object passes through a selected one of the filters to the detecting means.

36. A method of using the system of claim 1, comprising:
detecting the light within a first predetermined wavelength range from the object by the detecting means; and
simultaneously detecting the light within a second predetermined wavelength range from the object by a second detecting means.

37. A scanning laser microscope system comprising:
an optical system for scanning a light beam in a raster scanning fashion on a scanning plane of a material;
means for detecting the beam from the material and for generating signals representative of the intensity of the detected light;
means for generating pixel clock signals representative of the position of the beam in a first direction on the scanning plane of the material;
means for causing the position of the beam on the material scanning plane in a second direction perpendicular to the first direction to conform to a desired beam position;
means for storing the detected light signals;
means for providing control signals to the storing means based on the pixel clock signals in the first direction and the desired beam position in the second direction to synchronize the storing means such that the detected light signals are stored in storage locations corresponding to the position of the beam on the material scanning plane; and
means for forming the stored signals into an image representative of the material scanning plane.

38. The system of claim 37, wherein the optical system comprises:
a first laser for producing the beam comprising a linearly polarized, substantially collimated, single wavelength beam of light having an axis;
means for scanning the beam in a raster scanning fashion in the first direction and in a second direction; and
means for enhancing light from the material by increasing contrast between anomalies and a remainder of the material.

39. The system of claim 38, wherein the scanning means comprises:
a rotor rotatable about a rotor axis and having a circumferential side with a plurality of reflective facets, the rotor positioned to receive the beam on one of the facets;

means for rotating the rotor to cause the beam axis to scan in the first direction;

first optical means for directing the beam axis from the rotor at varying angles of incidence to a first point;

a planar mirror rotatable about a mirror axis perpendicular to the rotor axis and intersecting the point, the mirror positioned to receive the beam from the first optical directing means;

a galvanometer connected to the planar mirror to cause the planar mirror to move about the mirror axis and to cause the beam axis to also scan in the second direction, thereby defining a raster light pattern in a plane perpendicular to the beam axis reflected from the planar mirror;

second optical means for directing the beam axis from the mirror at varying angles of incidence to a second point; and a flat field apochromat objective lens positioned at the second point, the lens for receiving the beam from the second optical directing means and for focusing the beam to the scanning plane of the object.

40. The system of claim 39, further comprising:
means for sensing to send signals to be used by the providing means to ensure that each frame begins using the same face of the rotor.

41. The system of claim 38, wherein the enhancing means comprises:
a rotatable polarizing filter for selectively passing the light from the material to the detecting means at a particular polarization angle.

42. The system of claim 41, wherein the enhancing means further comprises:
a spatial filter assembly having an aperture selectively positionable in a plane parallel to the material scanning plane and for passing a portion of the light from the material.

43. The system of claim 38, wherein the enhancing means comprises:
a spatial filter assembly having an aperture selectively positionable in a plane parallel to the object scanning plane and for passing a portion of the light from the object.

44. The system of claim 43, wherein the spatial filter assembly further comprises:
a housing having a slot and a passage, the housing for rotatably mounting on the detecting means such that the light from the object passes through the passage to the detecting means;
a support plate having a hole and a support plate linearly slidable in the slot;
a track piece slidable through the hole;
a holder seat in the passage and connected to the track piece;
a filter holder rotatably supported by the holder seat; and
a filter having the aperture supported by the filter holder, whereby the aperture is positionable in one linear direction by sliding the track piece through the plate hole and in another linear direction perpendicular to the one linear direction by sliding the support plate in the housing slot.

45. The system of claim 44, wherein the spatial filter assembly further comprises:
an actuating member connected to the filter holder and slidably positioned in a groove in the track piece such that when the member slides in the groove the filter is moved in an angular direction.

46. The system of claim 43, wherein the spatial filter assembly further comprises:
a base having a passage, the base for rotatably mounting on the detecting means such that the light from the object passes through the passage to the detecting means;
a rotatable holder having an capital aperture, a portion rotatably supported in the passage, an annular groove and an off center pin;
a spatial filter plate movable about the pin and having an optical aperture, an off center hole for receiving the pin, and a radial groove; and
a rotatable disk having an optical aperture, an off center pin for projecting into the plate radial groove, and a pin for projecting into the holder annular groove, whereby the holder optical aperture, the plate optical aperture and the disk optical aperture are aligned and movable by rotating one or more of the base, the holder and the disk.

47. The system of claim 43, wherein the spatial filter assembly further comprises:
a base having a passage the base for rotatably mounting on the detecting means such that the light from the object passes through the passage to the detecting means;
a diaphragm assembly having a movable shutter selectively defining the size of the aperture aligned with the base passage;
a support having a hole positioned adjacent the diaphragm assembly;
an arm in the support linearly slidable through the hole;
a light blocking member mounted on the arm and alignable to block some or all of the light from the object before the light passes through the variable aperture; and
means for focusing the light from the object toward the detecting means.

48. The system of claim 47, wherein the focusing means further comprises:
a biconvex lens positioned to focus the light from the object through the spatial filter assembly aperture to the detecting means.

49. The system of claim 43, wherein the enhancing means further comprises:
a biconvex lens positioned to focus the light from the object through the spatial filter assembly aperture to the detecting means.

50. The system of claim 43, wherein:
the aperture is shaped like a cross.

51. The system of claim 43, wherein:
the aperture is shaped to substantially match a uniform intensity level area in an interference pattern formed when linearly polarized, substantially monochromatic light is transmitted through the object.

52. The system of claim 43, wherein:
the aperture has a circular cross section.

53. The system of claim 43, wherein:
the aperture is annular shaped.

54. The system of claim 38, further comprising:
another laser for producing another linearly polarized, substantially collimated, single wavelength beam of light, the laser positioned to direct the another beam along the path of the first beam from the scanning means to 55. The system of claim 54, wherein:
the another laser is tunable to different wavelengths.

56. The system of claim 37, wherein:

the material comprises a birefringent, partially transparent material.

57. The system of claim 37, wherein:
the enhancing means receives light transmitted through the object.

58. The system of claim 37, wherein:
the enhancing means receives light reflected from the object.

59. The system of claim 58, wherein:
the enhancing means further receives light transmitted through the object.

60. The system of claim 37, wherein the generating means includes:
a phase-locked loop means for synchronizing the phase of its output with the phase of its input such that the pixel clock signal is synchronized with a spatially derived input; and
means for multiplying the spatially derived frequency of the phase-locked loop input by a predetermined number for form the pixel clock signals.

61. The system of claim 37, wherein the causing means include:
a planar reflective surface having an axis;
a galvanometer supporting the reflective surface such that when the galvanometer is energized, the reflective surface moves about the axis;
means for directing a second light beam on the reflective surface such that when the galvanometer is energized, the beam scans in a fashion corresponding to the first beam in the second direction on the scanning plane of the material;
a light sensor positioned to receive the second beam reflected from the reflective surface and to generate a signal representative of the actual position of the first beam in the second direction on the material scanning plane; and
a galvanometer control means for controlling the energization of the galvanometer to cause the actual beam position in the second direction to conform to the desired beam position based on the actual beam position signal and a reference signal sent by the providing means.

62. The system of claim 37, further comprising:
means for sending signals to the providing means indicating the position of the beam on the material scanning plane at the beginning of each scan of the beam in the first direction, whereby the control signals supplied by the providing means are further based on the signals indicating the beginning position of each scan.

63. The system of claim 37, wherein the storing means comprises:
a digital frame storage means for sampling, digitizing and storing the signal from the detecting means while the beam is scanning a frame;
means for storing a plurality of frames of digitized signals transferable from the digital frame storage means; and
the forming means comprises a central processing unit for controlling the transfer of signals from the digital frame storage means to the storing means.

64. The system of claim 25, further comprising:
confocal means for detecting light reflected from the material and for generating electrical signals representative of the intensity of the detected reflected light;
the storing means also for storing the detected reflected light signals;
the providing means also for providing control signals to the storing means based on the pixel clock signals and the desired beam position in the second direction to synchronize the storing means such that the detected reflected light signals are stored in storage locations corresponding to the position of the beam on the material; and
the forming means also for forming the stored detected reflected light signals into an image representative of the material.

65. The system of claim 37, wherein the enhancing means comprises:
a wavelength selective filter assembly for selectively passing light emitted from the object and blocking the laser beam of light.

66. The system of claim 65, wherein:
the light emitted from the object is luminescence.

67. The system of claim 66, wherein:
the light emitted from the object is fluorescence caused by the laser beam.

68. The system of claim 37, wherein the detecting means comprises:
a first detecting means and a second detecting means; and the enhancing means comprises:
a housing having means for mounting a wavelength selective beam splitter such that the light from the object within a first predetermined wavelength range passes through the beam splitter to the first detecting means and light from the object within a second predetermined wavelength range is reflected by the beam splitter to the second detecting means.

69. The system of claim 37, wherein the enhancing means comprises:
a rotatable filter wheel assembly comprising a plurality of filters, each one of the filters allowing a different range of wavelengths to pass through the filter, and means for rotating the filter wheel assembly such that the light from the object passes through a selected one of the filters to the detecting means.

70. A method of using the system of claim 37, comprising:
detecting the light within a first predetermined wavelength range from the object by the detecting means; and
simultaneously detecting the light within a second predetermined wavelength range from the object by a second detecting means.

71. A scanning laser microscope system for assisting in the characterization of an object, the system comprising:
a first laser for producing a first linearly polarized, substantially collimated, single wavelength beam of light having an axis;
means for scanning the beam in a raster scanning fashion in a first direction across a scanning plane of the object and in a second direction perpendicular to the first direction across the scanning plane of the object, wherein the scanning means comprises:
a rotor rotatable about a rotor axis and having a circumferential side with a plurality of reflective facets, the rotor positioned to receive the beam on one of the facets;
means for rotating the rotor to cause the beam axis to scan in the first direction across the scanning plane of the object;

first optical means for directing the beam axis from the rotor at varying angles of incidence to a first point;

a planar mirror rotatable about a mirror axis perpendicular to the rotor axis and intersecting the point, the mirror positioned to receive the beam from the first optical directing means;

a galvanometer connected to the planar mirror to cause the planar mirror to move about the mirror axis and to cause the beam axis to also scan in the second direction across the scanning plane of the object, thereby defining a raster light pattern in a plane perpendicular to the beam axis reflected from the planar mirror;

second optical means for directing the beam axis from the mirror at varying angles of incidence to a second point; and a flat field apochromat objective lens positioned at the second point, the lens for receiving the beam from the second optical directing means and for focusing the beam to the scanning plane of the object;

means for enhancing light from the object;

means for detecting light from the enhancing means and for generating electrical signals representative of the intensity of the detected light; and means for creating an image representative of the scanning plane of the object from the detected light.

72. The system of claim 71, wherein:
the object comprises a birefringent, partially transparent material.

73. The system of claim 71, further comprising:
means for sensing to send signals to be used by the creating means to ensure that each frame begins using the same facet of the rotor.

74. The system of claim 71, wherein the enhancing means comprises:
a rotatable polarizing filter for selectively passing the light from the object to the detecting means at a particular polarization angle.

75. The system of claim 74, wherein the enhancing means further comprises:
a spatial filter assembly having an aperture selectively positionable in a plane parallel to the object scanning plane and for passing a portion of the light from the object.

76. The system of claim 71, wherein the enhancing means comprises:
a spatial filter assembly having an aperture selectively positionable in a plane parallel to the object scanning plane and for passing a portion of the light from the object.

77. The system of claim 76, wherein the spatial filter assembly further comprises:
a housing having a slot and a passage, the housing for rotatably mounting on the detecting means such that the light from the object passes through the passage to the detecting means;
a support plate having a hole and slidable in the slot;
a track piece slidable through the hole;
a holder seat in the passage and connected to the track piece;
a filter holder rotatably supported by the holder seat; and
a filter having the aperture supported by the filter holder, whereby the aperture is positionable in one linear direction by sliding the track piece through the plate hole and in another linear direction perpendicular to the one linear direction by sliding the support plate in the housing slot.

78. The system of claim 77, wherein the spatial filter assembly further comprises:
an actuating member connected to the filter holder and slidably positioned in a groove in the track piece such that when the member slides in the groove the filter is moved in an angular direction.

79. The system of claim 75, wherein the spatial filter assembly further comprises:
a base having a passage, the base for rotatably mounting on the detecting means such that the light from the object passes through the passage to the detecting means;
a rotatable holder having an optical aperture, a portion rotatably supported in the passage, an annular groove and an off center pin;
a spatial filter plate movable about the pin and having an optical aperture, an off center hole for receiving the pin, and a radial groove; and
a rotatable disk having an optical aperture, an off center pin for projecting into the plate radial groove, and a pin for projecting into the holder annular groove, whereby the holder optical aperture, the plate optical aperture and the disk optical aperture are aligned and movable by rotating one or more of the base, the holder and the disk.

80. The system of claim 75, wherein the spatial filter assembly further comprises:
a base having a passage, the base for rotatably mounting on the detecting means such that the light from the object passes through the passage to the detecting means;
a diaphragm assembly having a movable iris diaphragm selectively defining the size of the aperture aligned with the base passage;
a support having a hole positioned adjacent the diaphragm assembly;
an arm in the support linearly slidable through the hole;
a light blocking member mounted on the arm and alignable to block some or all of the light from the object before the light passes through the variable aperture; and
means for focusing the light from the object toward the detecting means.

81. The system of claim 80, wherein the focusing means further comprises:
a pair of biconvex lenses positioned to focus the light from the object through the spatial filter assembly aperture to the detecting means.

82. The system of claim 76, wherein the enhancing means further comprises:
a biconvex lens positioned to focus the light from the object through the spatial filter assembly aperture to the detecting means.

83. The system of claim 76, wherein:
the aperture is shaped like a cross.

84. The system of claim 76, wherein;
the aperture is shaped to substantially match a uniform intensity level area in an interference pattern formed when linearly polarized, substantially monochromatic light is transmitted through the object.

85. The system of claim 76, wherein:
the aperture has a circular cross section.
86. The system of claim 76, wherein:
the aperture is annular shaped.
87. The system of claim 71, wherein:
the enhancing means receives light transmitted through the object.
88. The system of claim 71, wherein:
the enhancing means permits only light emitted by the object to pass through the enhancing means.
89. The system of claim 71, wherein:
the enhancing means receives light reflected from the object.
90. The system of claim 89, wherein:
the enhancing means further receives light transmitted through the object.
91. The system of claim 71, wherein the creating means comprises:
means for determining the position of the beam on the object scanning plane;
means for storing the signals in storage locations corresponding to the position of the beam on the object scanning plane;
means for forming the stored signals into the image representative of the object scanning plane; and
means for displaying the image.
92. The system of claim 71, wherein the creating means comprises:
means for generating a pixel clock signal representative of the position of the beam in the first direction on the object scanning plane;
means for causing the position of the beam on the object scanning plane in the second direction to conform to a desired beam position;
means for storing the detected light signals;
means for providing control signals to the storing means based on the pixel clock signals in the first direction and the desired beam position in the second direction to synchronize the storing means such that the detected light signals are stored in storage locations corresponding to the position of the beam on the object scanning plane; and
means for forming the stored signals into an image representative of the object scanning plane.
93. The system of claim 92, wherein the generating means includes:
a phase-locked loop means for synchronizing the phase of its output with the phase of its input such that the pixel clock signal is synchronized with a spatially derived input; and
means for multiplying the spatially derived frequency of the phase-locked loop input by a predetermined number to form the pixel clock signals.
94. The system of claim 92, wherein the causing means includes:
a planar reflective surface having an axis;
a galvanometer supporting the reflective surface such that when the galvanometer is energized, the reflective surface moves about the axis;
means for directing a second light beam on the reflective surface such that when the galvanometer is energized, the beam scans in a fashion corresponding to the first beam in the second direction on the scanning plane of the object;
a light sensor positioned to receive the second beam reflected from the reflective surface and to generate a signal representative of the actual position of the first beam in the second direction on the object scanning plane; and
a galvanometer control means for controlling the energization of the galvanometer to conform to the desired beam position based on the actual beam position signal and a reference signal sent by the providing means.
95. The system of claim 92, further comprising:
means for sending signals to the providing means indicating the position of the beam on the object scanning plane at the beginning of each scan of the beam in the first direction, whereby the control signals supplied by to providing means are further based on the signals indicating the beginning position of each scan.
96. The system of claim 92, wherein the storing means comprises:
a digital frame storage means for sampling, digitizing and storing the signal from the detecting means while the beam is scanning a frame;
means for storing a plurality of frames of digitized signals transferable from the digital frame storage means; and
the forming means comprises a central processing unit for controlling the transfer of signals from the digital frame storage means to the storing means.
97. The system of claim 71, further comprising:
another laser for producing another linearly polarized, substantially collimated, single wavelength beam of light, the laser positioned to direct another beam along the path of the first beam from the scanning means to the object.
98. The system of claim 97, wherein:
the another laser is tunable to different wavelengths.
99. The system of claim 71, further comprising:
confocal means for detecting light reflected from the object and for generating electrical signals representative of the intensity of the detected reflected light; and
the creating means also for creating an image representative of the object from the detected reflected light.
100. The system of claim 71, wherein the enhancing means comprises:
a wavelength selective filter assembly for selectively passing light emitted from the object and blocking the laser beam of light.
101. The system of claim 71, wherein:
the light emitted from the object is luminescence.
102. The system of claim 101, wherein:
the light emitted from the object is fluorescence caused by the laser beam.
103. The system of claim 71, wherein the detecting means comprises:
a first detecting means and a second detecting means; and the enhancing means comprises:
a housing having means for mounting a wavelength selective beam splitter such that the light from the object within a first predetermined wavelength range passes through the beam splitter to the first detecting means and light from the object within a second predetermined wavelength range is reflected by the beam splitter to the second detecting means.
104. The system of claim 71, wherein the enhancing means comprises:

a rotatable filter wheel assembly comprising a plurality of filters, each one of the filters allowing a different range of wavelengths to pass through the filter, and means for rotating the filter wheel assembly such that the light from the object passes through a selected one of the filters to the detecting means.

105. A method of using the system of claim 71, comprising:
 detecting the light within a first predetermined wavelength range from the object by the detecting means; and
 simultaneously detecting the light within a second predetermined wavelength range from the object by a second detecting means.